(12) United States Patent
Aquila et al.

(10) Patent No.: US 7,953,615 B2
(45) Date of Patent: May 31, 2011

(54) SYSTEM AND METHOD OF ADMINISTERING, TRACKING AND MANAGING OF CLAIMS PROCESSING

(75) Inventors: Anthony Aquila, Santa Rosa, CA (US); Edward L Schrenk, San Antonio, TX (US); Patrick Cole, San Francisco, CA (US); Thomas Lyons, San Mateo, CA (US); David Griffin, Novato, CA (US); Mike Marsh, Billings, MT (US); Hassold Christian, Novato, CA (US); Frederick C Fisher, Normandy Park, WA (US); Carlos Portal, Richmond, CA (US)

(73) Assignee: Mitchell International, Inc., San Diego, CA (US)

( * ) Notice: Subject to any disclaimer, the term of this patent is extended or adjusted under 35 U.S.C. 154(b) by 2328 days.

(21) Appl. No.: 09/825,604

(22) Filed: Apr. 3, 2001

(65) Prior Publication Data

US 2002/0035488 A1    Mar. 21, 2002

(51) Int. Cl.
  G06Q 10/00    (2006.01)
  G06Q 50/00    (2006.01)
  A61B 5/00     (2006.01)
  G06F 19/00    (2006.01)
  G06Q 40/00    (2006.01)
(52) U.S. Cl. ...................................... 705/4; 705/2; 705/3
(58) Field of Classification Search .................. 705/4, 7, 705/10, 2, 3
  See application file for complete search history.

(56) References Cited

U.S. PATENT DOCUMENTS

| | | | |
|---|---|---|---|
| 3,829,844 A | 8/1974 | Zonneveld et al. | 340/172.5 |
| 3,974,482 A | 8/1976 | Balashov et al. | 340/172.5 |
| 4,060,915 A | 12/1977 | Conway | 35/9 |
| 4,404,639 A | 9/1983 | McGuire et al. | 364/551 |
| 4,413,314 A | 11/1983 | Slater et al. | 364/188 |
| 4,420,234 A | 12/1983 | Dolejsi et al. | 353/122 |
| 4,435,769 A | 3/1984 | Nagano et al. | 364/464 |
| 4,468,755 A | 8/1984 | Iida | 364/900 |
| 4,520,399 A | 5/1985 | Iida | 358/287 |
| 4,538,183 A | 8/1985 | Kanno et al. | 358/280 |
| 4,558,374 A | 12/1985 | Kurata et al. | 358/287 |
| 4,667,248 A | 5/1987 | Kanno | 358/280 |
| 4,691,238 A | 9/1987 | Yamada | 358/280 |
| 4,725,892 A | 2/1988 | Suzuki et al. | 358/287 |
| 4,752,908 A | 6/1988 | Bouillot | 364/900 |
| 4,774,569 A | 9/1988 | Morton et al. | 358/102 |
| 4,837,635 A | 6/1989 | Santos | 358/287 |
| 4,891,702 A | 1/1990 | Nakayama et al. | 358/140 |
| 4,893,258 A | 1/1990 | Sakuragi | 364/521 |
| 4,899,292 A | 2/1990 | Montagna et al. | 364/521 |
| 4,972,318 A | 11/1990 | Brown et al. | 364/403 |
| 4,992,940 A | 2/1991 | Dworkin | 364/401 |
| 5,128,859 A | 7/1992 | Carbone et al. | 364/401 |
| 5,146,404 A | 9/1992 | Calloway et al. | 364/401 |

(Continued)

OTHER PUBLICATIONS

NuGen I.T., "Response to CCIF Parts and Material Committee", Enterprise Workflow, NuGen I.T., The internet Integration Company.

(Continued)

*Primary Examiner* — Gerald J. O'Connor
*Assistant Examiner* — Amber Altschul
(74) *Attorney, Agent, or Firm* — Sheppard Mullin Richter & Hampton LLP

(57) ABSTRACT

A system and method of administering, tracking and managing of claims processing.

19 Claims, 35 Drawing Sheets

U.S. PATENT DOCUMENTS

| | | | | |
|---|---|---|---|---|
| 5,283,865 | A | | 2/1994 | Johnson ......................... 395/161 |
| 5,293,309 | A | | 3/1994 | Sakai et al. ................... 364/401 |
| 5,317,503 | A | | 5/1994 | Inoue ............................ 364/400 |
| 5,377,098 | A | | 12/1994 | Sakai ............................ 364/406 |
| 5,432,904 | A | | 7/1995 | Wong |
| 5,504,674 | A | | 4/1996 | Chen et al. |
| 5,839,112 | A | | 11/1998 | Schreitmueller et al. |
| 5,950,169 | A | * | 9/1999 | Borghesi et al. .................. 705/4 |
| 6,049,773 | A | * | 4/2000 | McCormack et al. ............ 705/4 |
| 6,185,540 | B1 | | 2/2001 | Schreitmueller et al. |
| 6,792,410 | B1 | * | 9/2004 | Donovan et al. ................. 705/4 |
| 6,810,383 | B1 | * | 10/2004 | Loveland ......................... 705/9 |
| 6,950,801 | B2 | * | 9/2005 | Brookes et al. .................. 705/7 |

OTHER PUBLICATIONS

CCC Information Services, Inc., "How to Read an Estimate Quality Review". (2005) http://www.ccis.com.

CCC Information Services, Inc., "How to Read a Pathways® Estimate Quality Review", (1999) http://www.ccis.com.

CCC Information Services, Inc., "Integrated Self-Audit" http://www.ccis.com.

Audatex, a Solera Company, "Audatex Estimate Check™" (2006) Audatex North America http://www.audatex.com.

Audatex. a Solera Company, "Audatex Estimate Review™" (2006) Audatex North America http://www.audatex.com.

* cited by examiner

Fields
```
<Loss>
    <LocationofAccident>
    <DamageToVehicle>
    <LossDescription>
    <NamedInsuredVehicleOperator>
        <LastName>
        <FirstName>
        <MiddleName>
    <ReportNumber>
    <PoliceReportNumber>
    <DateOfLoss>
    <TimeOfLoss>
    <WereThereWitnesses>
    <HaveAttorney>
    <WereThereInjuries>
    <HowManyVehiclesInvolved>
    <WeatherConditions>

<VehicleInformation>
    <ModelYear>
    <Manufacturer>
    <Model>
    <Color>
    <VehicleIdentificationNumber>
    <LossPayee> vehicle <Repair Facility>
    <SelectaRepairFacility>
    <RepairFacilityInformation>
        <Name>
        <Addr>
        <City>
        <StateProv>
        <PostalCode>
    <CommunicationNumber>
        <RepairFacilityPhone>

<Insured>
    <PersonInformation>
        <LastName>
        <FirstName>
        <MiddleName>
        <SocialSecurityNumber> Password
    <AddressInformation>
        <Addr1>
        <Addr2>
        <City>
        <StateProv>
        <PostalCode>
        <Country>
        <Email>
    (phone # will be accepted if customer has no e-mail)
    <CommunicationNumber>
        <ContactPhone>

<Damage to Property of Others>
    <WasItAVehicle>
    <DamageTo>
    <NumberOfPassengers>
    <DamageDescription>
    <OtherCarrierInformation>
    <VehicleInformation>
        <ModelYear>
        <Manufacturer>
        <Model>
        <Color>
        <VIN>
        <LicensePlateNumber>
    <Description of Damage>

(Description available for multiple vehicles)
```

```
<Injuries>
(Fields below will be available for each injured person)
    <Injured>
        <RelationToInsured>
        <Description &ExtentOfInjury>
        <MedicalProvider>
        <AmbulanceNeeded>
        <PersonInformation>
            <LastName>
            <FirstName>
            <MiddleName>
        <AddressInformation>
            <Addr1>
            <Addr2>
            <City>
            <StateProv>
            <PostalCode>
            <Country>
        <CommunicationNumber>
            <ContactPhone>
(Description available for multiple injuries)

<Witnesses>
    <Witness>
        <PersonInformation>
            <LastName>
            <FirstName>
            <MiddleName>
        <AddressInformation>
            <Addr1>
            <Addr2>
            <City>
            <StateProv>
            <PostalCode>
            <Country>
        <CommunicationNumber>
            <ContactPhone>

(Description available for multiple witnesses)

<Your Passenger Information>
    <Passenger>
        <PersonInformation>
            <LastName>
            <FirstName>
            <MiddleName>
        <AddressInformation>
            <Addr1>
            <Addr2>
            <City>
            <StateProv>

<PostalCode>
            <Country>
        <CommunicationNumber>
            <ContactPhone>

<Attorney>
    <AttorneyInformation>
        <WhoDoestheAttorneyRepresent>
        <Firm Name>
        <LastName>
        <FirstName>
        <MiddleName>
    <AddressInformation>
        <Addr1>
        <Addr2>
        <City>
        <StateProv>

<PostalCode>
        <Country>
    <CommunicationNumber>
        <ContactPhone>
```

FIG. 6

Claims
  Report a Claim
  Select a Repair Shop
  Search for Car Rental
  Catastrophe Information
Feedback
Financial Services
Insurance Options
Meet American Family
Quotes

(Step 4 of 4) Other Person Information

*Please enter as much information as you have available*

Role played in accident/incident — Please Select ▼
Check here if the name is unknown
First name
Middle initial
Last name
Address 1
Address 2
City
State — Please Select ▼
ZIP Code
Email address
Contact [Home ▼] telephone
Contact [Work ▼] telephone Please enter any damaged property belonging to this person.

*If this person was injured, please complete the following information.*

Description of injury

Was an ambulance needed?  ○Yes  ⊙No

Medical provider/s
  i.e., hospital, clinic

Were there other persons involved?
ex. witnesses, pedestrians, bicycle riders  ○Yes  ⊙No

FIG. 7B

Please indicate the damage this vehicle has sustained.

Light: Scratched and/or slightly dented
Medium: Significantly dented, could include slight structural damage
Heavy: Significant structural damage

FIG. 8

| Claim | Loss | Policy | Coverage | Party |
|---|---|---|---|---|
| Claim Number | Date of Loss | Policy Type | Coverage type | Party type |
| | Time of Loss | Policy Name | Coverage amount | |
| | Weather Condition | Coverage begin date | Coverage deductible | |
| | Loss Type | Coverage end date | | |
| | Loss Location | Policy period # | | |
| | Loss Description | | | |
| | # Vehicles Involved | | | |
| | Anyone Injured? | | | |
| | Any law enforcement? | | | |
| | Law enforcement name | | | |
| | Report # | | | |
| | Any witnesses? | | | |
| | Any pedestrians? | | | |

| Individual | Business | Vehicle | Property |
|---|---|---|---|
| First Name | Business Name | Year | Owner Name |
| Middle Name | Tax ID Number | Make | Property Description |
| Last Name | Contact Name | Model | Address |
| Date of Birth | Contact Info | VIN | Phone |
| Social Security # | Reference Type | Color | email |
| Gender | Reference Number | Mileage | |
| Marital Status | Address | Lienholder | |
| DL State | Phone | Any/Other Insurance | |
| DL # | email | License plate State | |
| Address | | License plate number | |
| Phone | | Driver | |
| email | | Passenger | |
| Injured? | | Owner | |
| Deceased? | | | |

| Address | Phone | email | Injury | Vehicle Damage | Property Damage |
|---|---|---|---|---|---|
| Type | Type | email address | Type of Medical | Drivable? | Livable? |
| Street 1 | Number | | Amount of Medical | Damage location | Description |
| Street 2 | | | Injury description | Damage severity | Contractor chosen? |
| City | | | Medications | RF Chosen? | Contractor Information |
| State | | | Body Part | RF Information | Estimate provided? |
| Zip | | | Type of Injury | Estimate provided? | Estimate amount |
| County | | | | Estimate amount | |
| Country | | | | | |

FIG. 9B

| Field NAMES | Format | DATA LEVEL | Description |
|---|---|---|---|
| Claim number | ###-##-###### ALPHA NUM | CLAIM | Aco-yr-claim# |
| Insured name | ONE FIELD- 30 BYTES | CLAIMS SUFFIX | |
| HCO | ### = 3 DIGITS | CLAIM | ID FOR HANDLING CLAIM OFFICE |
| Status | X = ONE LETTER | SUFFIX | o=open, c=closed; p=pending, r=reopened |
| Rep / CA | XXX = ALPHA NUMERIC | SUFFIX | representative or claims assist assigned to suffix - REASSIGNED |
| SUP | | SUFFIX | ID ADJUSTER OR SIU ON REASSIGNED CLAIM |
| RECEIVE DATE | Cc/YY/MM/DD | CLAIM | 8 DIGIT DATE =REPORT DATE |
| DATE OF LOSS | Cc/YY/MM/DD | CLAIM | 8 DIGIT DATE =DOL |
| DATE OF MAKE UP | Cc/YY/MM/DD | SUFFIX | 8 DIGIT =FIRST RESERVE |
| ACCIDENT LOCATION -CITY | ONE FIELD | CLAIM | AT LEAST 20 BYTES |
| STATE | TWO DIGIT ALPHA | CLAIM | 2 BYTES |
| SUFFIX - SX | XXX =3 DIGIT NUMERIC | SUFFIX | ID'S CLAIM SEGMENT/COVERAGE |
| LINE ABBREVIATION | 5 BYTES | SUFFIX | COL=COLLISION; APD=THIRD PARTY; AOC=COMPREHENSIVE/RENTAL |
| CLAIMENT / OBLIGEE | ONE FIELD - 30 BYTES | SUFFIX | |
| ADDRESS -CLMNT | ONE FIELD - 30 BYTES | SUFFIX | |
| CITY - CLMNT | ONE FIELD - 30 BYTES | SUFFIX | |
| STATE-CLMNT | TWO DIGIT | SUFFIX | STATE CLAIMENT RESIDES |
| ZIP CODE | #####-#### 9 BYTES | SUFFIX | STD PLUS 4 FORMAT |
| AC - AREA CODE -CLMNT | ### = 3 DIGITS | SUFFIX | STANDARD |
| PHONE NUMBER-CLMNT | ###-#### | SUFFIX | STANDARD |
| ATTORNEY | ONE FIELD - 25 BYTES | SUFFIX | |
| DEDUCTIBLE AMOUNT | ONE FIELD - 7 BYTES | SUFFIX | |
| AC - AREA CODE -ATTRNY | ### = 3 DIGITS | SUFFIX | STANDARD |
| PHONE NUMBER-ATTRNY | ###-#### | SUFFIX | STANDARD |
| PLAINTIFFS FIRM/BUSINESS | ONE FIELD - 25 BYTES | SUFFIX | STANDARD |
| DESCRIPTION OF LOSS | 2 SECTIONS - 45 BYTES | CLAIM | ALPHA NUMERIC |
| POLICY NUMBER | XXX-XXXXXXXX 11 BYTES ALPHA NUMERIC | CLAIM | 3 CHAR PREFIX,8 DIGIT POL. # |
| EFFECTIVE DATE | Cc/YY/MM/DD | CLAIM | 8 char |
| EXPIRATION DATE | Cc/YY/MM/DD | CLAIM | 8char |
| VEHICLE MAKE | 10 BYTES ALPHA NUMERIC | CLAIM | |
| VEHICLE MODEL | 10 BYTES ALPHA NUMERIC | CLAIM | |
| AUTO NUMBER | XX=TWO DIGITS | CLAIM | NUMBER OF INSURED VEHICEL AS SHOWN ON POLICY |
| AUTO YEAR | XX=TWO DIGITS | CLAIM | YEAR INSURED VEHICLE WAS INVOLVED IN A LOSS |
| VEHICLE MODEL YEAR | | CLAIM | |
| INSIDE APPRAISER | XXX= 3 CHARACTER | CLAIM | ID'S INHOUSE FFIC APPRAISER |
| VEHICLE ID NUMBER -VIN | 17 CHARACTERS ALPHA NUMERIC | CLAIM | MFG UNIQUELY ID'S VEHICLE |
| OUTSIDE APPRAISER | 20 BYTES | SUFFIX | NAME OF OUTSIDE APPRAISAL FIRM |
| DATE SUFFIX CLOSED | Cc/YY/MM/DD | SUFFIX | SPLIT INTO THREE FIELD AT FFIC |
| DATE SUFFIX REOPENED | Cc/YY/MM/DD | SUFFIX | SPLIT INTO THREE FIELD AT FFIC |
| DEDCUTIBLE INDICATOR | X= ONE CHARACTER | CLAIM | ID;'S WHETHER DED APPLIES TO CLAIM |
| DATE CLAIM CLOSED | Cc/YY/MM/DD | CLAIM | CLOSED AT CLAIM LEVEL |
| IRS NUMBER | 10 DIGITS ###-##-#### (#) | suffix | SOCIAL SECURITY OR TAX ID # FOR PERSON RECEIVING PAYMENT |
| Invoice Number | 10 digits | suffix | Internal number if intending to pay claim |

FIG. 13

Header
Transaction ID: *(a unique identifier of this transaction. Use ACTIVITY_ID from ACTIVITY_LOG)*
(Title of document): *Appraisal Assignment Transmittal*
(Date of document): *01/01/2001*
Assignment type: *2 (this is a code value – ASSIGNMENT_TYPE_CV)*
Assignment type description: *CLASS shop appraisal (translation of type above)*

Assignment (to)
Assignee ID: *(the directory id for this service provider - SERVICE_PROVIDER_ID)*
ION Connection ID: *(the unique ID used for iON Connection - ION_CONNECTION_NUMBER)*
Assignee name: *ACME Auto Repair*
Address: *350 Wooster Ave*
City: *San Jose*
State: *CA*
ZIP: *95116*
Phone: *800-555-1111*
Fax: *408-965-7224*
E-mail: *acmeauto@mymail.com*

Adjuster (from)
Adjuster name (first last): *David Crosby*
Address: *777 San Marin Drive*
City: *Novato*
State: *CA*
ZIP: *94998*
Phone: *650-333-3434*
Fax: *415.899.4321*
E-mail: *dcrosby@carrier.com*
Adjuster ID: *213 F 823*

Request
(This is a short paragraph description the type of request and the how it should be handled. This paragraph along with the instruction – see below – will come from a new table which will be accessed by carrier id & assignment type)
*This assignment is not a confirmation of coverage or acceptance of liability. Payment responsibility remains with the vehicle owner unless otherwise confirmed . . .*

Additional comment
(This is an area for notes specific to this assignment not covered in other fields. This is optional – OTHER_COMMENT from ASSIGNMENT.)

Instructions
(This is a list of completion instructions. This will list several steps that need to be done to complete this assignment. See notes in Request above. Probably 5 steps. Carry as 10 different fields – each with length of 50)
1. Provide vehicle owner with copy . . .
2. Fax the completed Fax transmittal / status sheet, estimate . . .
3. Fax a copy of the estimate only to . . .
4. Unless we receive a Direction of Pay authorization . . .
5. Mail the original estimate and photos to the claims office . . .

CCC ID: *(a code that identifies FFIC to CCC for a total loss valuation. The id is different for each state. This may not be necessary.*

Claim information
Claim / Suffix #: *213-13-359478 001*
HCO: *640*
Date of loss: *01/01/2001*
Date reported: *01/01/2001*
Policy number: *1111111*
Deductible amount: *$250*
Description of loss: *While driving down route 4, the car in front of me stopped short in the middle of the street. My car struck the rear of his car causing damage to my front end, including the hood and only minor damage to his rear bumper*
Insured name (first last): *Bob Dylan*

Vehicle owner information
Vehicle owner (first last): *Bob Dylan*
Address: *975 Island Drive*
City: *Redwood Shores*
State: *CA*
ZIP: *94065*
Phone 1: *work: 650.472.2600*
Phone 2: *home: 650.472.9876*

Vehicle information
Location: *at Zappa's Autobody & Repair*
Location Address:
Location City: *Santa Angeles*
State: *CA*
ZIP:
Location phone:
Year: *1997*
Make: *Honda*
Model: *Accord*
License: *4356-SR4*
Color: *Blue*
VIN: *12345ASDV-5345345D*
Description of damage: *Damage to the front bumper, front grill, left front light, and to the hood.*
Prior damage: *None reported*
Drivable: *Yes*

Microsoft Excel - Management Reports - Rev3

Group: Farmwide Mutual Insurance Group
Company: Farmwide Personal Auto
Region/Zone: All Regions
Date Range: 11/1/2000 - 12/1/2000

GEOGRAPHICAL ANALYSIS

| | | WORKLOAD | | | | LOSS | | | | | PARTS | | |
|---|---|---|---|---|---|---|---|---|---|---|---|---|---|
| Regions | States | New Claims (#) | Est. Rec'd (#) | Est. Conv. Rate | Claim Rec'd per Day | Total Severity (avg-incl. supps) | Avg. Supp. Amt. ($) | Supps Vs Est. (%) | Non-Drivable Veh. Ratio | Drive-In Only vs. Est. Ratio | OEM Parts % | A/M Parts % | Salvage Parts 5 | Parts Cost Vs. Total Est. |
| *Regional Summary* | | | | | | | | | | | | | | |
| Region 1 | | 1132 | 873 | 75% | 38 | $2,344.00 | $792.25 | 36% | 23% | 56% | 93% | 7% | 0% | $ 809.38 |
| Region 2 | | 1230 | 638 | 56% | 41 | $1,116.63 | $94.25 | 9% | 17% | 42% | 39% | 42% | 19% | $ 336.94 |
| Region 3 | | 475 | 281 | 54% | 16 | $1,972.00 | $555.25 | 21% | 16% | 40% | 87% | 3% | 11% | $ 910.73 |
| Region 4 | | 771 | 392 | 54% | 26 | $3,463.50 | $600.50 | 10% | 16% | 41% | 42% | 52% | 6% | $1,385.25 |
| Average | | 902 | 546 | 60% | 30 | $2,224.03 | $510.56 | 19% | 18% | 45% | 65% | 26% | 9% | $ 860.57 |
| Total | | 3608 | 2184 | - | 120 | $8,896.13 | $2,042.25 | - | - | - | - | - | - | $3,442.29 |
| Region 1 - State Breakout | | | | | | | | | | | | | | |
| | California | 400 | 435 | 109% | 13 | $1,375.00 | $885.00 | 64% | 33% | 82% | 75% | 25% | 0% | $ 797.50 |
| | Oregon | 335 | 275 | 82% | 11 | $3,212.00 | $1,185.00 | 34% | 25% | 62% | 98% | 2% | 0% | $1,124.00 |
| | Nevada | 285 | 65 | 23% | 10 | $3,000.00 | $896.00 | 30% | 7% | 17% | 100% | 0% | 0% | $ 600.00 |
| | Washington | 112 | 98 | 87% | 4 | $1,789.00 | $286.00 | 16% | 26% | 65% | 100% | 0% | 0% | $ 716.00 |
| Average | | 283 | 218 | 75% | 9 | $2,344.00 | $792.25 | 36% | 23% | 56% | 93% | 7% | 0% | $ 809.38 |
| Total | | 1132 | 873 | - | 38 | $9,376.00 | $3,169.00 | - | - | - | - | - | - | $3,237.50 |
| Region 2 - State Breakout | | | | | | | | | | | | | | |

FIG. 30

| CLAIM # | STATE | COVERAGE | Zone | Region | Claims office | DESK Adjuster | Staff Appraiser | Policy Submitted | Time Submit |
|---|---|---|---|---|---|---|---|---|---|
| 1 | MO | hail | 5 | Southwest | E | adjuster 200 | appraiser 526 | 12/17/1999 | 12:00 PM |
| 3 | IL | thefts | 3 | Midwest | D | adjuster 112 | appraiser 58 | 12/17/1999 | 12:04 PM |
| 4 | IL | no other vehicle | 3 | Midwest | D | adjuster 117 | appraiser 59 | 12/17/1999 | 3:27 PM |
| 5 | IL | other vehicle | 3 | Midwest | D | adjuster 112 | appraiser 60 | 12/19/1999 | 3:59 PM |
| 6 | IL | no other vehicle | 3 | Midwest | D | adjuster 111 | appraiser 56 | 12/21/1999 | 11:29 AM |
| 7 | CA | other vehicle | 1 | West | B | Kate Toby | Axle Rose | 1/8/2000 | 4:25 PM |
| 8 | CA | no other vehicle | 1 | West | B | Tom Otto | Jimmy Page | 1/10/2000 | 2:06 PM |
| 9 | CA | no other vehicle | 1 | West | B | Susan Wen | Janis Joplin | 1/10/2000 | 5:19 PM |
| 10 | CA | bicyclist | 1 | West | B | Kate Toby | Geraldine Hagar | 1/10/2000 | 6:51 PM |
| 11 | CA | bicyclist | 1 | West | B | Tom Otto | Jenny Hilfinger | 1/11/2000 | 1:02 PM |
| 12 | CA | bicyclist | 1 | West | B | Susan Wen | Abe Lincoln | 1/12/2000 | 3:47 PM |
| 13 | CA | no other vehicle | 1 | West | B | Kate Toby | George Washington | 1/13/2000 | 10:18 AM |
| 14 | WI | flood | 3 | Midwest | F | adjuster 300 | appraiser 435 | 1/14/2000 | 6:43 AM |
| 15 | CA | bicyclist | 1 | West | B | Tom Otto | Thomas Jefferson | 1/15/2000 | 12:26 PM |
| 16 | CA | no other vehicle | 1 | West | B | Susan Wen | Tim Wrend | 1/15/2000 | 5:11 PM |
| 17 | MO | bicyclist | 5 | Southwest | E | adjuster 201 | appraiser 527 | 1/18/2000 | 10:17 PM |
| 18 | CA | no other vehicle | 1 | West | B | Tom Otto | Axle Rose | 1/20/2000 | 12:57 PM |
| 19 | CA | other vehicle | 1 | West | B | Susan Wen | Jimmy Page | 1/20/2000 | 9:56 PM |
| 20 | CA | no other vehicle | 1 | West | B | Kate Toby | Janis Joplin | 1/24/2000 | 9:22 PM |
| 22 | MO | no other vehicle | 5 | Southwest | E | adjuster 202 | Geraldine Hagar | 1/25/2000 | 8:39 PM |
| 23 | CA | collision w/animals | 1 | West | B | Susan Wen | appraiser 528 | 1/27/2000 | 10:41 AM |
| 25 | CA | no other vehicle | 1 | West | B | Tom Otto | Jenny Hilfinger | 1/27/2000 | 3:47 PM |
| 26 | CA | bicyclist | 1 | West | B | Kate Toby | Abe Lincoln | 1/29/2000 | 6:26 PM |
| 28 | WI | collision w/animals | 3 | Midwest | F | adjuster 201 | appraiser 436 | 1/30/2000 | 2:13 AM |
| 29 | WI | no other vehicle | 3 | Midwest | B | adjuster 302 | appraiser 435 | 2/2/2000 | 6:41 PM |
| 30 | CA | collision w/animals | 1 | West | B | Susan Wen | George Washington | 2/2/2000 | 11:13 PM |

SYSTEM AND METHOD OF ADMINISTERING, TRACKING AND MANAGING OF CLAIMS PROCESSING

I. REFERENCE TO RELATED APPLICATION

This application claims priority under 35 U.S.C. §119(e) to U.S. Provisional Application Ser. No. 60/194,128 filed Apr. 3, 2000, by Anthony Aquila, which is incorporated herein by reference in its entirety.

II. BACKGROUND

1. Field of the Invention

The present invention relates to insurance claim processing systems in general, and more particularly to administering, tracking and managing insurance claim processing systems.

2. Description of the Background Art

Processing, tracking and releasing funds for claims made upon insurance policies and similar risk shifting mechanisms has traditionally been a time intensive and resource intensive process. Traditionally, there are six major steps involved in the processing of claims: initial claims processing, loss appraisal, claims adjusting, satisfying the claim, settlement and payment, and management and analysis.

Initial claims processing includes receiving initial claim data associated with a newly asserted claim, initial assessment of damages and tasks required to fulfill the claim, and assignment of those tasks to appropriate service providers.

The claims process starts with the notification by the insured or claimant that an accident has occurred. Currently, this notification is typically completed by phone to the carrier's first report unit or to an agent. The carrier then verifies policy coverage, creates a claim file and assigns the claim to an adjuster and an appraisal resource or directly to a service provider. Generally, the client must exchange several phone calls with the various commercial participants to schedule a damage estimate, select a repair facility and make car rental arrangements, if applicable. In addition, these processes are paper intensive because legacy claims systems do not support imaging and relevant documents such as estimates, photos, police reports and tow bills that arrive regularly by fax and mail throughout the life of the claim file.

Automated initial claim capture systems are known. However, while relieving some of the burden on an insurance carrier's resources, traditional automated initial claim capture systems are not flexible. Claimants are forced through standardized questions in standardized formats that often do not fit well with their needs. Also, these systems are not configurable to use by a commercial participant or a claimant, nor do they are unable to fully facilitate the capture of supplemental information in addition to initial claim data and can thus be inaccurate. Moreover, initial claim capture systems usually connect directly to an insurance company's proprietary software or interface. An agent who deals with multiple insurance companies may need multiple systems or pieces of software.

Initial claim processing also involves determining the importance of a given claim, in what order it should be addressed, what tasks need to be fulfilled to address the claims and what specific parties those tasks should be assigned to. Traditionally, a claims adjuster, who must fulfill each of these steps, handles this process. The process is labor intensive, requires a fair amount of familiarity with the situations similar to the one at hand, and can be subjective, the combination of which results in expense to the insurance company, potential error and inconsistencies.

Loss appraisal involves loss assessment and related activities. In most automobile insurance claims, the damage assessment is developed using computerized damage estimating software. However, conventional computerized estimating platforms utilize incompatible proprietary data and communications formats. Most carriers lack the ability to electronically integrate data from multiple systems, and therefore encourage or require their affiliated repair facilities members to use a specific estimating platform so that the data generated can be analyzed and compared to the results of other estimating resources used by an insurance carrier. In order to communicate with different carriers, repair facilities must often purchase multiple estimating and photo-imaging systems, creating redundant costs and expenses and lost time from having to re-enter data into different proprietary systems.

Claims adjusting involves determining the fair claim settlement amount. Claims adjusting includes investigating the facts related to the claim and negotiating the cost of services to fulfill the claim with other commercial participants and/or settlement negotiations with the client. Traditionally, this process is handled by a claim adjuster, and requires data from a wide and disparate variety of internal and external sources, including computerized and paper-based systems. This problem causes frequent delays as key participants cannot be reached and as required documents are mailed or sent by expensive overnight delivery services.

Satisfying the claim involves completing the services that are required to recompense the loss. The traditional process involves a variety of delays while service providers await approval of adjusters for initial and supplemental costs. During the typical process, the consumer or suppliers to the service provider contacts the carrier or the service provider numerous times by phone. These calls disrupt the normal flow of work for the recipients and add costs and delays to the process. In addition, administrative overhead for repair facilities is high as they must rely on phone and fax to communicate with insurers, suppliers, and consumers.

Settlement and payment involves delivery of the repaired vehicle in the case of repairable damage and payments either directly to the insured or to service providers. In the traditional process, carriers are required to produce multiple checks to a variety of service providers based on manual invoicing methods. Service providers may have to provide their services to the consumer before receiving payment for the work from the carriers and must wait extended periods for final payment. The movement, tracking of numerous payments, often in the form of checks, and the delays commonly involved, are additional problems faced in claims processing.

Management and analysis involves management oversight of the process by commercial participants. Analysis of settlement cycle times, repair costs, revenue, margins, and consumer satisfaction are just a few examples of the business metrics utilized by the Commercial Participants. Gathering and processing of sufficient claim related data such as customer surveys traditionally requires a great amount of resources in the form of time and staff to track down answers, data, and analyze what is gathered. Data gathering traditionally yields a small amount of data making analysis less accurate, and any analysis that is conducted is usually on aging or outdated information.

As each of these processes presents difficulties, complexities to systems and processes which seek to address them, the combination of these processes, each of which needs to be addressed in claims processing, provides even deeper inefficiencies that have yet to be adequately addressed. Traditional claim management systems are each focused on a single or a few of these steps involved in processing claims, and often require the redundant re-collection, re-entry or reformatting of collected information and data to cater to the specific needs of each of the processes involved. For a paper based claim file management system, information is limited to the number of physical copies of the material available, which are static and costly to move and store. In addition, bottlenecks are created when files are kept, for example by a claims adjuster who cannot be reached. For electronic claim management systems, proprietary systems, formats and communication methods similarly require redundant effort in the need to re-enter or reformat data to cater to each system involved in the process. Traditionally, there does not exist a centralized claim processing or storage system. Traditionally, claims processing is people intensive, requiring human involvement for phone calls, data collection and data entry, often requiring several days, and considerable inconvenience to the client while adding significantly to the insurance carrier's costs of adjusting the losses under claims.

Accordingly, there is a need for an automated system for administering, tracking and managing claims processing.

III. SUMMARY OF THE INVENTION

The present invention provides a centralized system and methods of administering, tracking and managing claims processing. More particularly, the system and method processes, tracks and releases funds for claims made upon insurance policies and similar risk shifting mechanisms including but not limited to self insurance, indemnity provisions and surety and performance bonds. The invention is composed of sub-systems that can operate on a standalone basis or in conjunction with one or more sub-systems of the invention. The sub-systems include:

The user interface and claim management sub-system (Deskview) allows a user to access, view, add, and edit claim data. Deskview also serves as a portal point to other sub-systems.

The first notice of loss sub-system (FNOL) captures initial claim data directly from a consumer using client software. In another embodiment, FNOL captures initial claim data through a commercial participant. FNOL presents the user, the consumer of the commercial participant, with tailored questions, where the presentation format varies depending on the type of user. Also questions subsequent to certain gateway questions presented to the user vary according to the user's answers to the gateway questions. The claim data captured can be transmitted to and stored in the eclaim database, or insurance carrier system.

The triage sub-system receives claim data and determines the severity and priority of the claim according to business rules established by an insurance carrier. Next, the triage sub-system determines the type or type(s) of assignees to assign a claim to according to business rules established by an insurance carrier.

The assignment sub-system receives the claim from the triage sub-system, identifies the assignee most qualified for the assignment according to insurance carrier business rules, makes the assignment, records that the assignment has been made, and notifies the assignee.

The vendor connection and assignment management system (Connection) does not reside on the application layer, but is stored and operates on the vendor's I/O device 1, and serves as a communication and management system for vendors, particularly service providers such as repair facilities and independent adjusters. In one embodiment, Connection resides and operates on internal system.

The audit sub-system applies insurance carrier specific business rules, government regulations, and comprehensive trending analysis to detect and rectify any inconsistencies and irregular processing of claims, by auditing internal processes or user or service providers submitted data.

The automated payment system (APS) automates the process of fulfilling payments required to fulfill an asserted claim.

The customer satisfaction index collection sub-system (CSI sub-system) automates the gathering of satisfaction data from a policyholder or consumer to generate a Customer Satisfaction Index (CSI) for the service providers.

The reporting sub-system summarizes and formats data stored eclaim file or the insurance carrier system based on a number of criteria to generate various reports.

IV. BRIEF DESCRIPTION OF THE DRAWINGS

Figure 5A:
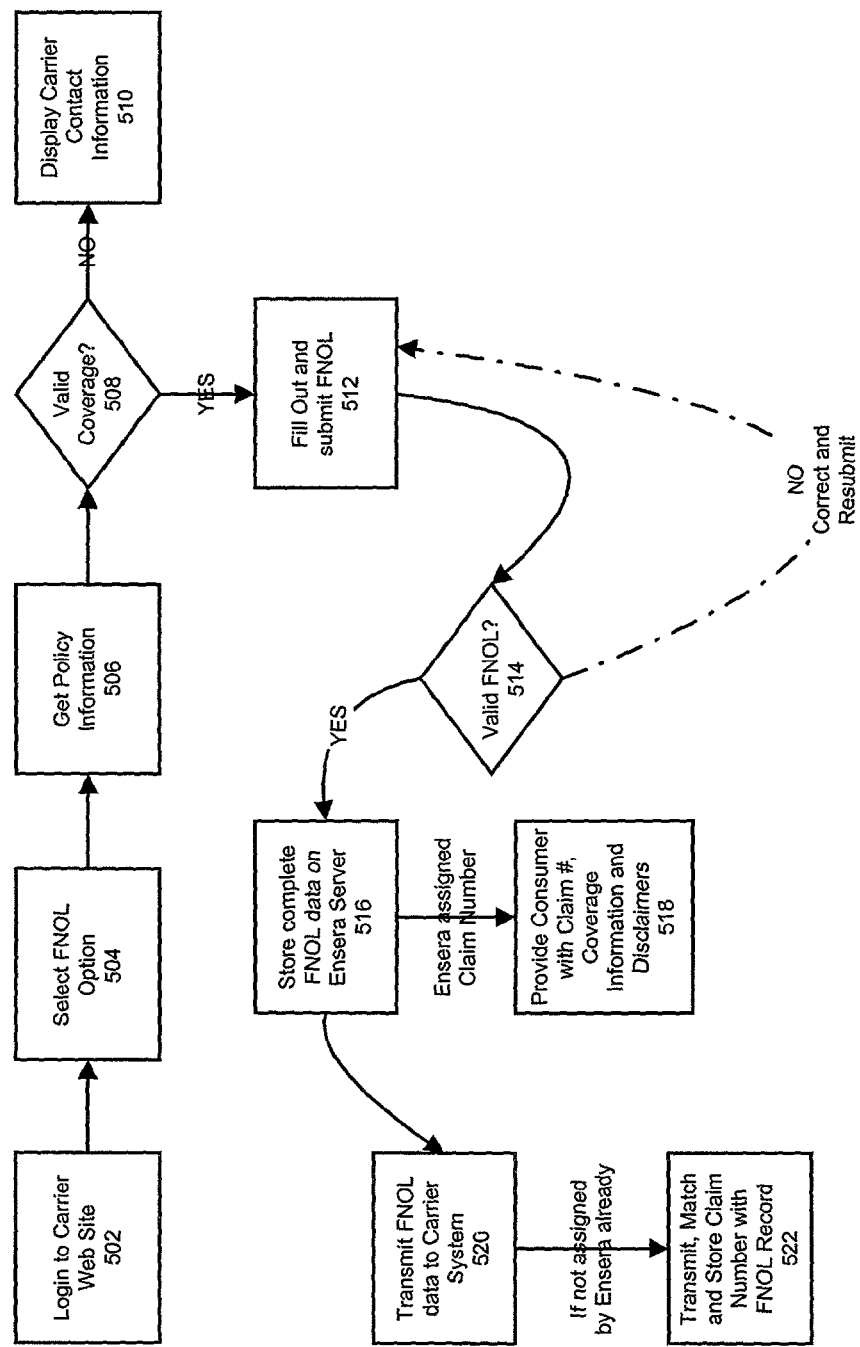
FIG. 5A is a flow diagram of the process of capturing initial claim data.
Figure 5B:
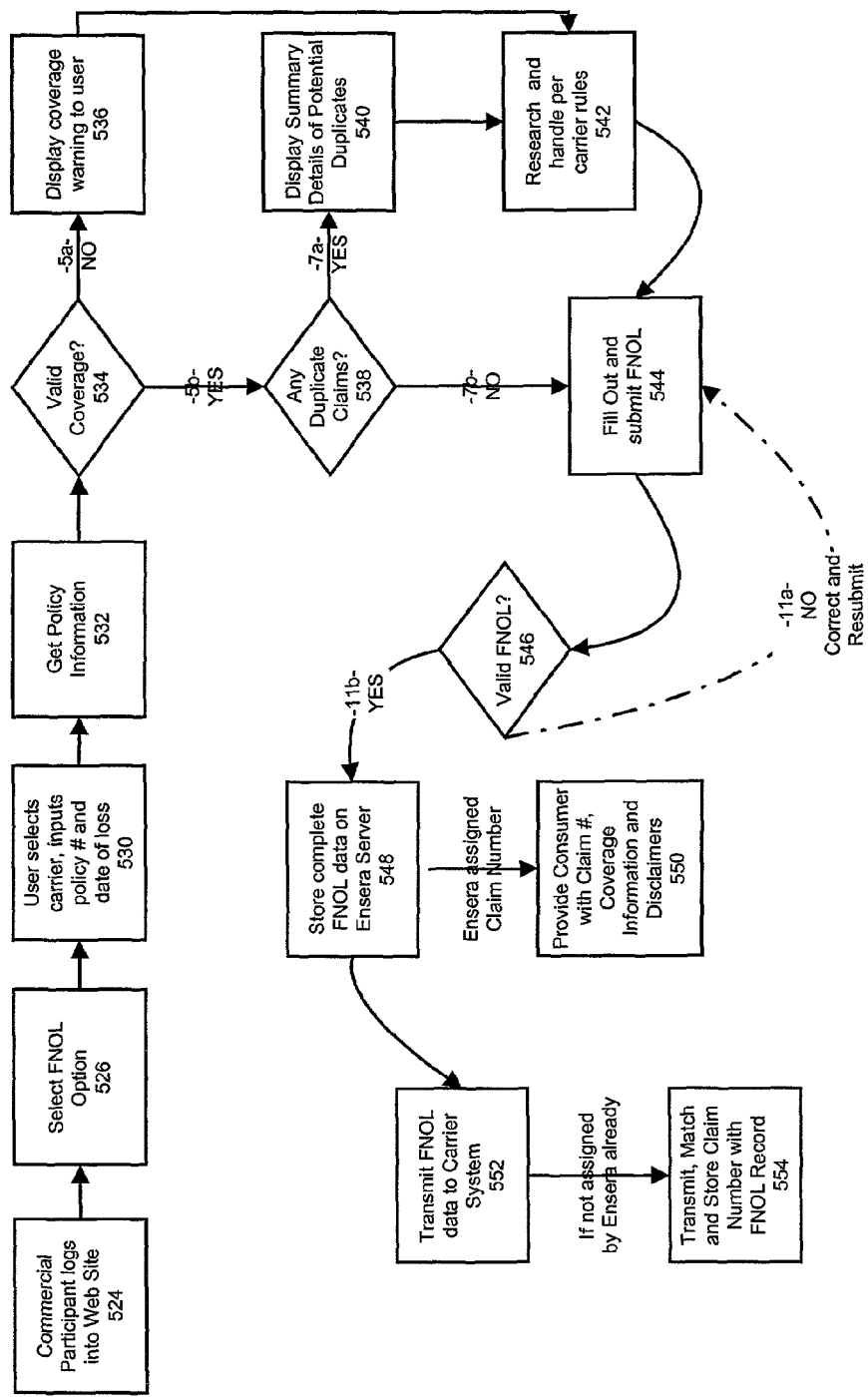
Figure 7A:
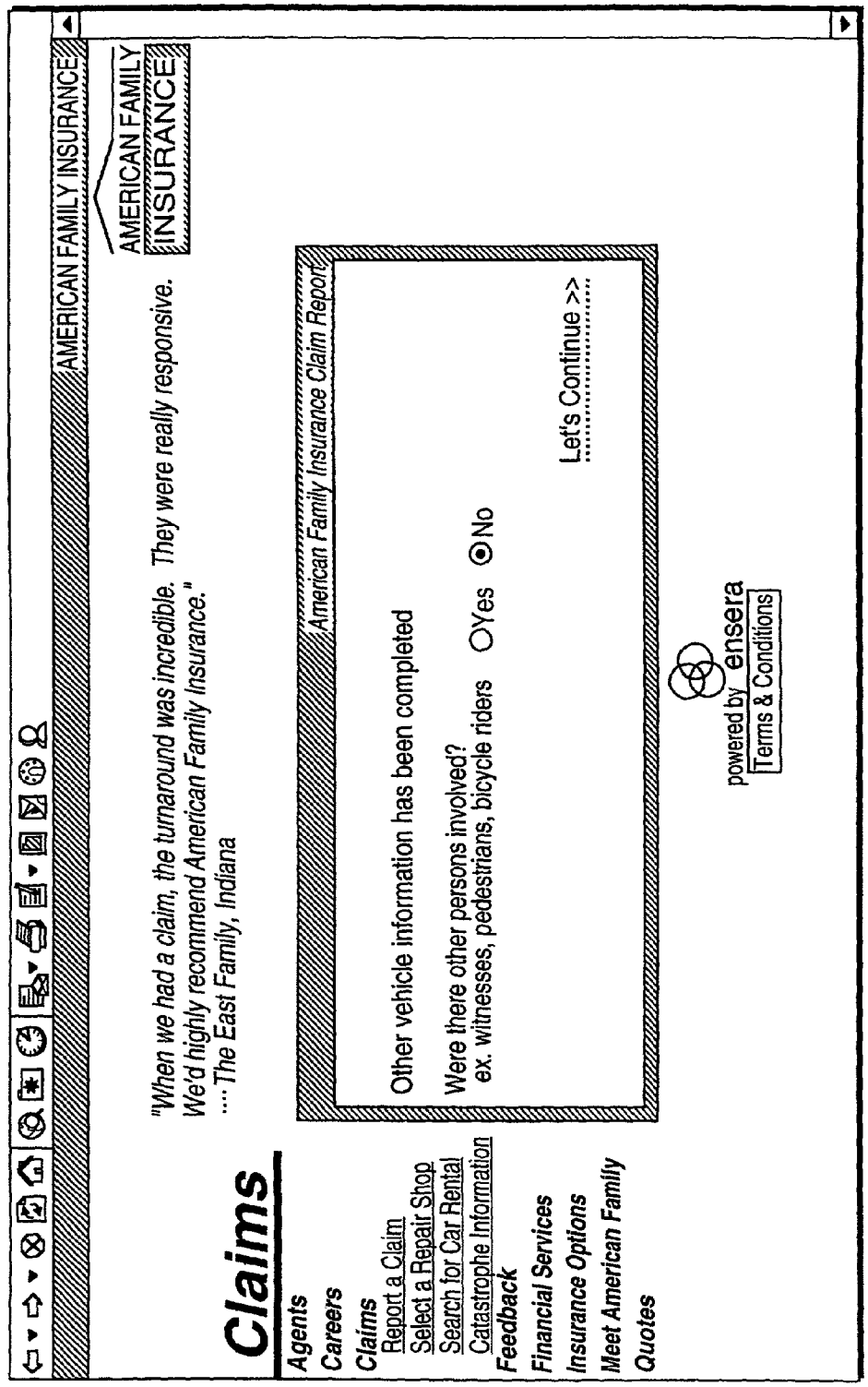
Figure 9A:
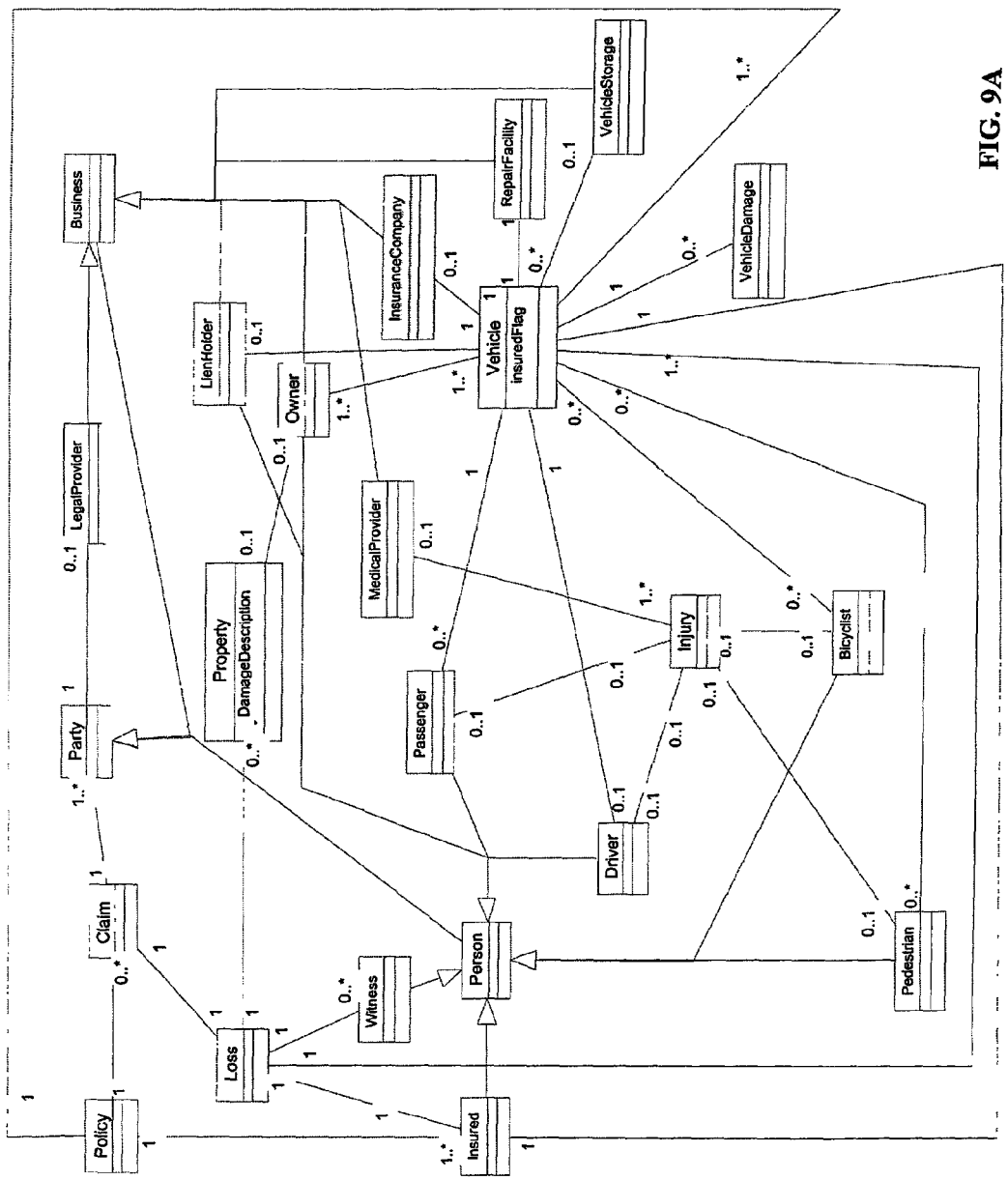
Figure 10:
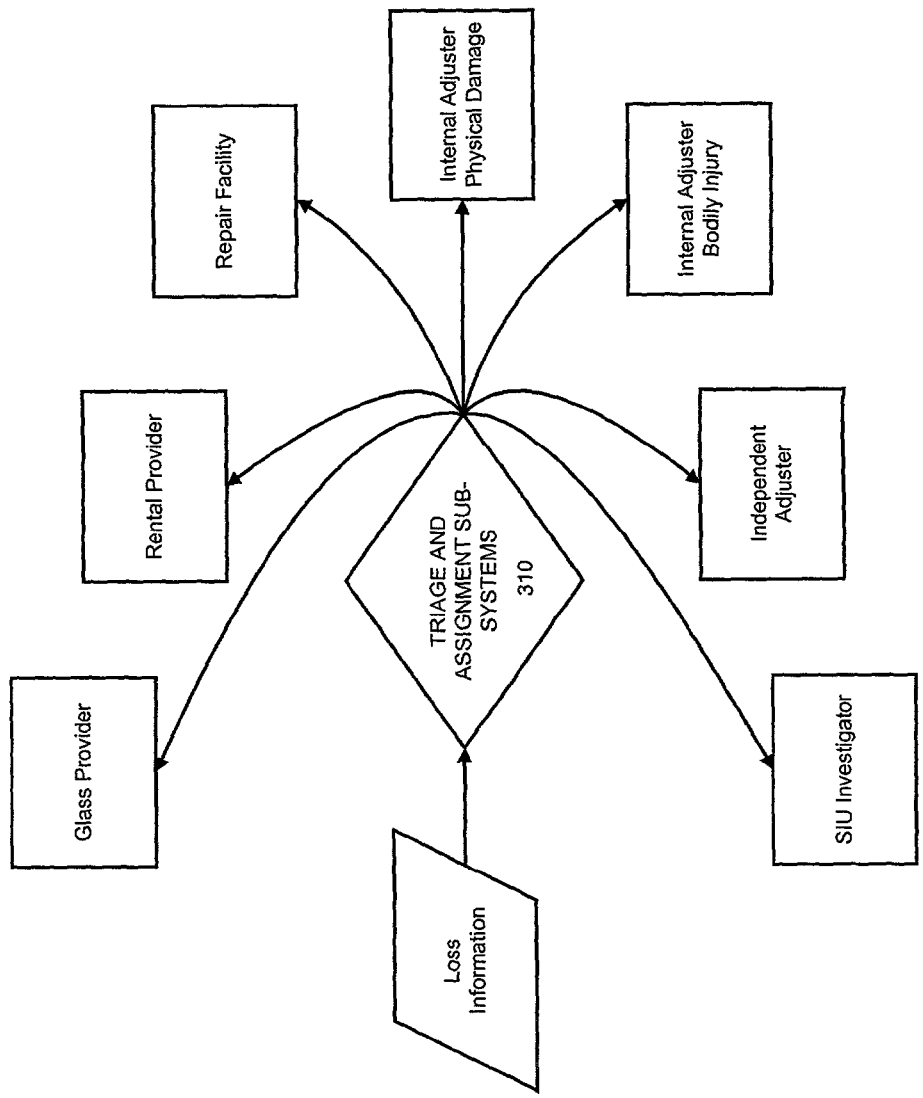
Figure 11:
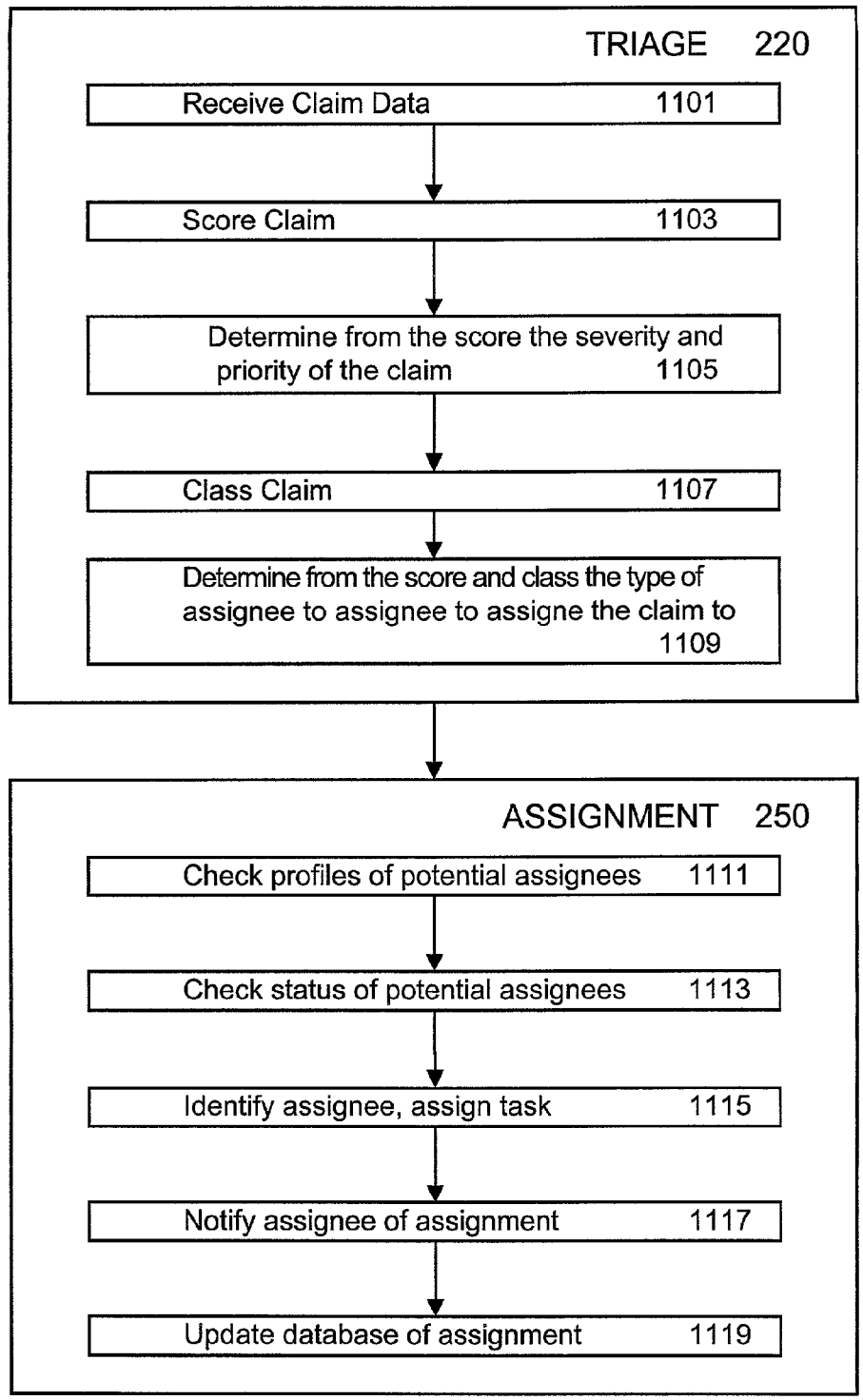
Figure 12A:
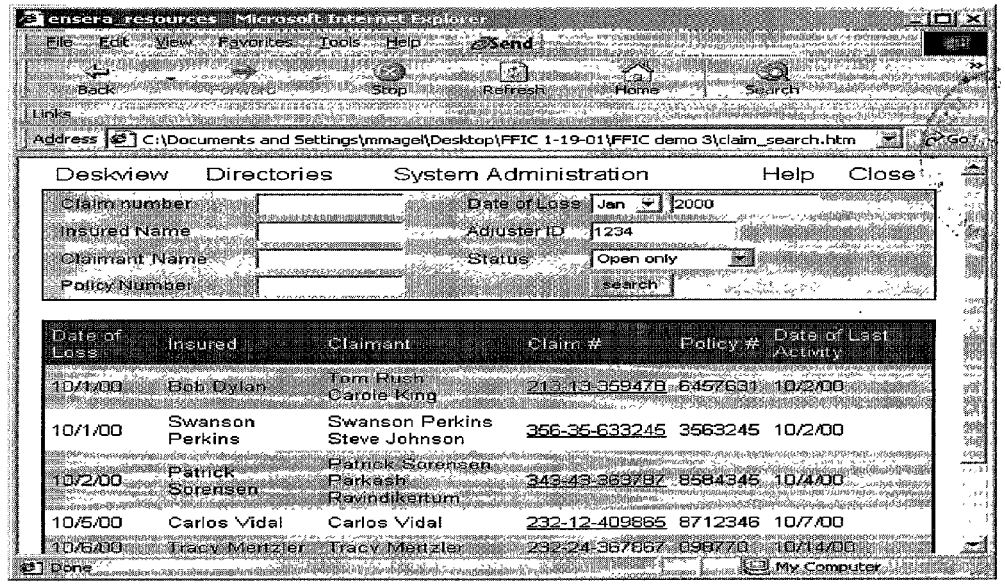
Figure 12B:
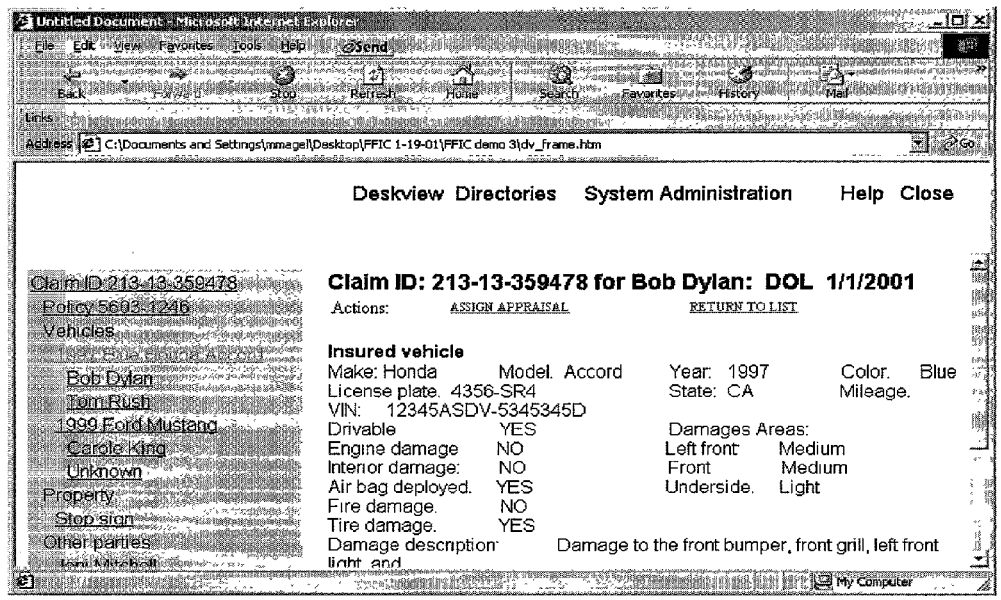
Figure 12C:
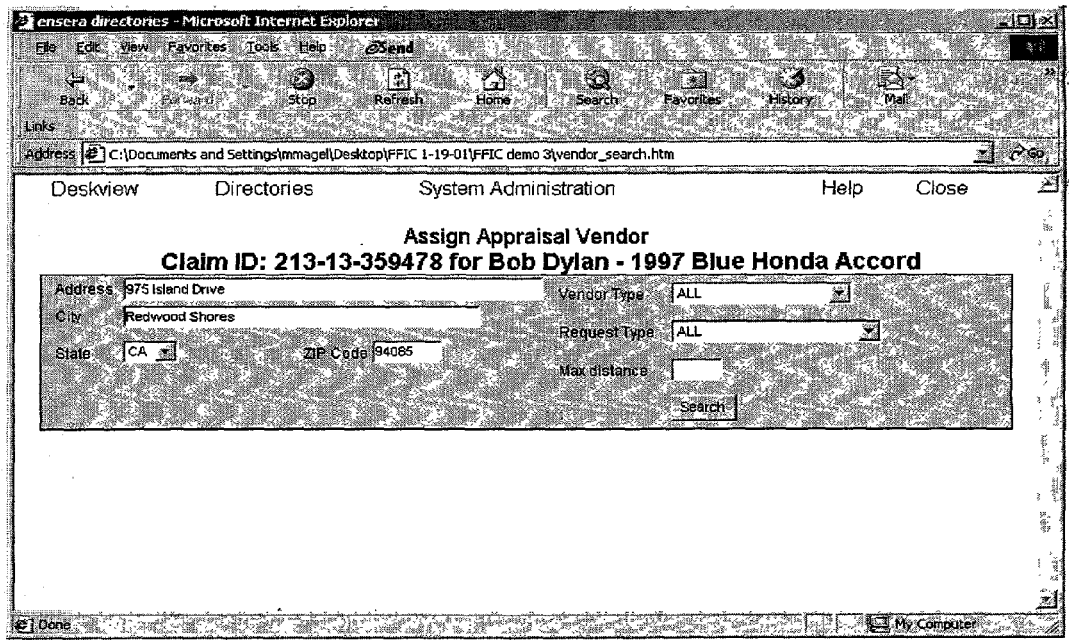
Figure 12D:
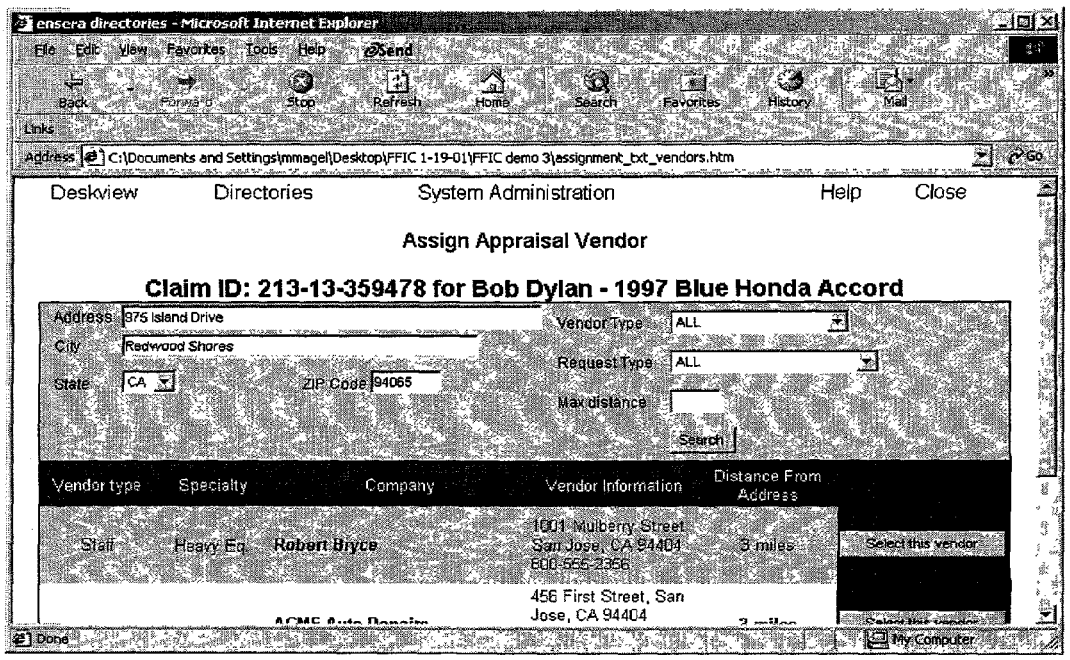
Figure 12E:
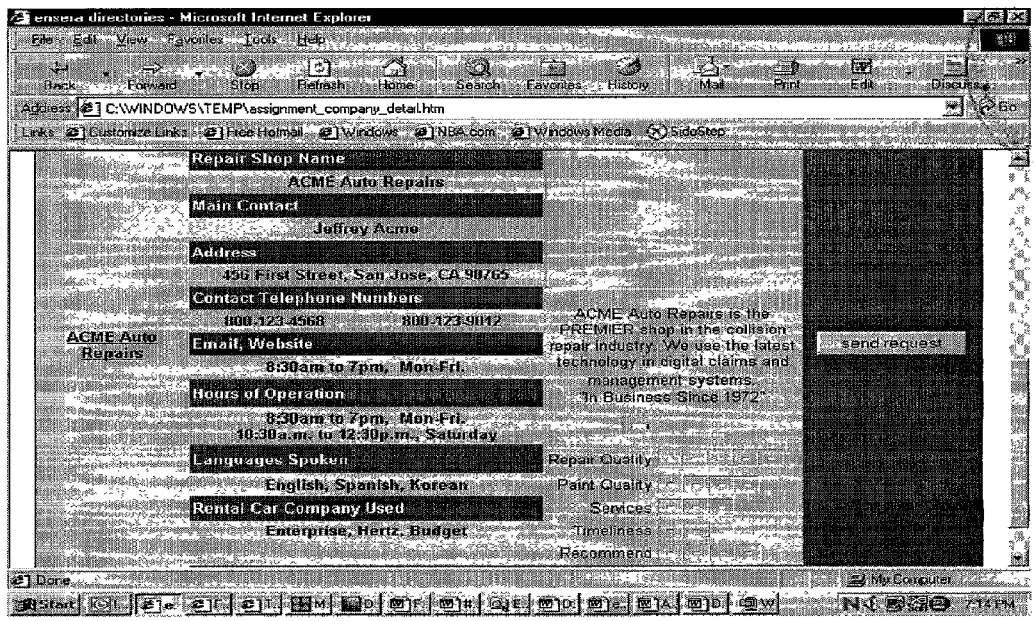
Figure 12F:
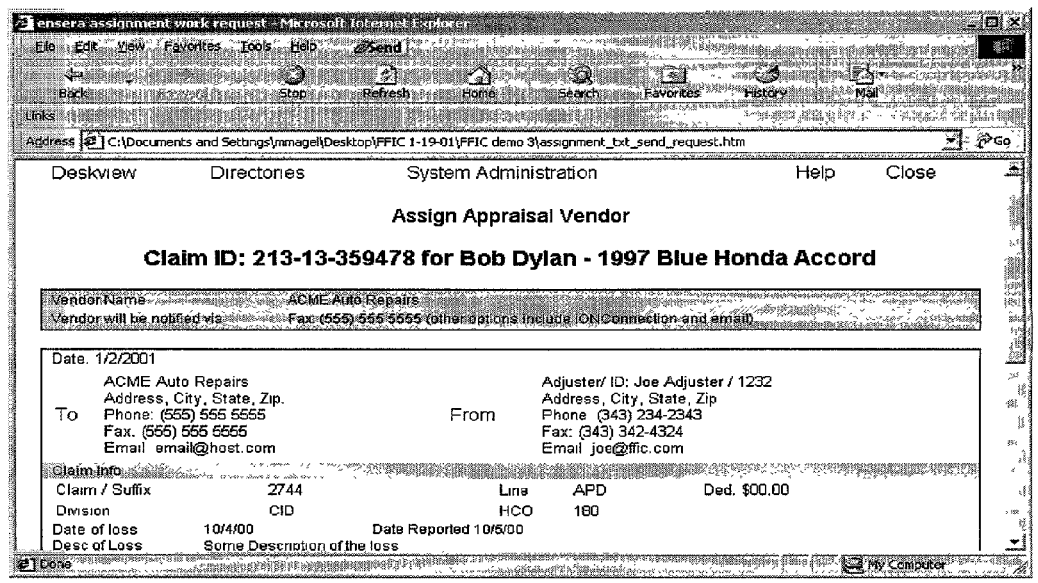
Figure 15:
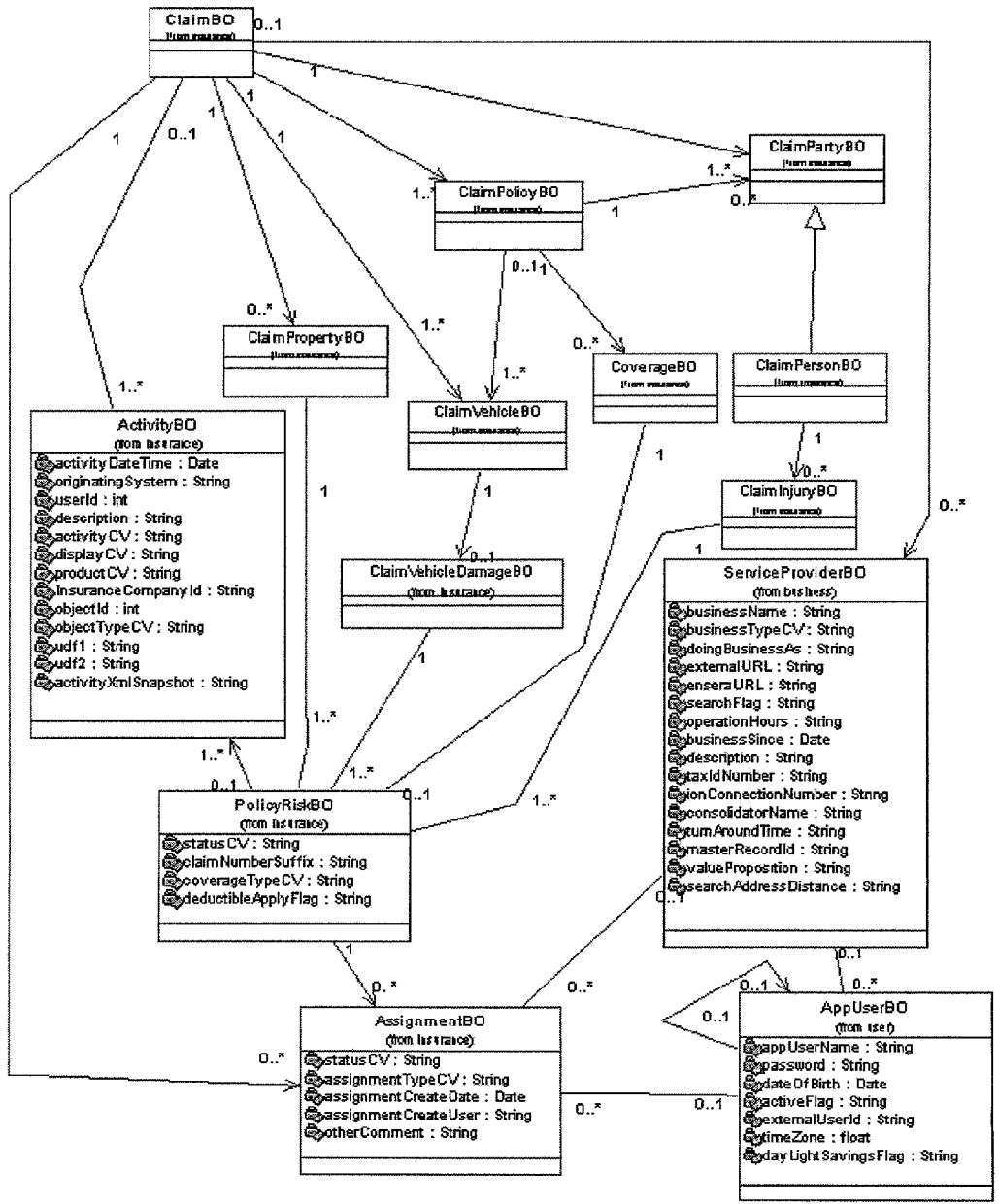
Figure 16:
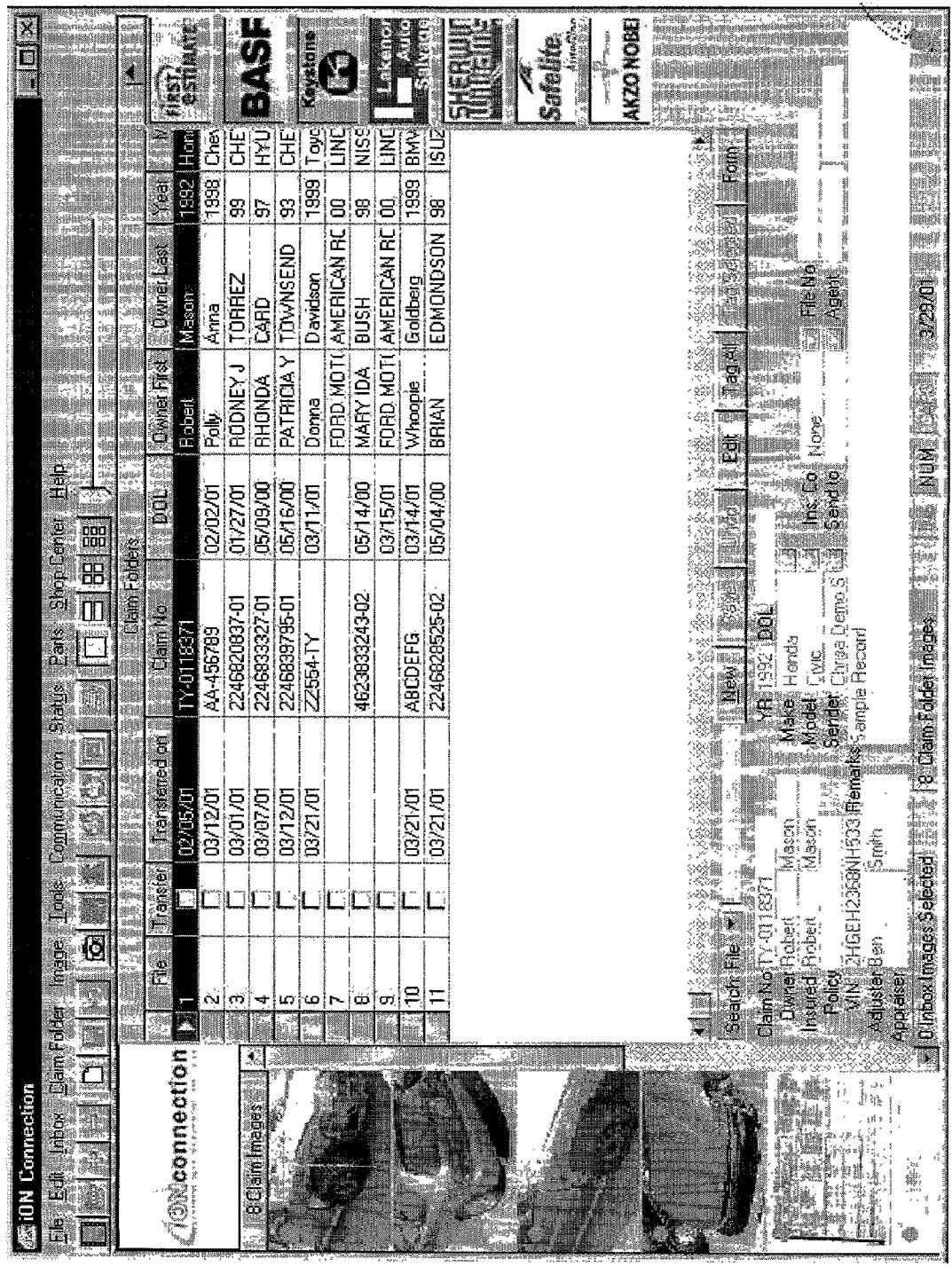
Figure 17:
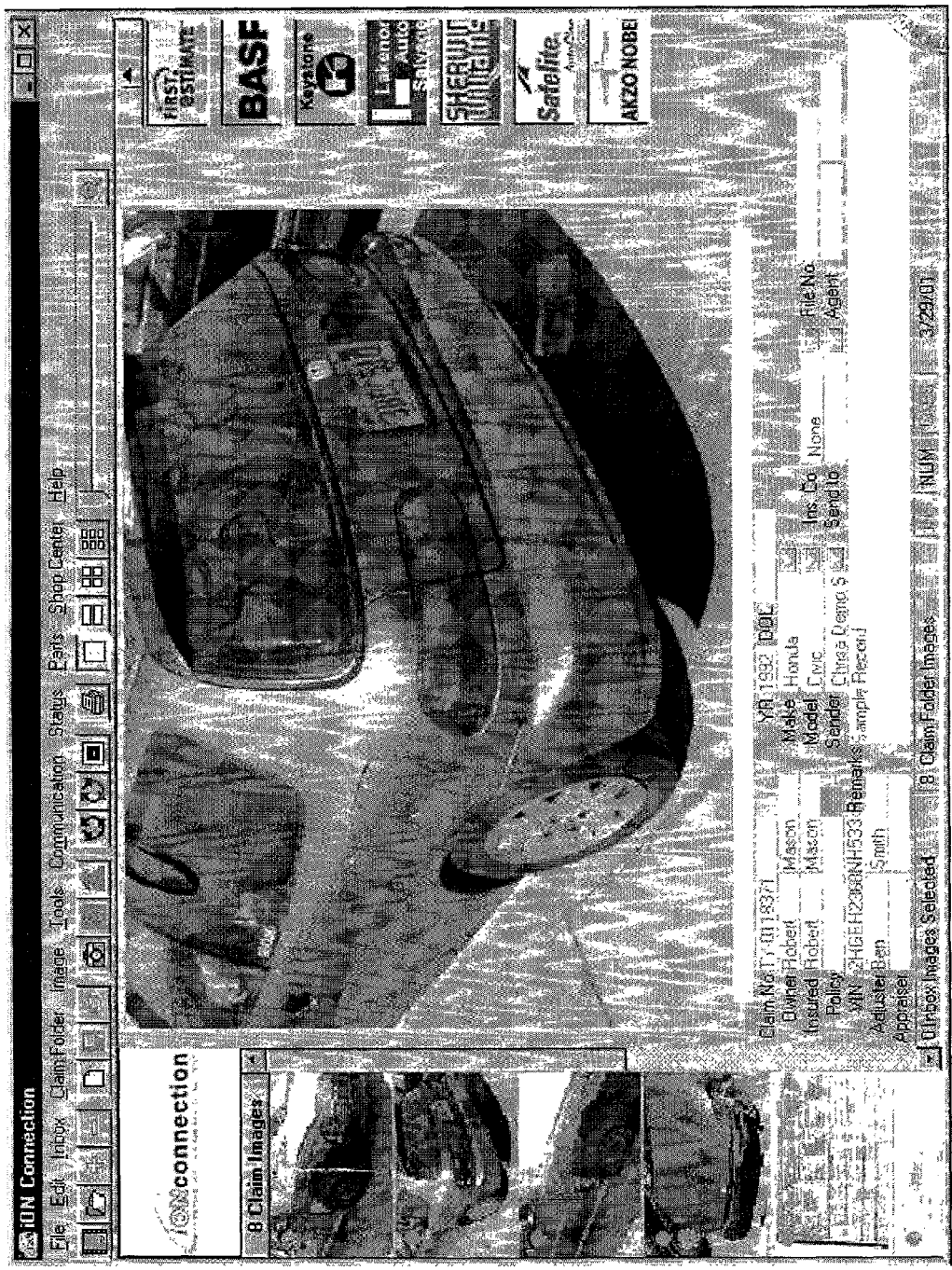
Figure 18:
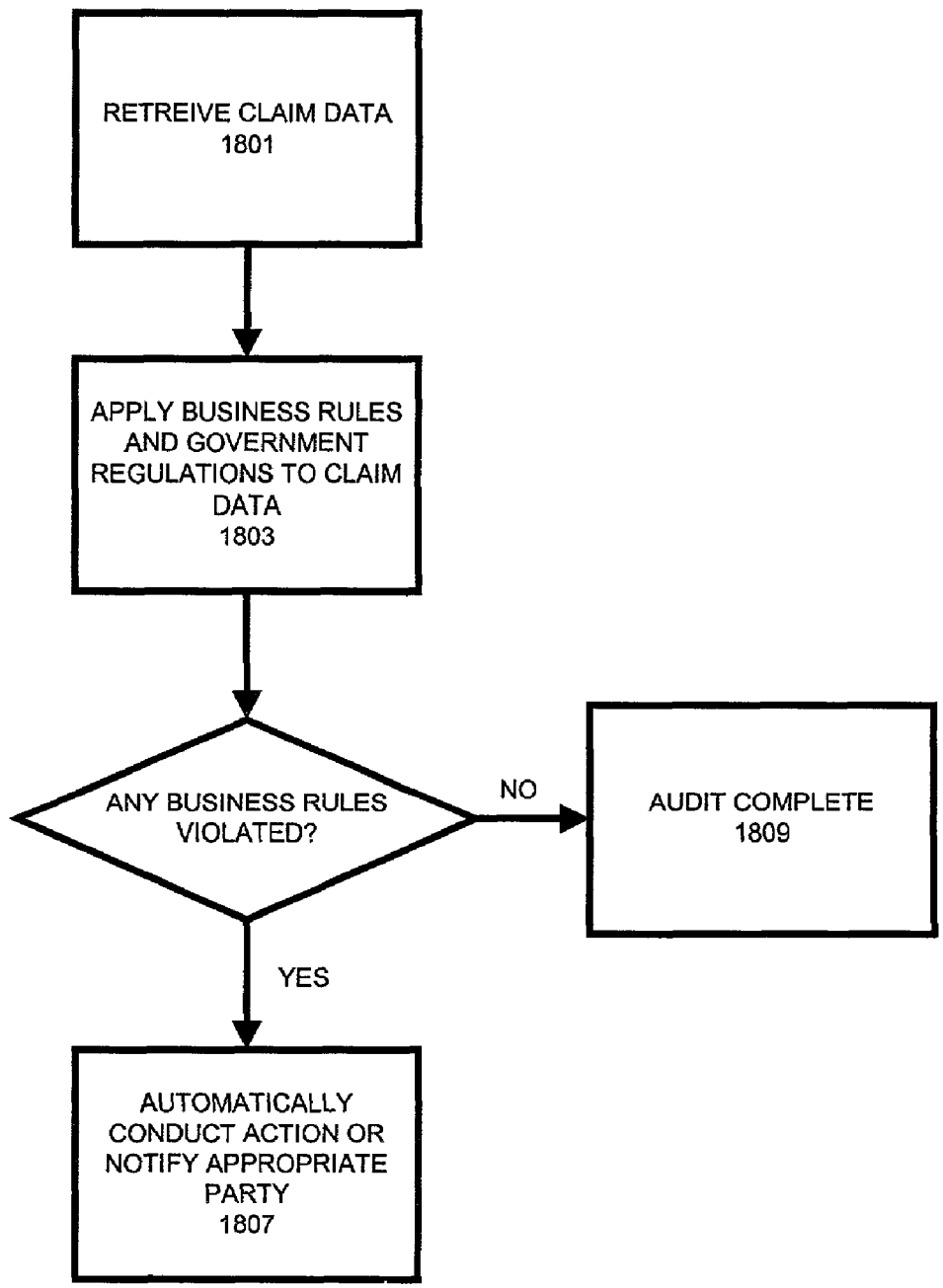
Figure 19:
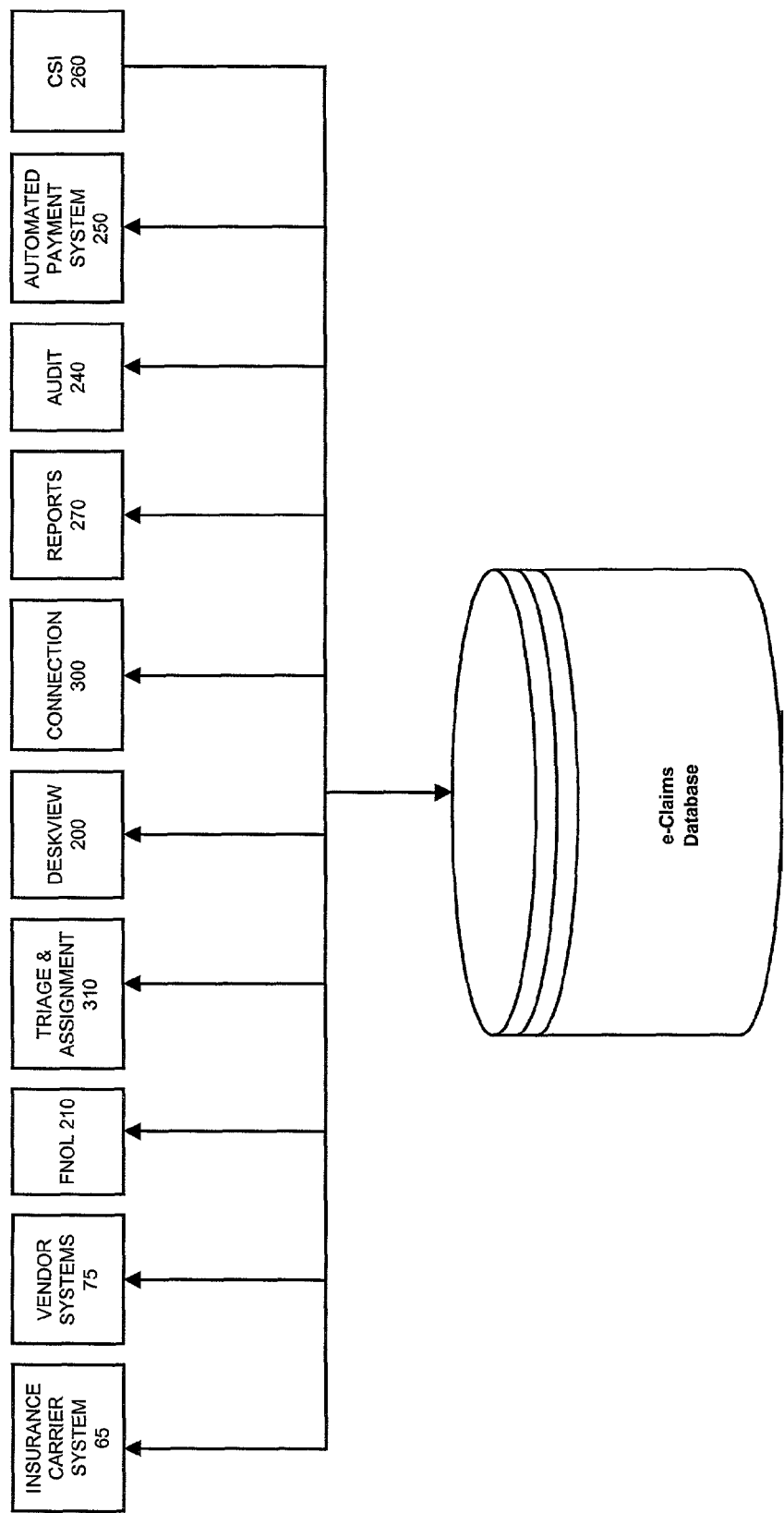
Figure 20:
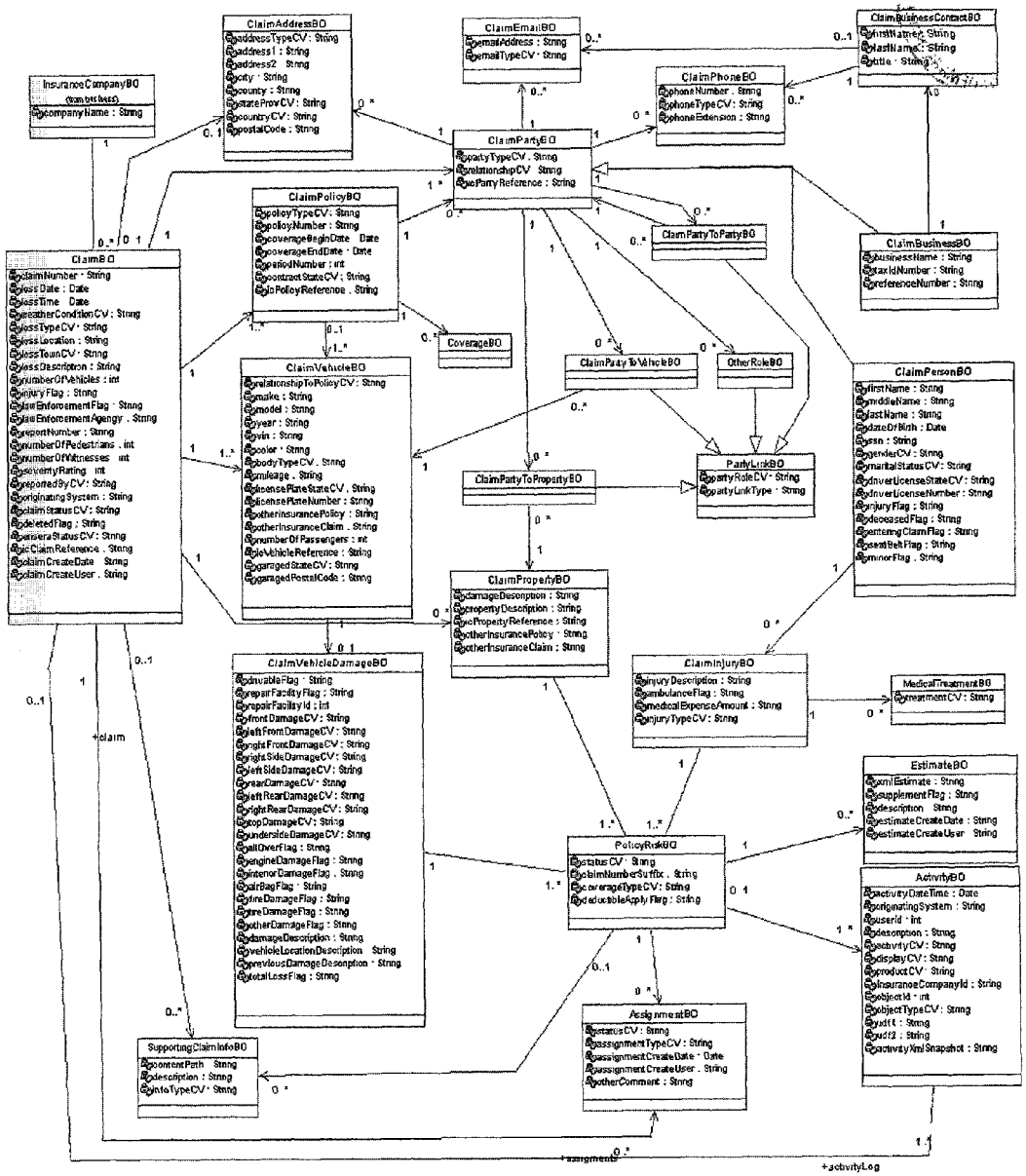
Figure 21:
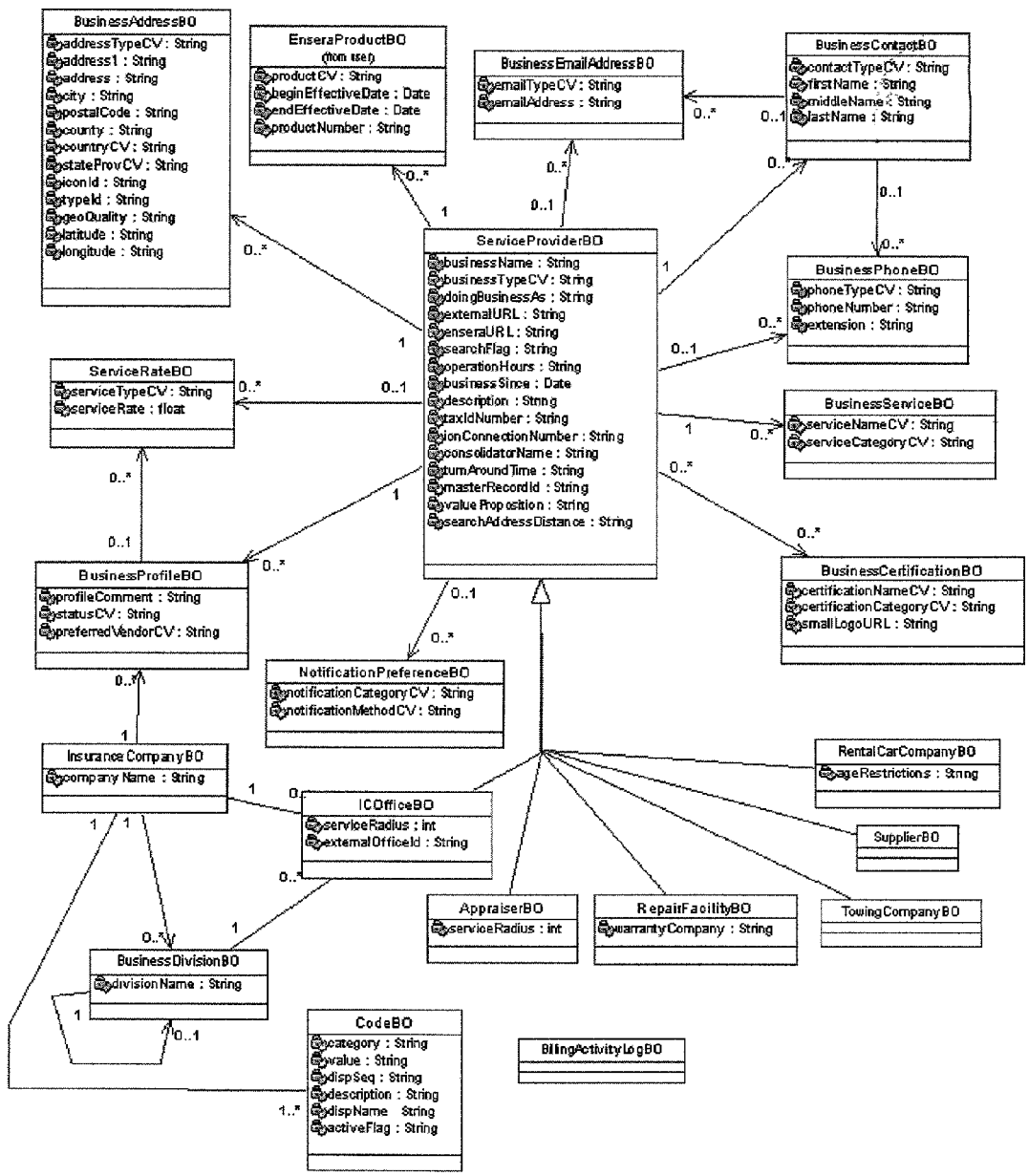
Figure 22:
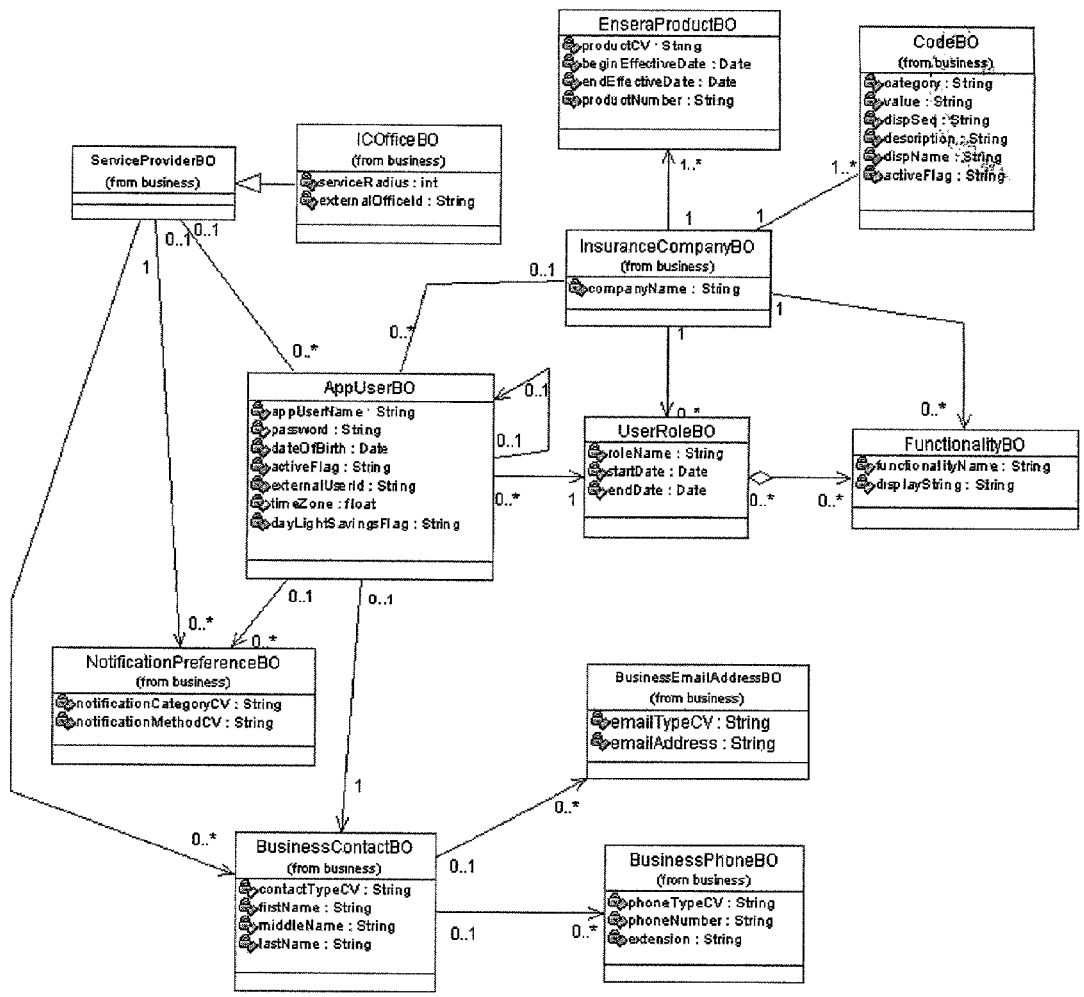
Figure 23:
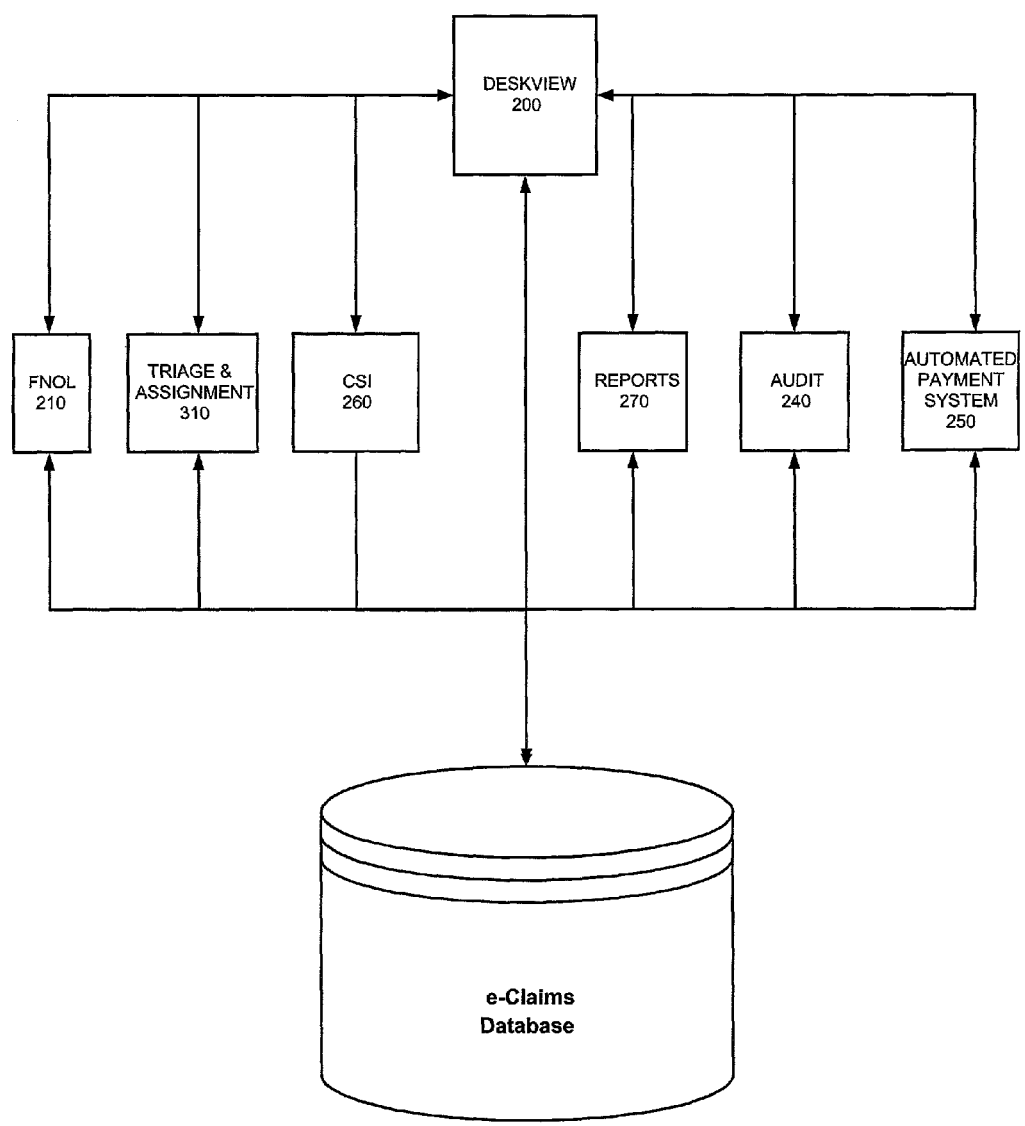
Figure 24A:
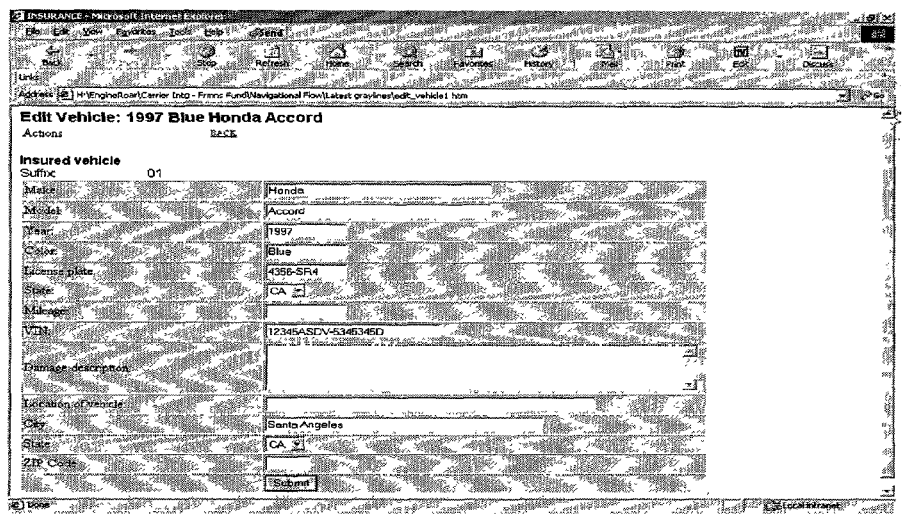
Figure 24B:
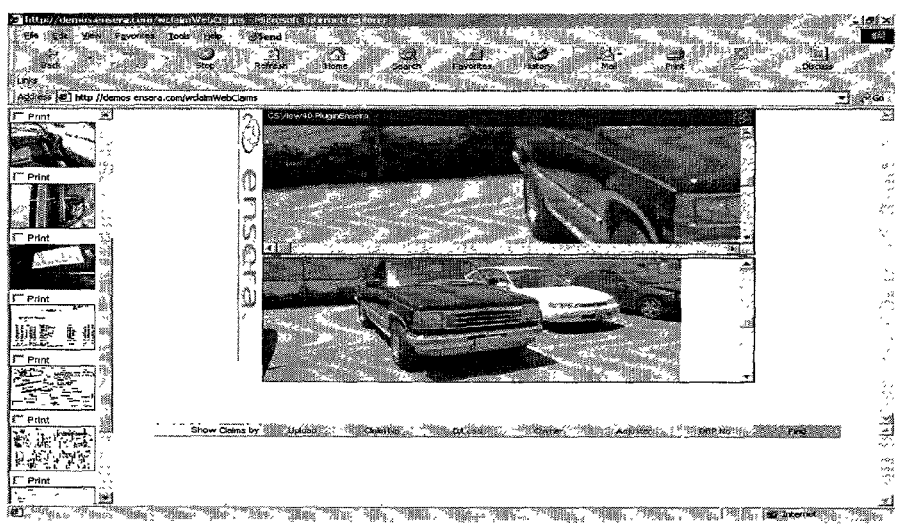
Figure 25:
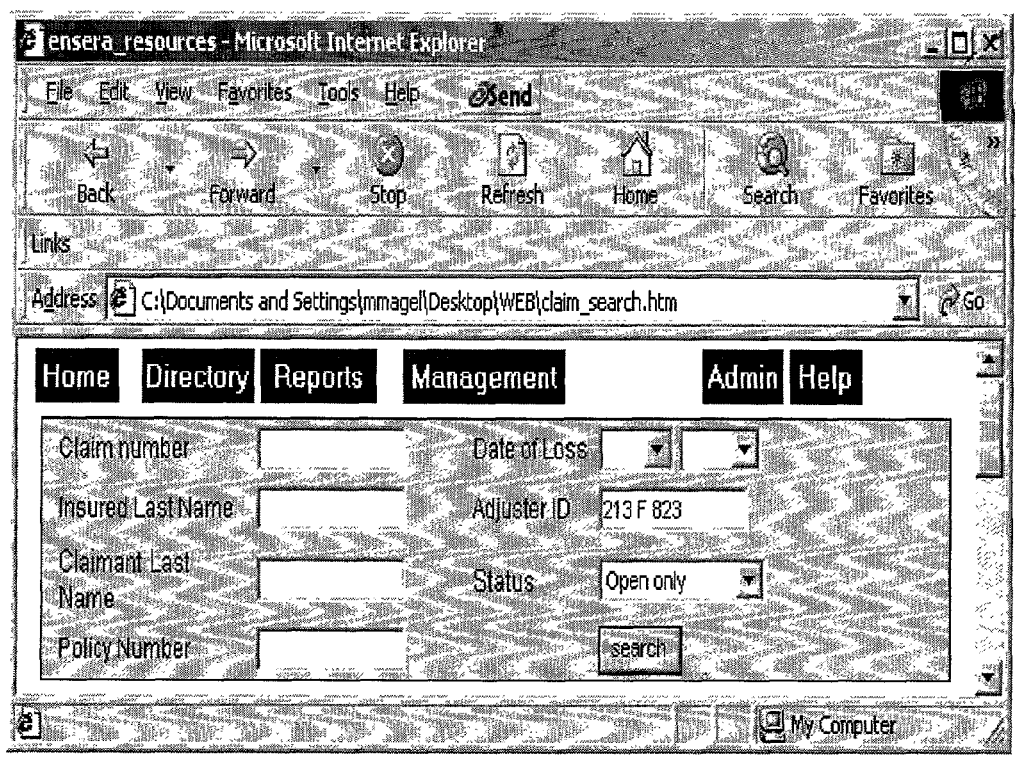
Figure 26:
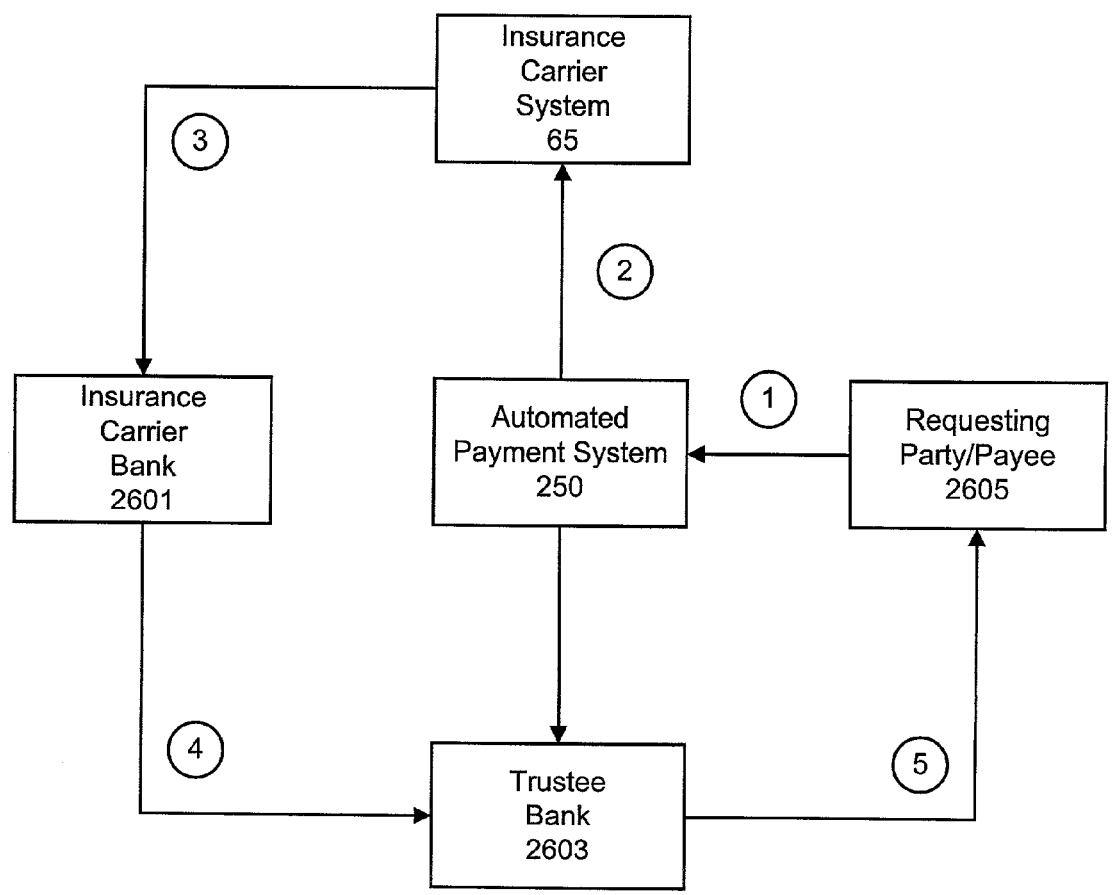
Figure 27:
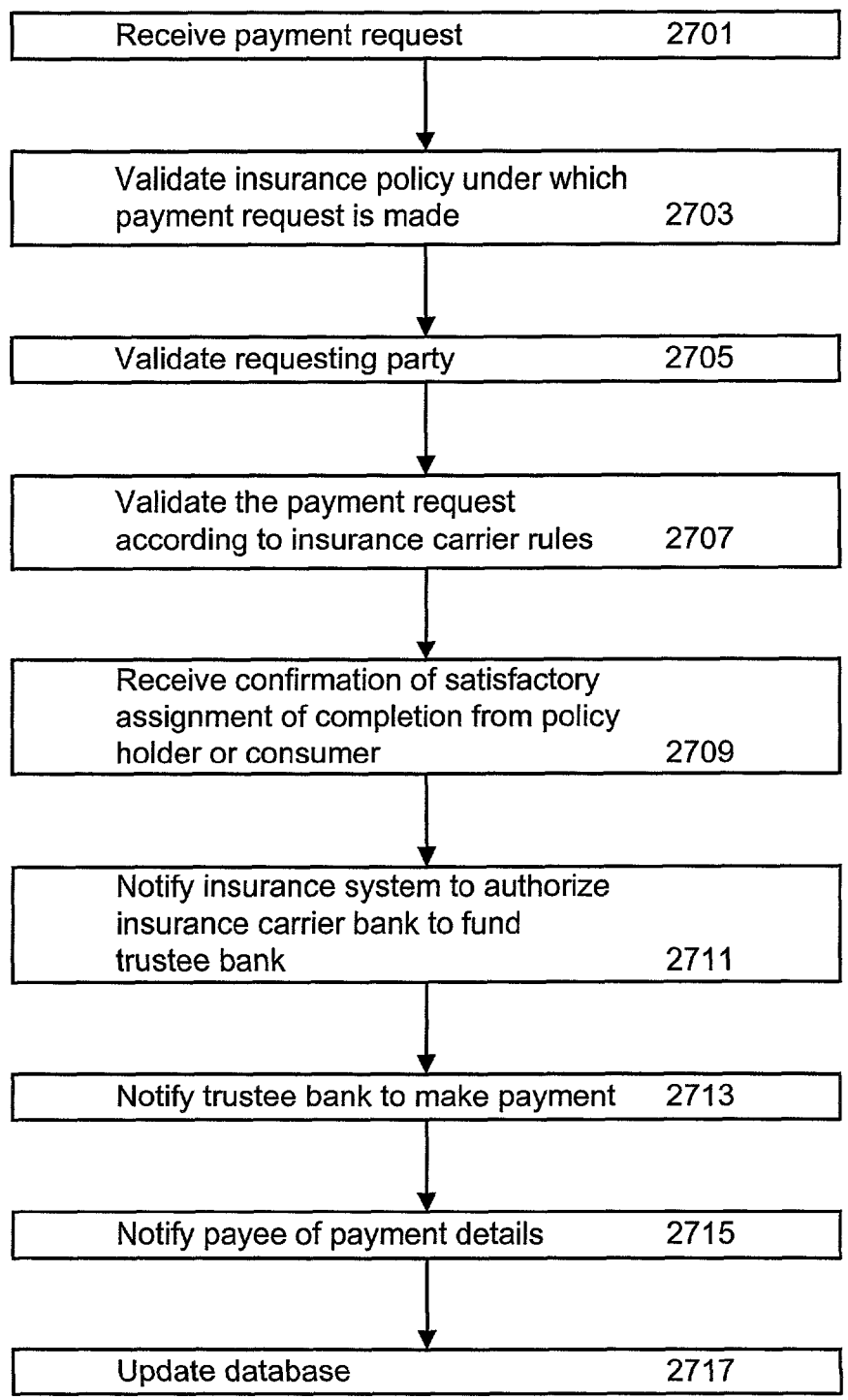
Figure 28:
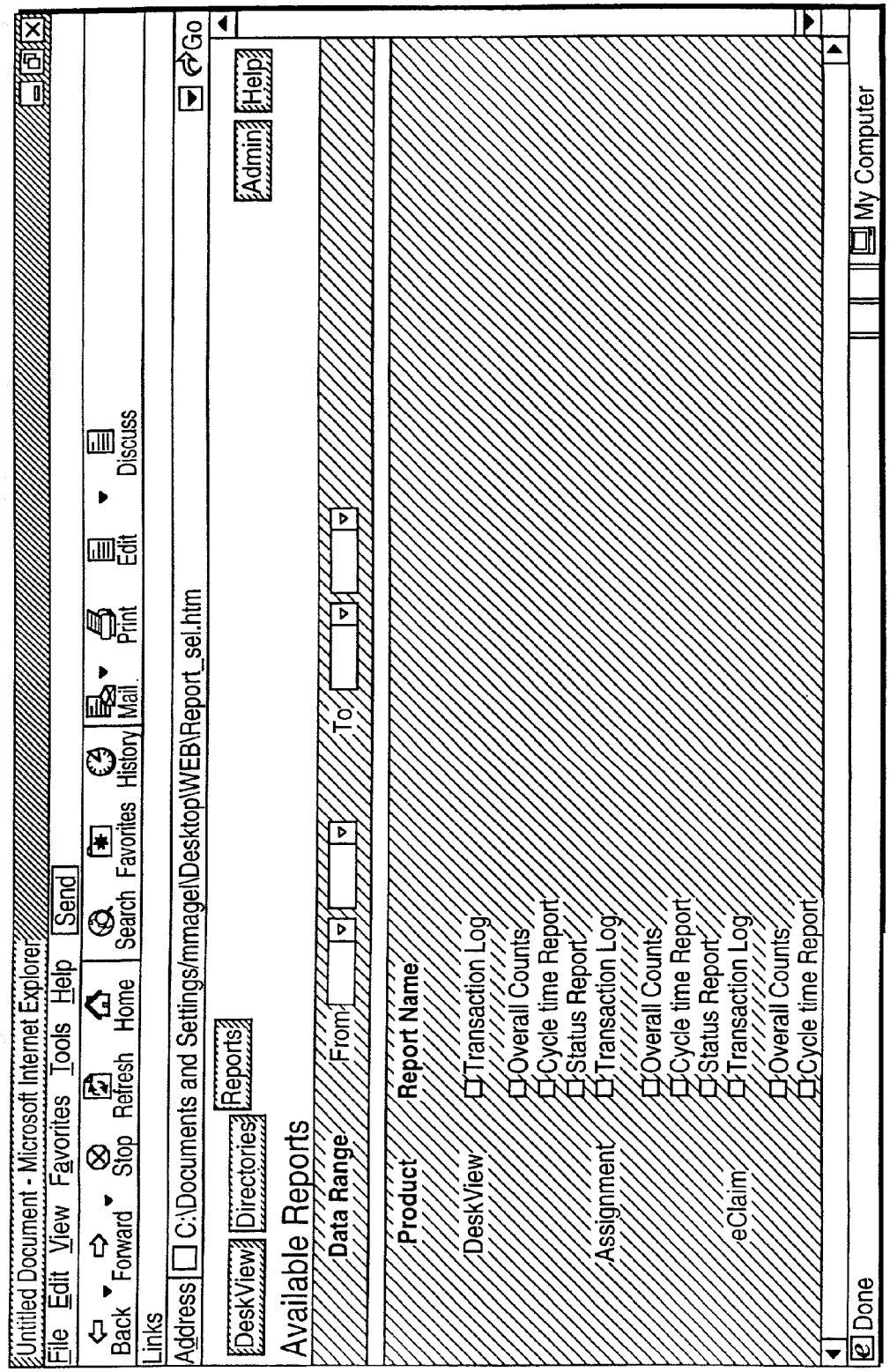

FIG. 5B a flow diagram of a commercial participant's process of capturing initial claim data;

FIG. 6 is a table containing examples of the question groups and particular question fields a user may be asked to complete in a process of capturing initial claim data;

FIG. 7A is a screenshot of a gateway question presented to a user in an initial claim capture system;

FIG. 7B is a screenshot of questions presented subsequent and in response to an answer to a gateway question in an initial claim capture system;

FIG. 8 is a screenshot of an interactive user interface, which allows a user to represent a damaged vehicle through varying the degree and location of damage to a representative vehicle graphic;

FIG. 9A is a business object model for a first notice of loss sub-system;

FIG. 9B are the object attributes of the objects of the business object model of FIG. 9A;

FIG. 10 is a block diagram of the types of assignees the triage and assignment sub-systems can make assignments to;

FIG. 11 is a flow diagram of a process of triage and assignment in accordance with the present invention;

FIG. 12A is a screen shot of a list of claims;

FIG. 12B is a screen shot of the details of a claim;

FIG. 12C is a screen shot of a vendor search function that is driven by user selected criteria;

FIG. 12D is a screen shot of a list of vendors;

FIG. 12E is a screen shot of a vendor's details;

FIG. 12F is a screen shot of a record of assignment;

FIG. 13 is a chart that represents data fields received or retrieved by the triage and assignment sub-systems;

FIG. 14 is a list of data field and attributes that an assignment sub-system transmits an assignee as part of an assignment;

FIG. 15 is a business object model for an assignment sub-system;

FIG. 16 is a screen shot of a main screen of a vendor connection and assignment management system;

FIG. 17 is a screen shot of a digital photo displayed through a Connection system;

FIG. 18 is a flow diagram of an audit process;

FIG. 19 is a block diagram of the systems and sub-systems that transmit, store, or retrieve claim data from an electron claim file repository;

FIG. 20 is a business object model for an electronic claim file repository;

FIG. 21 is a business object model for an electronic claim file repository;

FIG. 22 is a business object model for an electronic claim file repository;

FIG. 23 is a block diagram of the systems, sub-systems and database that interface with a user interface and claim manager sub-system;

FIG. 24A is a screenshot of a user interface and claim management system viewing and editing claim data feature;

FIG. 24B is a screenshot of a user interface and claim management system viewing and editing digital images feature;

FIG. 25 is a screenshot of a user interface and claim management system navigation feature;

FIG. 26 is a block diagram of the participants in an automated payment process;

FIG. 27 is a flow diagram of a process of automating claim payments;

FIG. 28 is a screenshot of an example of canned or standard reports generated by a reporting sub-system;

FIG. 29 is a screenshot of a report generated by a reporting sub-system that is indexed by region and by the states within each region;

FIG. 30 is a screen shot of date elements generated by a report sub-system exported to a Microsoft Excel software program.

V. DETAILED DESCRIPTION OF PREFERRED EMBODIMENTS

1. General Overview

The present invention provides system and methods of administering, tracking and managing claims processing. More particularly, the system and method processes, tracks and releases funds for claims made upon insurance policies and similar risk shifting mechanisms including but not limited to self insurance, indemnity provisions and surety and performance bonds.

a. System Architecture

Figure 1:
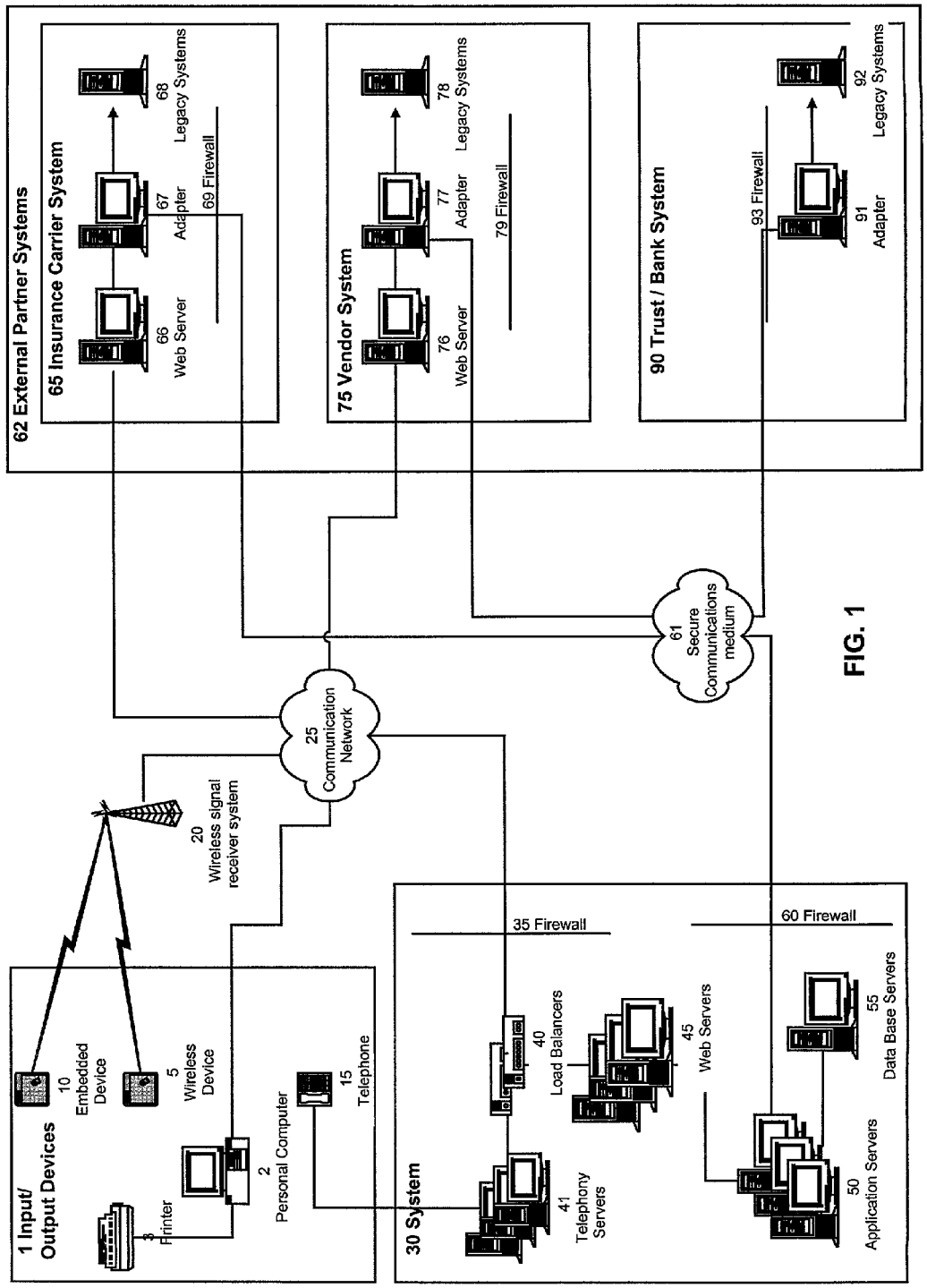
FIG. 1 is a block diagram of physical communication components and system architecture of a system of administering, tracking and managing insurance claim processing according to the invention.

A system architecture for practicing the methods of the invention is shown in FIG. 1. The elements depicted on FIG. 1 include the computer systems, network connections and other communication devices that constitute the preferred physical embodiments to implement the described embodiment of the invention. It is understood, however, that the system is not limited to the mentioned devices and additional and alternative devices may be supported by the system.

As shown in FIG. 1, a user (e.g., an insurance policy holder, a consumer claimant, an insurance carrier internal adjuster, an independent adjuster, a rental provider, or a repair facility) interacts with the system 30 through input/output devices 1 ("I/O devices"). These I/O devices include but are not limited to personal computer 2, wireless device 5, embedded device 10 and telephone 15.

Personal computer 2 may be an IBM compatible computer, a Macintosh computer or any other system capable of running Client Software such as a Web Browser, although other client software may also be used as appropriate to the system. Personal computer 2 preferably runs a Web Browser such as Netscape's Navigator or Microsoft's Internet Explorer to communicate information to and from system 30. Personal computer 2 is connected to a communication network 25, such as the Internet, using a fast connection, such as DSL, cable modem, wireless, modem, etc. Personal computer 2 preferably includes an output device, such as a monitor or other display and a speaker or printer (i.e., printer device 3). Personal computer 2 also includes an input such as a keyboard or pointing device (e.g., mouse, track ball, pen device, microphone, joy stick, game pad, satellite dish, scanner or the like) or both to enable information to be input to the system.

Wireless device 5 may include but is not limited to a communication device, including a telecommunication device or wireless Internet devices that a user carries and uses to enter and obtain information pertinent to the process. The wireless infrastructure that connects the device with the communication network 25 uses existing wireless signal receiving systems 20 such as, for example, the communication methods used by 3Com's Palm Pilot VII.

Embedded device 10 may include but is not limited to a communication device embedded in the insured object, such as a vehicle or a home, that is capable of detecting, recording and transmitting to system 30 the information on the casualty that initiates a claim. Embedded device 10 preferably communicates the casualty information through wireless signal receiving systems 20 using a wireless device. Embedded device 10 may also transmit the casualty information through other communication lines such as telephone 15.

Personal computer 2, wireless device 5 and embedded device 10 transmit requests and responses to system 30 through communication network 25 using standard protocols, such as XML, HTTP or the like. It is understood, however, that the system 30 is not limited to the mentioned standard protocols and alternative standard protocols may be supported by the system 30.

When telephone 15 is used as an interface to system 30, telephone 15 transmits a number to telephony server 41. Telephony server 41 includes the necessary software to recognize speech and convert it to a standard text format such as XML or the like that can be sent to Web server 45. Telephony server 41 can also be outside of system 30.

The messages sent and received by the I/O devices 1 preferably use standard protocols when they are received by load balancers 40 and web servers 45. The preferred standard protocols include but are not limited to HTTP and XML protocols which are capable of being encrypted by Secure Socket Layer (SSL), Virtual Network Protocol (VPN) or similar encryption systems.

Preferably, the computer systems in system 30 offer the highest performance, scalability and reliability. In one embodiment, the platform used is Sun Microsystems hardware running the Solaris operating system.

Standard encryption mechanisms are used to ensure the confidentiality of data. When confidential data is transported between I/O devices 1 and system 30 or between external partner systems 62 and system 30, encryption systems (i.e., SSL or VPN or the like) may be used to protect the data.

Firewalls 35, 60, 69, 79 and 93 ("firewalls") are specialized hardware and/or software components that filter requests traveling in and out of systems 30, 65, 75 and 90 respectively. Certain input/output devices can also include firewalls (not shown).

Firewall 35 is configured to accept only certain user request types, preventing undesired requests from being forwarded from communication network 25 to system 30.

Web servers 45, 66 and 76 include, but are not limited to, servers running a Web server application. In one embodiment, such servers are provided by Netscape Enterprise, Apache software.

Firewall 35 sends requests to load balancer 40, which distributes such requests to one of the Web servers 45 in a Web Server farm. Web server 45 then forwards the request to application server 50 where a software application performs the appropriate business logic to satisfy the request. As part of the required business logic, the application accesses data stored in database server 55.

Database server 55 runs a relational database management system (RDBMS). In one embodiment, the RDMS software Oracle 8i is used. The RDBMS software running in server 55 manipulates the data and sends the appropriate information to application server 50.

Application server 50 may be, but is not limited to, a Java based server providing scalability and reliability to the application. The application runs on top of Application Server Software, in one embodiment, BEA's WebLogic software.

The information required to complete the response to the request may not only require data from database server 55, but also data from one of the external partner systems 62. In one embodiment, the application server 50 sends a request to one of the external partner systems 62 via a secure communications medium 61, such as, privately leased lines or the like. These external partner systems 62 include insurance carrier system 65 or systems, vendor system 75 or systems, trustee bank system 90 or systems. A preferred format for the sent request is standard XML format, although other formats may be supported by system 30. A computer running the Adapter software running in Systems 67, 77, 86 or 91 translates the XML request to the format required by the insurer's system, such as Legacy systems 68, 78 or 92 Once legacy systems 68, 78 or 92, respectively retrieve or update the data inside their data stores, information is sent back to adapter 67, 77, 86 or 9, which translates the message to XML and sends it back to application server 50.

Legacy systems 68, 78, 87 or 92 include but are not limited to existing systems that the external partners use to store and process the data they use to perform their business. It is understood that insurer systems other than Legacy systems may be used.

Application server 50 builds a response preferably in HTML or XML formats and sends it back to the I/O devices 1 that initiated the request. For example, in the case of a personal computer 2, the message transmitted to a Web Browser uses the HTML protocol. In the case of the embedded device 10 and wireless device 5, the message is in XML format. In the case of telephone 15, the message is an XML message ready to be converted into audible speech by telephony server 41.

b. Logical Components

Figure 2:
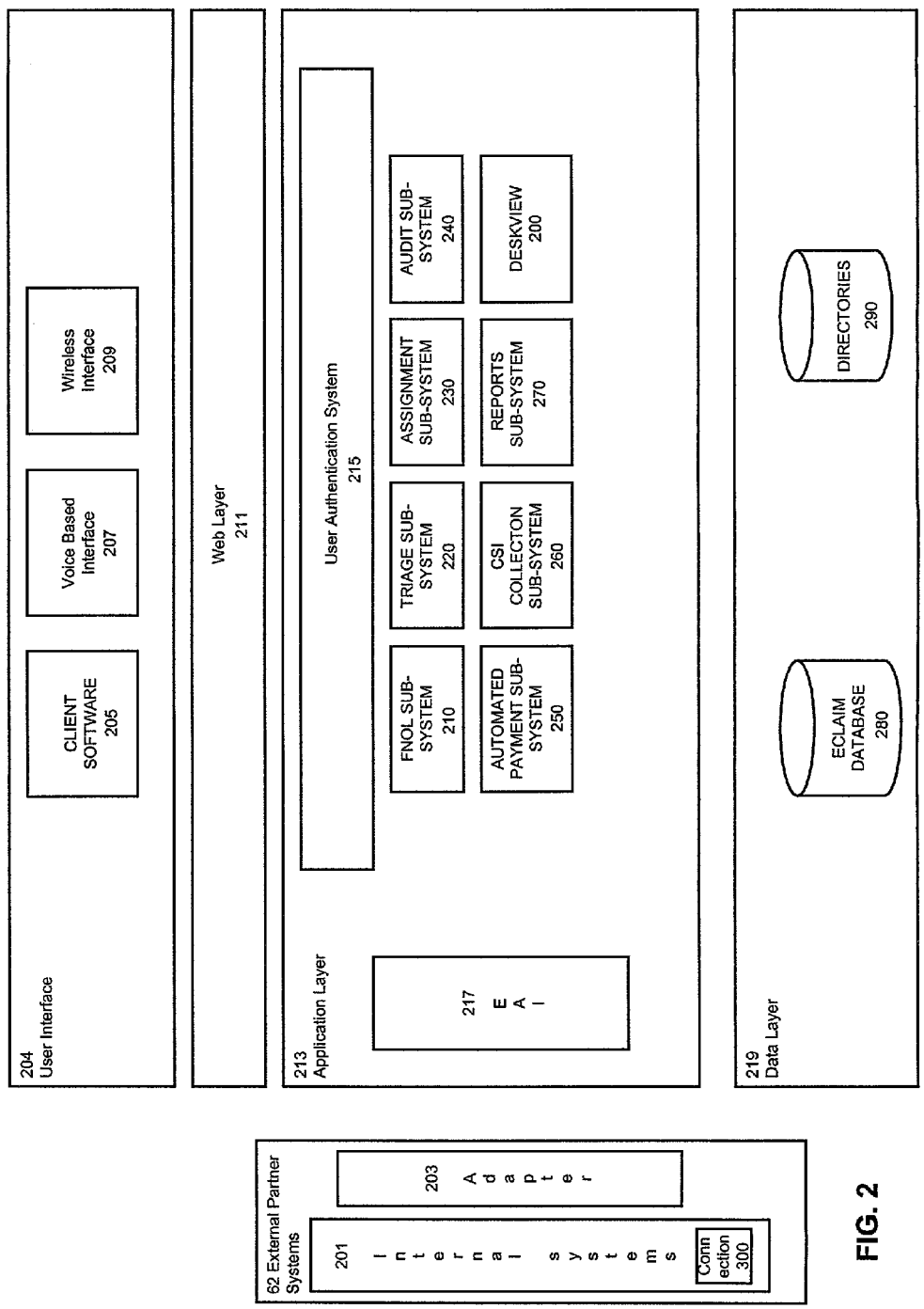
FIG. 2 is a block diagram of logical components that components of a system of administering, tracking and managing insurance claim processing.

FIG. 2 depicts the logical components that comprise the application software used to implement the present invention. In one embodiment, the application is designed using an Object Oriented and multi-tier approach to provide flexibility and ease of integration with external partner systems 62 and also to allow future modifications to the system 30. It should be understood, however, that the system 30 is not limited to the mentioned logical components and additional and alternative logical components may be supported by the system 30.

As shown in FIG. 2, the system 30 uses various user interfaces 204, including client software 205, voice based interface 207 and wireless interface 209. This layer corresponds to the I/O devices 1 in FIG. 1.

The client software 205 runs in a client machine such as personal computer 2 and has all the display and communication logic necessary to send and receive messages to and from the system 30 via a communications network 25. In a preferred embodiment, the client software 205 is a Web Browser. In a preferred embodiment, the client software 205 is the user interface and claim management sub-system (Deskview) sub-system 200, described below. The voice based interface 207 enables a user using telephone 15 to communicate with system 30.

The wireless interface 209 enables a user using a wireless device 5 to communicate with system 30. Wireless interface 209 is also used by a user using an embedded device 10.

The application layer 213 may be hosted in Application Servers 50. All communications between the application layer 213 and the external partner systems 62 are accomplished using enterprise application interface 217 software ("EAI" or "EAI Software"). The EAI software 217 manages message delivery and transaction integrity. Such EAI software may be purchased from Active Software or the like. The data to be communicated is converted into a standard format such as XML or the like by EAI 217. Adapter software 203 (residing in adapter machines 67, 77, 86 and 91 in FIG. 1) can convert the standard format to the format required by external partner system 62.

The data layer 219 provides the ability to store, update and access data in an efficient and organized manner. In one embodiment, the functionality of data layer 219 is provided by a Relational Database such as Oracle 8i.

The electronic claim file repository (Eclaim database) 280 is a central repository for claim related and transactional data. In one embodiment, claim data including administrative information related to insurance policies, policy holders (such as name, address, policy information, and transactions), consumers, and other users (e.g., insurance carriers, and vendors), as well as estimates, digital images, supplements, status of tasks related to the claim, and reports, is stored in the Eclaim database 280. The Eclaim database 280 is more fully described below.

The directory 290 is a database storing industry data on businesses participating in a given industry. In one embodiment, data on service providers (e.g., independent appraisers, repair facilities, car rental facilities, towing providers, and glass repair providers) and supplier is stored in this database. In one embodiment, data on service providers includes name, service(s) provided, location, and hours of operation. In another embodiment, customer satisfaction index (CSI) data generated by consumers' questions and answers provided in response to a customer satisfaction survey, as well as other CSI information on the service provider, supplier and other business providing service for a given industry.

Application layer 213 comprises several sub-systems including application software programs for performing various functions within an application server 50. In one embodiment, the application layer 213 includes user authentication sub-system 215, EAI 217, Deskview sub-system 200, first notice of loss sub-system (FNOL) 210, triage sub-system 220, assignment sub-system 230, audit sub-system 240, automated payment sub-system 250, CSI collection sub-system 260 (CSI), reports sub-system 270.

The user authentication sub-system 215 provides security control to the system 30. The user authentication sub-system 215 requires a user to provide a valid user id and password combination. For new users, the user authentication sub-system 215 registers the user, determines the user's level of access according to insurance carrier business rules (e.g., security tables), then stores the user authentication profile information (user id, password, level of access) on data layer 219. In another embodiment, user authentication information is stored on the external partner systems 62. Subsequently, each user who wishes to access the system must first be authenticated by the user authentication sub-system 215, which then determines what functional sub-systems of the system 30 the user is authorized to access and utilize, what data stored in the data layer 219 the user is authorized to access and to what degree the user can edit or add to that data.

The user interface and claim management sub-system (Deskview) 200 allows a user to access, view, add, and edit claim data. Deskview 200 also serves as a portal point to other sub-systems.

The first notice of loss sub-system (FNOL) 210 captures initial claim data directly from a consumer using client software 205. In another embodiment, FNOL 210 captures initial claim data through a commercial participant. FNOL 210 presents the user, the consumer of the commercial participant, with tailored questions, where the presentation format varies depending on the type of user. Also questions subsequent to certain gateway questions presented to the user vary according to the user's answers to the gateway questions. The claim data captured can be transmitted to and stored in the eclaim database 280, or insurance carrier system 65.

The triage sub-system 220 receives claim data and determines the severity and priority of the claim according to business rules established by an insurance carrier. Next, the triage sub-system determines the type or type(s) of assignees to assign a claim to according to business rules established by an insurance carrier.

The assignment sub-system 230 receives the claim from the triage sub-system 220, identifies the assignee most qualified for the assignment according to insurance carrier business rules, makes the assignment, records that the assignment has been made, and notifies the assignee.

The vendor connection and assignment management system (Connection) 300 (Connection) does not reside on the application layer 213, but is stored and operates on the vendor's I/O device 1, and serves as a communication and management system for vendors, particularly service providers such as repair facilities and independent adjusters. In one embodiment, Connection 300 resides and operates on internal system 201.

The audit sub-system 240 applies insurance carrier specific business rules, government regulations, and comprehensive trending analysis to detect and rectify any inconsistencies and irregular processing of claims, by auditing internal processes or user or service providers submitted data.

The automated payment system (APS) 250 automates the process of fulfilling payments required to fulfill an asserted claim.

CSI sub-system 260 automates the gathering of satisfaction data from a policy holder or consumer to generate a Customer Satisfaction Index (CSI) for the service providers.

The reporting sub-system 270 summarizes and formats 459 data stored in the eclaim file 280 or the insurance carrier system 65 based on a number of criteria to generate various reports. Examples of reports generated by the reporting sub-system 270 are cycle times, conversion ratios, and current assignments outstanding. Reports can be generated upon each request or can be pre-generated and retrieved from storage in the eclaim database 280 or the directory database 290.

In a preferred embodiment, system 30 is replicated in different locations and data is synchronized between the different locations to provide the highest level of reliability.

c. Data Flow Relationship and Overall Process

Figure 3:
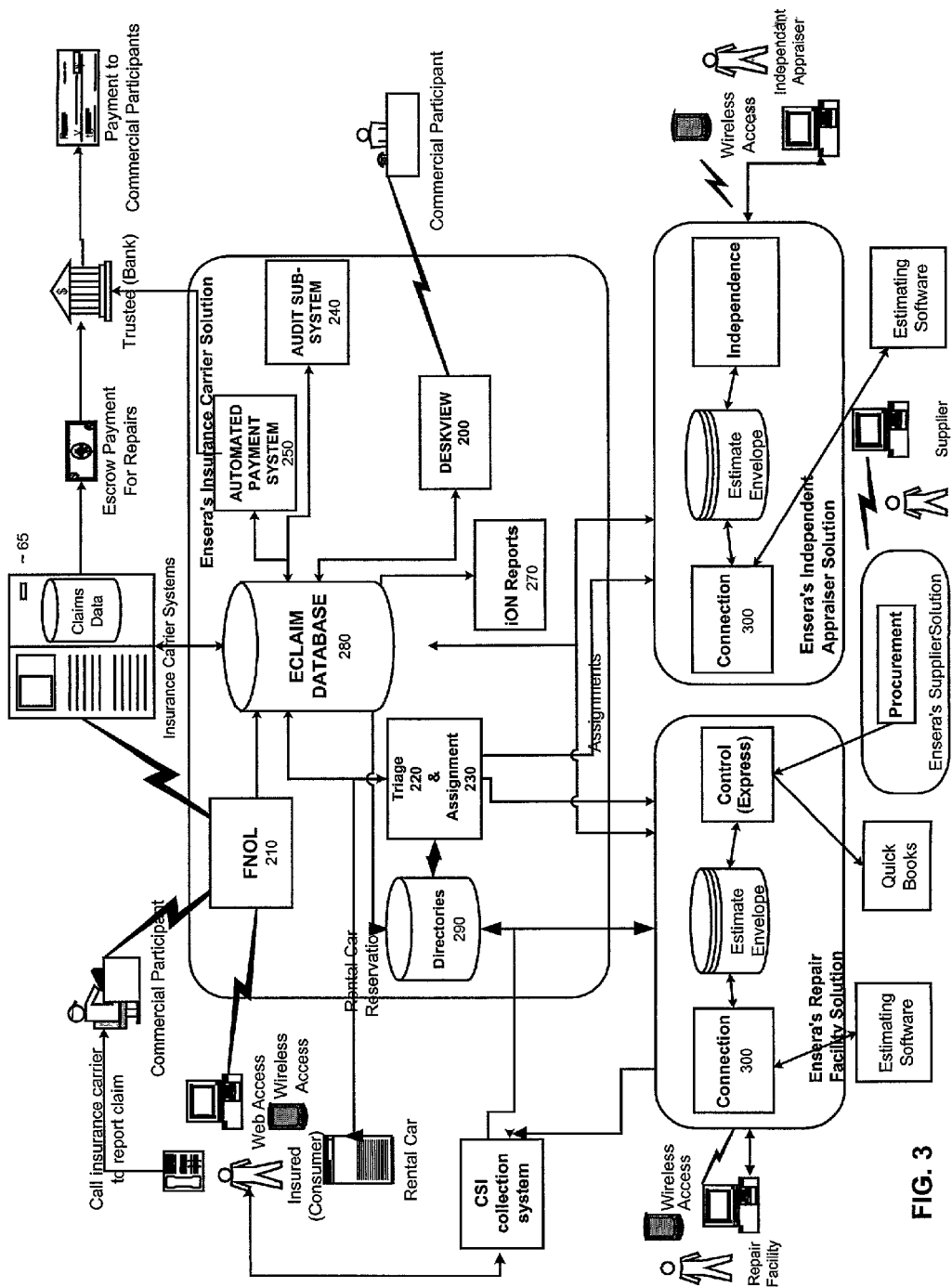
FIG. 3 is a block diagram of a data flow relationship between participants and sub-systems of a system of administering, tracking and managing insurance claim processing.
Figure 4:
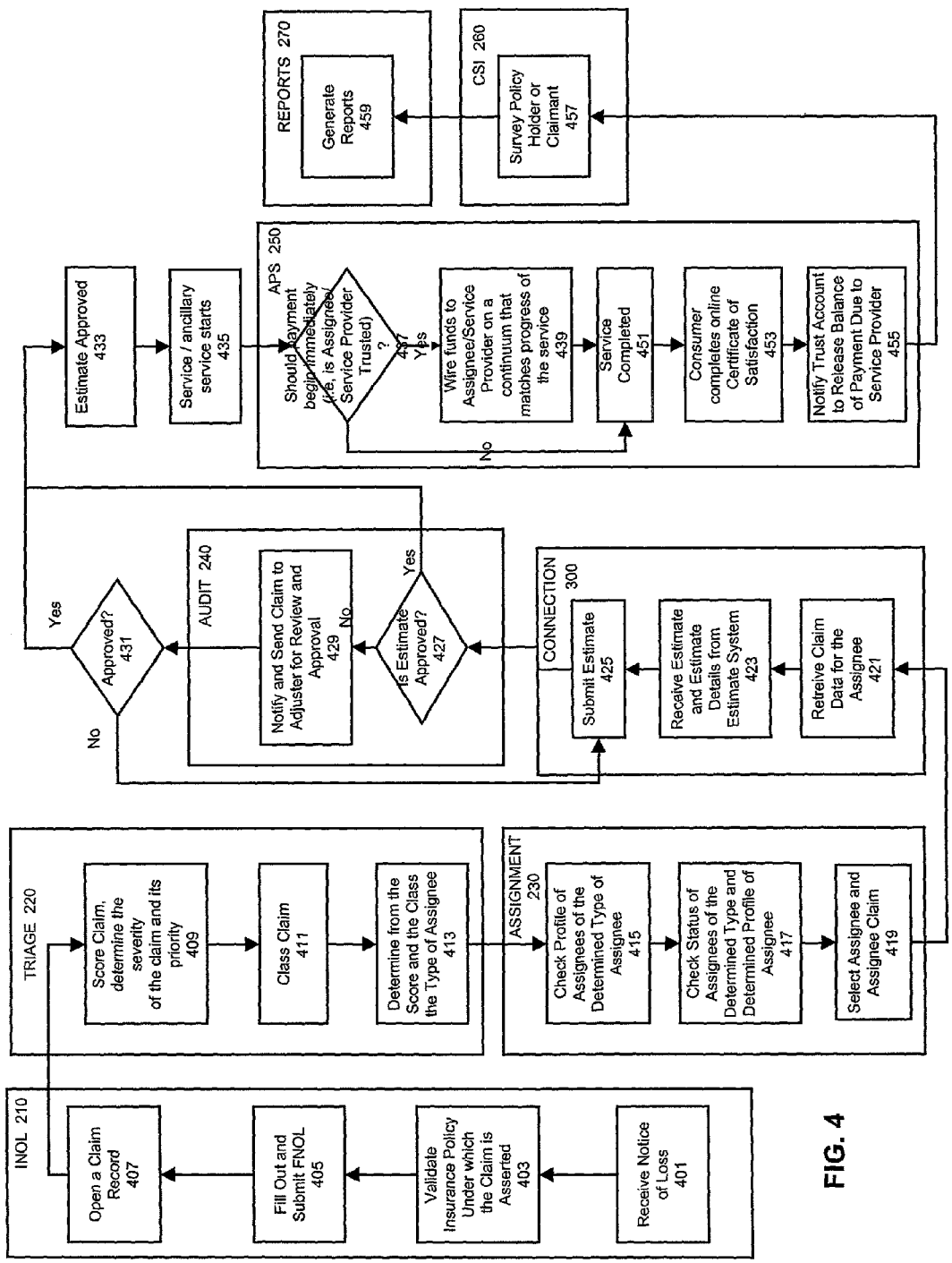
FIG. 4 is a flow diagram of a process of administering, tracking and managing insurance claim processing.

FIG. 3 is a block diagram of the data flow relationship between participants and sub-systems of a system of administering, tracking and managing insurance claim processing. FIG. 4 is a flow diagram of a process of administering, tracking and managing insurance claim processing.

The first notice of loss (FNOL) 210 captures initial claim data directly from a consumer using client software 205 using, for example, the embedded device, wireless device, PC or telephone of FIG. 1. In another embodiment, FNOL captures initial claim data through a commercial participant, such as an insurance company call center. First, FNOL 210 receives 401 notice of loss from the user or other sources. Next, FNOL 210 validates 403 the insurance policy under which the claim is being asserted. FNOL 210 presents the user, the consumer of the commercial participant, with tailored questions, where the presentation format varies depending on the type of user. Also questions subsequent to certain gateway questions presented to the user vary according to the user's answers to the gateway questions. The user then fills out and submits 405 answers to the questions with which he is presented. FNOL 210 determines if the submitted questionnaire is complete and the answers submitted valid, and creates 407 a new claim record for that claim. The claim data captured can be transmitted to and stored in the eclaim database 280, or insurance carrier system 65.

The triage sub-system 220 receives claim data and determines scores 409 the claim according to insurance carrier business rules. The score is then used to determine the severity and priority of the claim according to business rules. Next, the triage subsystem classes 411 the claim according to business rules. The score and/or class of the claim are then used to determine 413 the type or type(s) of assignees to assign a claim to according to business rules.

The assignment sub-system 230 receives the claim from the triage sub-system 220, checks the profiles 415, which are stored in the directory database 290, of assignees of the determined type against profile preferences established in business rules. Next, the status of the assignees that meet the profile requirement is checked 417. The assignee that is of the determined type, meets the profile requirements, and has capacity to complete the assignment is identified and the assignment is made to that assignee. The assignee is then notified and the assignment is recorded.

Connection 300 retrieves 421 claim data associated with an assignment. Next, Connection 300 requests an estimate from an estimate system and receives 423 an estimate with estimate details from the estimating system. Alternatively, a human may provide an estimate to connection 300. Subsequently, Connection 300 submits the estimate to the system 30, which stores the estimate in the eclaim database 280.

The audit sub-system 240 applies insurance carrier specific business rules, government regulations, and comprehensive trending analysis to detect and rectify any inconsistencies and irregular processing of claims, by auditing internal processes or user or service providers submitted data. The audit sub-system 240 can review 427 an estimate made and determine if it is unreasonable or if there is a potential for fraud. If the estimate is approved 433, the assignee is notified and service 435 of the assignment begins. If the audit sub-system 240 determines that the estimate is unreasonable, the audit sub-system 240 notifies an insurance carrier adjuster to review to the estimate.

The adjuster determines whether to approve 431 the estimate. If the estimate is not approved, the adjuster contacts the service provider to determine a reasonable estimate and a new estimate is submitted 425.

Once the estimate has been approved 433, and after the service starts 435, the automated payment system 250 is employed.

The automated payment system (APS) automates the process of fulfilling payments required to fulfill an asserted claim by an insurance company. APS receives payment requests made, validates the claim under which the request is made, validates the request and automates payment. In the case of reception of an estimate, APS may make progress payments according to insurance carrier business rules. At step 437, APS determines if the service provider is a trusted trading partner. In one embodiment, this is done by using the service provider specific data from the system 30's service provider directory database 290 or on the eclaim database 280. If the service provider is trusted, and the business rules authorize progress payments, the APS directs that Trust/Bank system 90 to release portions of payment outstanding of the total claim on a continuum that is stipulated by the business rules to match the progress of the service. When the service provider is not trusted, payment is reserved until services are completed.

Once services are completed 451, APS requests the consumer complete a certificate of satisfaction through use of and I/O device 1. Once the certificate of satisfaction is received, APS notifies the Trustee Bank system 90 to release the remaining balance of the payment amount to the vendor. If the vendor is trusted, any remaining amount is paid. If the vendor is not trusted, the full amount is paid. The financial record stored on the eclaim database 280 or the insurance carrier system 65, and the account on the Trust/Bank system 90 are updated to reflect this payment.

CSI sub-system 260 uses both structured questions with predefined possible answers including multiple choice answers and unstructured questions to be answered using free text gathered from a policy holder or consumer to generate a Customer Satisfaction Index (CSI) for the service providers. The CSI is stored into the directory database 290. When the claim services are completed, the consumer completes the consumer satisfaction survey via a client software 205 interface or a voice based interface 207. Preferably, the consumer uses his or her I/O Device 1 to review the customer satisfaction survey questions stored in the eclaim database 280 and are retrieved by the CSI sub-system 260. Alternatively, the consumer completes a paper version of the survey and sends that to a data entry group that uses I/O devices 1 to forward the responses to the CSI sub-system for storage in the eclaim database 280.

The results of the consumer satisfaction survey are retrieved from the eclaim database 280 compiled by the CSI sub-system 260. The CSI sub-system uses an algorithm to generate a composite index for the survey and updates the overall index for that service provider in an entry to industry directory database 290 incorporating the new result. The resulting overall CSI index for a given vendor can be displayed with the profile of the assignee the next time the service provider's data in industry directory database 290 is accessed from the system 30, particularly the assignment sub-system 230.

Finally, the reporting sub-system 270 summarizes and formats 459 data stored in the eclaim database 280 or the insurance carrier system 65 based on a number of criteria to generate various reports. Various users are able to view these reports through a client software 205 interface. In one embodiment, the reporting sub-system 270 utilizes software provided by Crystal reports and the like to facilitate the creation of the reports. In a preferred embodiment, the originating database (eclaim database 270, the directory database, or the insurance carrier system 65 database) that the reports are generated from is replicated and the reports are generated from that replicated mirror database so as not to burden the originating databases.

d. General Principles: Variable Automation, Standalone or in Conjunction with Other Sub-systems, and Business Rules and Rules Based Systems, and Communication with Other Parties.

(1) Variable Automation

In one embodiment, each of the sub-systems automates claims processing tasks to a variable degree depending on business rules. Business rules can require that, in response to certain data conditions, a claims processing task be turned over to a human participant such as an insurance adjuster. For example, if the audit sub-system 240 determines through comparison with actuarial analysis of stored claim data on past claims that a claim submitted or an estimate submitted is likely fraudulent, the audit sub-system 240 would notify a Special Investigating Unit (SIU) of the potential fraud and assign the task of estimate review to the SIU. Even in a fully automated mode of operation, according to insurance carrier business rules, the sub-systems enable human intervention and exception handling for certain circumstances.

(2) Operation as Standalone Systems or in Conjunction with Other Sub-systems

In one embodiment, the sub-systems of the system 30 operate in conjunction with one or more sub-systems and one or more of the databases of the system. In an alternate embodiment, each sub-system can operate on a standalone basis in conjunction with one or more insurance carrier systems 65.

(3) Business Rules and Rules Engines

Business rules utilized by sub-systems of the system 30 are designated and/or approved by the insurance carrier and can be updated and modified. In one embodiment, the business rules applied by sub-systems described above are stored in the data layer 219. In another embodiment, each set of business rules utilized by each sub-system of the system 30 are incorporated into the sub-systems at the application layer 213 and comprise a business rules engine component of each sub-system. The general concept of business rules will be known to persons of ordinary skill in the art. The specific rules used to accomplish the functionality described herein, contain content specific to implementation of this invention. In one embodiment, business rules incorporated in business rules engines are also designated or approved by the insurance carrier and can be updated and modified.

(4) Transmission of Data to Other Parties

Sub-systems communicate with other parties (e.g., insurance carriers, vendors, policy holders, consumers) providing a variable degree of information (e.g., administrative information, if and who the claim has been assigned to, status of each step in the process). Information transmitted can be sent directly via mail, fax, phone, email, or page or in other means that can be accessed through I/O devices. In one embodiment, sub-systems or systems of the invention can communicate to parties indirectly, through posting data to a website or transmission of the data to the eclaim database 280 coupled with notification to the intended receiving party that the data is stored on a website or the eclaim database 280 along with sufficient access and reference to enable that party to locate and retrieve the data. For example, assignment can post data on who a claim has been assigned to a website or the eclaim database 280, and then provide notification and access and retrieval information to a policy holder, for instance, such that the policy holder can retrieve that information and related information without the need to contact the insurance carrier or the system 30 directly through phone calls or other means. In another example, APS can periodically post the status of payments to a website and eclaim database 280, and notify a payee that the status of their payment request is posted on a website or the eclaim database 280 with access and retrieval information. Subsequently, payees can have direct access to the updated status information at their convenience.

2. The First Notice of Loss Sub-System (FNOL)

a. General

The first notice of loss sub-system (FNOL) 210 captures initial claims data. As shown in FIG. 3, FNOL 210 may be implemented in conjunction with other sub-systems and databases of the system 30. However, in an alternate embodiment, FNOL 210 can operate on a standalone basis in conjunction with a single or multiple insurance carrier systems 65.

FNOL 210 can be implemented to allow an user, for example, a consumer, i.e., any individual who is not a policyholder and is not acting on behalf of a commercial participant (e.g., a claimant claiming damages under an insurance policy caused by a policy holder), a policy holder, i.e., any individual who has a policy with the insurance carrier involved, and a commercial participant, i.e., a party acting on behalf of the insurance carrier involved (e.g., a call center representative, an insurance agent, or an insurance adjuster) to input initial loss information over a web based channel. In one embodiment, the web-based channel is available 24 hours a day.

b. Process

Referring to FIG. 5A, a flow diagram of the process of capturing initial claim data, in step 502, the user initiates the claims process using an I/O device 1. In one embodiment, the process is initiated via an insurance carrier's system 65. In another, the user connects to the insurance carrier's website and begins to file a claim of loss based on insurance carrier rules. Next, the consumer selects 504 to submit a new claim loss, which interfaces the user to FNOL. FNOL 210 can be branded for that insurance carrier. In another embodiment, a user can directly connect to FNOL 210 in the application layer 213 and initiate the process of capturing initial claim data.

In step 506, the user completes an initial set of questions geared to determining whether the user's claim is being made under a valid insurance policy. The user is asked to supply required data elements such as name of the user, relationship to claim, policy number, and date of loss.

In step 508, FNOL 210 will verify if the policy is valid. In one embodiment, this is done by accessing the insurance carrier's system 65 to retrieve the policy profile information including policy and coverage data and then comparing it with the data entered. In another embodiment, the policy profile information necessary to validate the user's claim is stored on the eclaim database 280. If the policy information necessary to validate the user's claim is stored on the insurance carrier system 65 and FNOL 210 is unable to connect with the insurance carrier system 65 to confirm and potentially retrieve the necessary insurance policy information, FNOL 210 can continue to capture claim information, store the claim information received, but will not be able to complete the transaction nor assign a claim number until FNOL 210 is able to connect to the insurance carrier system 65 to confirm that the policy information matches a valid insurance policy.

If the policy is not valid (e.g., there is no record of the insurance policy being asserted or the date of the loss is outside of the policy coverage period), an error message will be returned to the user and the user will be given additional opportunities to enter valid policy information. For example, the policy information may have been entered incorrectly and no matching policy exists. If valid policy information is still not entered after a set number of attempts, e.g., 5, the user will be informed that an error has occurred, that the user should contact the insurance carrier, and will be given 510 the insurance carrier's contact information. FNOL 210 also determines if the policy information entered violates insurance carrier business rules and automatically implements actions stored to handle such violation (e.g., if the date of loss is outside of the policy period, then FNOL 210 communicates to the user that the user should contact the insurance carrier and provides the insurance carrier's contact information). In one embodiment, after the claim is initiated the consumer is asked to identify what type of loss they wish to report (e.g., automobile, life, renters, health, and homeowners). This information will help to funnel off claims that are not be appropriate to report through FNOL 210 and may help with the triage sub-system 220 and assignment sub-system 230 described more fully below.

If the policy information entered in step 508 is valid, the user is presented with a second set of questions to fill out and submit. In one embodiment, certain policy data that relate to insured vehicles, drivers, and coverage, which are stored on the insurance carrier's system is retrieved and used to pre-populate corresponding data fields within the second set of questions the user is presented with.

FIG. 6 is a table containing examples of question group fields (questions sets) and particular question fields a user may be asked to complete. Certain questions can be designated as mandatory fields according to insurance carrier business rules.

At any time after an authenticated user has accessed FNOL 210, the authenticated user may save the information added for the loss to that point as unfinished. This saves the information entered so that the user can come back to it at a later point and finish. Once the user chooses to save an incomplete set of initial claim data, notification is sent back to them that the save was successful, and information necessary to retrieve their saved claim at a later time is provided. Additionally, a warning should be displayed that any information saved as unfinished will be purged from the system in 7 days and that no notices have been or will be sent to the carrier about this loss unless it is completed.

Next, after all question sets have been completed and a user believes that all the information about the loss has been entered, the user submits 512 the entire set of answers to FNOL 210. FNOL 210 then determines 514 if at the very least, the mandatory fields are answered and filled with valid information. In the case of missing or invalid information, the insurance carrier system 65 is able to designate how FNOL 210 will respond. Examples of potential responses: if the user leaves one or more required fields blank—the user will be reminded to complete the fields marked as required before proceeding, if the user inputs invalid information into a required field—message will display listing the fields that are in error along with valid formatting for each field, and if the user experiences either of the above errors and is unable to correct them. After the third attempt, an additional message will be displayed 510 directing the user to contact the insurance carrier and offering the insurance carrier's contact information. If all mandatory fields are completed with valid information, FNOL 210 stores 516 the complete set of initial claim data on the eclaim database 280 and may assign it a claim number. In one embodiment, after a user completes, and submits each set of questions, FNOL 210 determines if at the very least, the mandatory fields have been answered and are filled with valid information. If mandatory fields have not been satisfactorily completed FNOL 210 responds according the business rules.

Next, the complete set of initial claim data and the claim number, if assigned, is transmitted 520 to the insurance carrier system 65. Also, if FNOL 210 assigned a claim number, it is transmitted 518 to the consumer or policy holder. The insurance carrier system 65 then stores the set of initial claim data, and may assign it a claim number, if FNOL 210 had not previously. If a claim number has not been assigned previously by FNOL 210, the insurance carrier system 65 assigns 522 the claim a claim number, attaches the claim number to the claim data, and transmits the claim number to the consumer or policy holder and to the eclaim database 280. The eclaim database 280 then attaches the claim number to the set of initial claim data.

In another embodiment the set of initial claim data is stored solely on the eclaim database 280. The insurance carrier is transmitted notice that a new claim has been filed and captured, and sufficient claim identification information such that the insurance carrier system 65 or insurance carrier representatives can access the claim data stored in the eclaim database. In one embodiment, notice and the claim identification information are transmitted via email or fax.

In another embodiment, FNOL 210 transmits the complete set of initial claim data and the claim number, if assigned, to the insurance carrier system 65.

c. Varying Presentation Layers and Questions Presented by User Type

In one embodiment, FNOL 210 presents distinct user interfaces to user according to type of user. A different user interface is presented to and utilized by commercial participants, e.g., agencies or call centers (carrier operated or outsourced) as compared with policy holders and consumers. The user interface is tailored to the user type, with the interface for commercial application provides increased functionality over the one for consumers.

For example, whereas a user who is a consumer or policy holder may be presented a series of questions and answers over a larger number of spaces with a greater deal of explanation into how to answer each question, the commercial user is presented with fewer question and answer sets and may instead be presented a greater amount of designated fields and a greater density of questions or fields.

FIG. 5B a flow diagram of a commercial participant's process of capturing initial claim data. A commercial participant logs 524 into a website using an I/O device 1. The commercial participant selects 526 FNOL 210 option to capture or report initial claim data. The commercial participant than selects 530 an insurance carrier the claim is being filed under and enters policy information. If policy information is invalid a warning is displayed 536 to the user. If the policy information is valid FNOL 210 determines 538 if there are any duplicate claims filed. If there are potential duplicate claims filed, FNOL 210 displays 540 summary details of the potential duplicates. For either case of a claim being filed under an invalid policy or if duplicate claims have been potentially filed, FNOL 210 provides suggestions to the user as to how to proceed based on insurance carrier rules, which could include proceeding to collect the initial claim data, or to terminate the claim data capture process and refer the situation to an insurance carrier adjuster or customer service center. The subsequent steps are similar to the process of capturing initial claim data implemented for a non-commercial participant.

d. Gateway Questions

FIG. 7A is a screenshot of a gateway question presented to a user via his browser in an initial claim capture system.

FIG. 7B is a screenshot of questions presented subsequent and in response to an answer to a gateway question in an initial claim capture system.

In one embodiment, FNOL 210 presents the user with gateway questions, the answers to these gateway questions determine whether and what subsequent questions will be presented to the user. For example, has anyone been injured in the accident? Were any other persons involved (e.g., witnesses, pedestrians, bicycle riders)? If the answer is no, another gateway question may be presented. If the answer is yes, the user is presented with additional questions related to that gateway subject. Another example, an automobile claim will have questions relating to bodily injury. If the consumer answers in the affirmative, there will be additional questions to provide detail about the injured parties and the sustained injuries.

e. Attachment of Digital Photographs and Images

In one embodiment, a user attaches digital photographs, scanned images, or documents to the claim questionnaire submitted. Digital images stored in standard digital formats and scanned images scanned by a TWAIN-compliant scanner can be attached to a questionnaire submitted through FNOL 210. For example, a photo of a damages car can be attached.

f. Interactive Graphical Depiction of Damage

FIG. 8 is a screenshot of an interactive user interface, which allows a user to represent a damaged vehicle through varying the degree and location of damage to a representative vehicle graphic.

In one embodiment, FNOL 210 interactively questions user to graphically represent the degree of damage a vehicle has sustained. Through a series of questions separated by feedback graphical representations of the user's answers, FNOL 210 assists the user in creating an accurate graphical depiction of a damaged vehicle. FNOL 210 presents a user with a question as to what damage, the location of damage, and the degree of damage a vehicle has sustained. In addition, FNOL 210 provides guidelines, in the form of text or in the form of representative graphics or digital photographs or images as examples of types and degree of damage according to location and severity. In a further embodiment, graphics or digital images can be produced which match or are similar to the make and model of the vehicle whose damage is being graphically represented. Graphics can be two-dimensional or three-dimensional.

For example, if the user selects moderate front end damage to a vehicle, FNOL 210 would alter a graphic of a vehicle to represent moderate front end damage. Subsequently, if the user did not find the graphical representation to be accurate, he could change alter his selection of damage location and degree and would be presented with a new depiction of his selection. When the user finds the depiction to be accurate, the graphical depiction is stored along with other claim data. For example, FIG. 8 is an interactive user interface to varying the degree of damage to a representative vehicle graphic. The vehicle graphic starts in an undamaged state, but changes as and according to the user's input as to the location and degree of damage. Each user submission of location and degree of damage changes the graphic, until the user is satisfied with the depiction and submits the depiction.

In another embodiment, user described damage is matched with a digital library with images of damaged vehicles. Images that are determined to resemble the damage reported by the user are retrieved and presented to the user for comparison. If available, vehicle make and model criteria can be searched and matched to return digital images of damage vehicles of the same make, model and potentially year as the vehicle the user is attempting to describe. In another embodiment, the user is presented with slide bars to represent the degree of damage and can control the location of the damage by the reporting the angle from which the vehicle was damaged (e.g., one o'clock, 12 o'clock).

FIG. 9A is a business object model (BOM) for an implementation of a FNOL 210, which with FIG. 9B, which is a list of object attributes for a the business object model of FIG. 9A, provides an explanation of and relationship between the objects used in a preferred implementation of the invention.

3. Triage Sub-system and Assignment Sub-system a. General

The triage sub-system 220 and assignment sub-systems 230 automate, to a variable degree (e.g., full automation vs. limited automation that requires user interaction to complete the process), the process of identifying tasks that need to be completed to fulfill an insurance claim, determining which type of assignees, e.g., a service provider, vendor, internal work group or individual assignee are necessary to fulfill the claim, determining which individual assignee is most well suited to fulfilling each specific task and assigning each assignee a task, for processing and/or review. The types of assignments available include: appraisal, estimate, estimate review, repair, rental, or towing assignments. The triage sub-system 220 and the assignment sub-system 230 provide a variety of users within carrier claim staff (i.e., adjuster, Claims Clerk, estimate reviewer) or consolidators with an efficient method of delegating work assignments electronically. In another embodiment (described below), the triage and assignment process is fully automated.

In one embodiment, as shown in FIG. 3, the triage and assignment sub-systems are implemented in conjunction with other sub-systems of the system 30, for example, the eclaim database 280, FNOL 210, and Deskview 100. However, in another embodiment, the triage and assignment sub-system 230*s* operate in combination or on a standalone basis in conjunction with a single or multiple insurance carrier systems 65.

FIG. 10 is a block diagram of the types of assignees the triage sub-system 220 and assignment sub-system 230 can make assignments to.

The triage sub-system 220 assigns a priority order to claims on the basis of where funds and resources can be best used or are most needed, as well as a class of the claim, so that the claim can be accurately assigned. The assignment sub-system 230 appoints responsibility for a claim or a portion of a claim to an assignee (e.g., a Repair Facility, an Independent Adjusting Firm, a work group within an Insurance Carrier, a specific adjuster or a combination of assignees).

b. Process

FIG. 11 is a flow diagram of a process of triage and assignment in accordance with the present invention. FIG. 13 is a chart that represents data fields received or retrieved by the triage and assignment sub-systems. First, the triage sub-system 220 receives 1101 or retrieves an insurance claim record, similar to the example in FIG. 13, that contains data elements from either the eclaim database 280 or from the insurance carrier system 65.

i. Scoring Claim Data

Next, the triage sub-system 220 scores 1103 the insurance claim by retrieving and applying a set of the insurance carrier's business rules, which can be seen as an insurance carrier scoring table, stored on the insurance carrier system, to the claim data. Scoring simply assigns different aspects or elements of the claim according to the insurance carrier's business rules, and then sums the numeric values associated with different aspects of a claim. Scoring sets the priority of the claim and may weigh such factors as:

Reported by person/relation
Reported on date
Loss type
Date of loss
Time of loss
Loss location (state, city, zip & county)
Number of vehicles involved
Number of parties involved
Types of parties involved
Location of parties
Loss description
Damage to vehicle
Location of vehicle
Vehicle drivability
Damage to other property
Location of property
Property livability
Injuries involved
Types of medical treatment
Type of policy
Type of coverage
Repair partners chosen
Amount of damages
Policy information
Agency information
Regulatory conditions These factors are scored according to an insurance carrier's business rules via a rules based system. Examples of the application of the business rules to the claim elements are:

A point could be added for each vehicle involved in a claim.
A point could be added if there is damage to something other than a vehicle.
A point could be added for each non-injured person involved.
Several points could be added for each person involved.
Points could be added for different types of claims—Collision with a fixed object might get one point where Collision with another vehicle by rear ending it might get two and Collision with another vehicle in an intersection might get five.
Multiple points could be added if a bicyclist or pedestrian was involved.
Multiple points could be added if the claim is from a more complex policy type that requires more coverage investigation.
Points could be added if the car was a theft.

In addition, factors such as damage to vehicles, damage to property, or physical injuries may have an associated severity weighting that will contribute to the score that element receives. Next, the score assigned for each element of the claim are summed.

The summed score is used to determine 1105 the severity and priority of the claim according to the insurance carrier business rules. For example, a claim that receives a high summed score likely represents a complex, high damage and high cost claim. Determining the severity also will apply to determining the type of assignee the claim will be assigned to.

For example, a claim with an extremely low score (under 5) might qualify to be handled completely by a repair facility without an adjuster needing to be assigned. One that scores under 20 might go to a fairly new adjuster. A claim that scored over 50 might only go to a seasoned specialists. In addition to scores, there could be additional rules that even if the score only amounts to 3 but there was an injury, the system would have to assign an adjuster in addition to the repair facility, since the repairer cannot handle the injury.

The summed score and the severity can be used to determine the priority of a claim, i.e., the order in which it is processed relative to other claims. The priority and order of processing of a claim can differ according to insurance carrier business rules. For example, some insurance carriers may prioritize the processing of low scored claims that have low severity because low scored claims are usually less complex and are able to be turned over quickly. In contrast, some carriers may do the opposite and prioritize the processing of high scored claims that have high severity because they high severity claims may require more attention.

ii. Classing a Claim

Next, the claim is classed 1107. Classing puts a claim, based on alphanumeric strings of values for specific fields in the claim (e.g., the fields that hold the year, make, model data for a vehicle), through a series of tests that are set by the business rules to determine a "class" of claim. Once the class of the claim is determined, the designated class is then used to determine, through application of insurance carrier's business rules, which type or types of assignees to assignee the claim. For example, the triage sub-system 220 220 might receive claim data for a claim on a 1999 BMW 750. An insurance carrier rule may be to class all claims filed on BMW 750's that are a model year of greater than or equal to 1997 as a "new luxury car" class. This class, the "new luxury car class" may then have a business rule that requires all "new luxury car" class claims to have an independent or internal adjuster assigned to the claim.

Once the score and the class of a particular set of claim data are determined the score and the class, in conjunction, through the application of the insurance carrier business rules, are used to determine 1109 the type or types of assignees that are necessary to fulfill the claim. The types of assignees can be determined by tests as simple as any individual data value that returns a class or score above a certain limit set by a carrier, a combination of class and score that is beyond a certain threshold, up to combinations of multiple value scores and classes that fall inside or outside of parameters. Some insurance company business rules are very simple tests and have a limited number of corresponding types of assignees to assign the claim to. Other business rules will designate elaborate tests in order to classify new claims and many potential assignees.

Also, where the score and class can be used in conjunction to determine the type of assignee to assign a claim to, certain "class" designations may be weighted higher and overrule a score designation that would normally result in a certain type of assignee being flagged. For example, an insurance carrier business rule may be that an internal adjuster will always handle a particular class of claims (for example, all claims involving a 1999 Ford Explorer). So, if this "class" of claims is detected by the triage sub-system 220 220, the claim could be directed to the internal adjusting staff as opposed to the repair provider regardless of the total score of the claim.

As another example, the class of "Non listed driver" is applied any time a driver for the insured vehicle is indicated that is not listed on the policy, and the class of "Single Car accident/Late night accident" is applied anytime two circumstances occur on the same claim: the loss involved only the insured vehicle and the time of loss was between midnight and 6:00 am.

Using these examples, the separate score of either of the two examples listed above could easily be low, indicating that these claims might qualify for automated adjusting by directing the claim to a repair facility and then automatically paying the estimate. However, each of these classes of claims represents a significant exposure to the insurance carrier in terms of the claimant not having coverage for the loss or from an underwriting aspect. Therefore, a claim been designated as either class might be directed internally to a non-automated process no matter how low the claims score.

In another embodiment, what type or types of assignees that a claim will be assigned to can be determined by the triage sub-system 220 through the application of business rules to the claim data without the process of scoring and classing. For example, the triage sub-system 220 can identify what basic type of assignee to assign the claim to through the application of the insurance carrier's business rules and policy information stored on the insurance carrier's policy database as applied to the insurance data. For example, claim data received by the triage sub-system 220 may reveal a claim involving damage to the insured vehicle that is drivable, while insurance claim policy information retrieved from the insurance carrier's policy database reveals the claimant has collision coverage and rental reimbursement coverage. The triage sub-system 220 can then identify that there is a need for a Repair Facility and Rental Company. If, for example, the car also is not drivable, the triage sub-system 220 also identifies that a towing company may be needed. Determining which types of assignees to assign a claim to and the class of a claim are parallel to determining the types of tasks need to fulfilled to satisfy a claim. In one embodiment, the triage sub-system 220 determines specific tasks that are required to satisfy the claim and determines a type or types of assignees to assign each of those tasks to.

c. Assignment

The assignment sub-system 230 is utilized after the triage process identifies the type or types of assignee(s) that is need to fulfill the claim.

i. Profile Matching

First, the assignment sub-system 230 checks 1111 the profile of assignees of the type designated by the triage sub-system 220. The assignment sub-system 230 checks the profiles of assignees to match insurance claim data (e.g., owner address or vehicle location) to a group of specific potential assignees of the determined type according to insurance carrier business. Assignee profile information (e.g., name, function, address, customer satisfaction index (CSI) score, and rates charged) is stored in the directory database 290, which contains profile information on potential assignees. In an alternate embodiment, assignee profile information is stored on an external database, such as an insurance carrier system 65 database, accessible to the assignment sub-system 230. In one embodiment, the CSI score is one component in an assignee's profile is generated by and provided by the CSI sub-system 260.

The assignment sub-system receives the profiles for each type of assignee designated by the triage sub-system 220 to which to assign the claim. Specific claim data elements from the claim record will be checked with profile data for each assignee that the insurance carrier has selected as assignment criteria in accordance with insurance carrier business rules. Those assignees of the specific type that match the profile will be selected.

As a specific example, a business rule may be that only assignees of a given type who are within 50 miles of the vehicle location may be assigned a repair assignment. The assignment sub-system 230 then retrieves the vehicle location, which is piece of claim data and matches that with the store location for assignees of the given type according to the business rule of being within 50 miles of the vehicle. All assignees that match those criteria are retrieved. As a further example, to differentiate between assignees of the given type who meet the first business rule, the potential assignees that are retrieved can be ranked or can be further narrowed down based on CSI score, average rates, and average cycle times, which are generated by the reports sub-system 270 and added to the assignee profile in the directory database 290.

(1) The Directory Database

The directory database 290 can be grouped by type of assignees (e.g., repair facilities, independent appraisers, rental providers) and contain standard administrative information such as assignee names, addresses, and phone numbers. In one embodiment, the directory data is retrieved from electronic yellow pages. In one embodiment, in addition to administrative information, the directory database 290 stores information such as maps to the assignee location, work rates, as well as such information as CSI index scores, status/capacity to work, which can be updated by the assignee or estimated using reports such as cycle time and the number of assignments currently made to the assignee as are generated by the reports sub-system 270 and also stored to the assignee profile. Reports generated by the reports sub-system that are vendor specific (e.g., a particular vendor's cycle time (average time to complete an assignment) or an the aggregate number of assignments a particular vendor has be assigned over a particular period of time) are stored in the directory database 290. In one embodiment, vendor specific data such as vendor specific reports are linked to the eclaim database 280. In one embodiment, the directory database 280 interfaces with insurance carrier systems 65.

ii. Check Status

Next, taking the assignees whose profiles meet the assignment criteria set by the insurance carrier business rules, the assignment sub-system 230 accesses the status or schedule/workload of each potential assignee stored in the directory database 290 to determine 1113 the current status or capacity of a given assignee.

In one embodiment, capacity can be determined by the assignment system by reviewing data such as history, cycle time, and the amount of assignments assigned to a given assignee generated by the reports sub-system 270 and stored in association with each assignee profile in the directory database 290. In another embodiment, the assignment sub-system 230 can retrieve currently updated copies of a potential assignee's schedule. In one embodiment, status data from assignees' calendar systems such as Outlook are imported into the assignee profile. In one embodiment, for internal insurance carrier and field staff, the assignment sub-system 230 receives data directly from the insurance carrier system 65 regarding each staff adjuster's status.

iii. Identify Specific Assignee(s)

The assignment sub-system 230 then determines 1115 algorithmically, according to insurance carrier business rules which assignee has the greatest capacity to accept the assignment, and assignees the particular task to that assignee.

Assignment can be made to a carrier, any internal entity within a carrier (department, unit, manager, adjuster), an external adjusting source (Independent adjuster), or a vendor or to more than one of these. There could be multiple assignments on a single claim depending upon carrier specifications. One assignment could be to a vendor (such as a repair facility) for a damage estimate, while another could be to an Special Investigation Unit investigator to investigate a potential case of fraud in the initial claim, while yet another could be made to an internal bodily injury adjuster.

In certain circumstances (e.g., selection of repair facility or rental provider) whether for legal reasons (e.g., anti-steering regulations) or efficiency concerns, before an assignment can be made, the assignment sub-system must obtain authorization of the selection of assignee from the policy holder or consumer who filed the claim. Authorization can be obtained through notifying the policy holder or consumer of a recommended assignee or a list of recommended assignees, and receipt of selection of assignee or authorization to choose the assignee determined by the assignment sub-system 230. Notification and authorization capture could be implemented electronically (e.g., through email), through verbal communication confirmation received by an insurance carrier representative (e.g., a call center representative or insurance carrier adjuster operating a semi-automated assignment sub-system 230), or through any I/O device 1.

iv. Notification, Updating the Databases, and Logging the Transaction Record.

Next, the assignment sub-system 230 notifies 1117 the assignee that the assignment has been made. In one embodiment, all transmissions to an assignee are via the notification method (e.g., an Connection 300, email, fax, mail, phone) established in the profile for that assignee.

In one embodiment, the assignment sub-system a claim file, similar to the example in FIG. 14, containing insurance claim information and details of the assignment are transmitted to the assignee. In another embodiment, with notification of assignment the selected assignee is transmitted sufficient data, such as a user id and password to access claim data related to the assignment stored in the eclaim database 280.

Once the assignments have been identified and the assignees have been notified, if the assignment sub-system 230 the eclaim database 280 is updated 1119 with details of the assignment (e.g., the claim data, which assignee(s) the claim was assigned to). In one embodiment, a link is provided to the assignee profile stored in the directory database 290 from the assignment details updated to the eclaim database 280. In another embodiment, once the assignments have been identified and the assignees have been notified, the insurance carrier system 65 is updated with claim information and details of the assignment to reflect the assignment. In another embodiment, once the assignment has been made the insurance carrier system 65 is notified of the assignment and provided with sufficient information to access claim data that relate to the claim and reflect the assignment.

In one embodiment, an entry of the assignment is logged in the transaction record stored of the eclaim database 280 in association with the insurance claim.

v. Updating the Business Rules, Profiles, and Status

The business rules are updateable by the insurance carrier system 65. The assignee profiles, including status can be updated by the assignee, a systems administrator, or automatically periodically by the system 30. For example, status can be automatically retrieved from an assignee system when an assignee submits an estimate to the system 30.

vi. Automation

While the triage sub-system 220 and assignment sub-system 230 can fully automate the process of assigning claims according to insurance carrier business rules, these sub-systems can function at variable levels to provide variable levels of automation. For example, claims that score low can be fully automated, however when a claim receives a score above a certain threshold or a particular class is assigned to the claim by the triage sub-system 220, a human participant such as an insurance adjuster may be notified and passed the task of determine and making the final assignments. In an example where a human participant such as an insurance adjuster ultimately decides which assignee to assign a claim to, the triage sub-systems 220 may still score and class the claim to provide the adjustor with a processed score and class of the claim which can serve as an automated reference point, as well as suggested types of assignees to assign the claim to. The assignment sub-system 230 would apply the business rules to provide a list of suggested assignees that fit a certain profile and have sufficient capacity to process the assignment, while the adjuster could then choose to pick from the suggested list or choose an assignee that has not been pre-selected by the assignment sub-system 230.

FIG. 12A is a screen shot of a list of claims that a human participant needs to assign. FIG. 12B is a screen shot of the details of a claim. FIG. 12C is a screen shot of an assignee search function that is driven by user-selected criteria. FIG. 12D is a screen shot of a list of potential assignees. FIG. 12E is a screen shot of a potential assignee's details. FIG. 12F is a screen shot of a record of assignment. FIGS. 12A-F demonstrates how, in one embodiment, the triage and assignment process is lightly automated.

FIG. 15 is a business object model for an assignment sub-system 230. This BOM provides an explanation of and relationship between the objects used in a preferred implementation of the invention.

4. Vendor Connection and Assignment Management System (Connection)

a. General

The vendor connection and assignment management system (Connection) 300 is an open (i.e., able to communicate with various systems, e.g., insurance carrier systems 65, estimate systems, and system 30 sub-systems, over a non-proprietary format and communication medium) claim related task management, and claim data management and communication system designed for utilization by vendors, particularly repair facilities, independent appraisers and insurance carriers.

Connection 300 retrieves claim data, which can be related to an assignment, manages and is able to transmit claim data, which can be repair related, and estimate information to vendors (e.g., repair facilities and independent adjusters), insurance carrier systems 65, suppliers of parts and materials, vehicle owners, and to the eclaim database 280.

b. Functionality of the Connection System

Each of the functions of Connection 300 described below can operate in conjunction with the rest of the functions described below or independently.

i. Receipt and Management of Claim Data

A user can utilize Connection 300 to receive and process claim data from an insurance carrier system 65 or the system 30. In one embodiment, Connection 300 retrieves data from the eclaim database 280 in response to a notification of an assignment from the assignment sub-system 230. The claim data retrieved can be stored locally on the user computer 2 or other I/O device 1. Connection 300 then allows a user to view and manage the claim data in various presentation formats. For example, FIG. 16 is a screen shot of a main screen of an implementation of the Connection 300 system, which is exemplary of a data format that Connection 300 can present claim data to a user. In the screen shot of FIG. 16, assignments outstanding are presented to the user. In addition to administrative claim data (e.g., an assignment's claim number, date of loss, and claimant information management), Connection 300 allows the user to view already attached digital images (e.g., digital photographs, and scanned images) or other digital formatted documents. FIG. 17 is a screen shot of a digital photo displayed by Connection 300. In one embodiment, Connection 300 can retrieves reports, which may be generated by the reporting sub-system 270, and stored in the directory database 290.

ii. Adding Data

In addition to being able to view initial claim data associated with an assignment, Connection 300 allows the user to append additional information such as digital images to initial claim data. Digital photos, and scanned images of, for example, photographs, and documents such as tow bills, parts invoices and police reports can be associated with the initial claim data. Connection 300 supports digital images from any commercially available digital camera or TWAIN-compliant scanner. In one embodiment, Connection 300 allows the user to print electronic documents to a print driver sub-component of Connection 300, which will attach a digital image of the document to the inbox for that claim. Digital images retrieved or added through Connection 300 are watermarked for protection such that any alteration of the image will negate the watermark.

iii. Editing Claim Data

Initial claim data and data added to the initial claim data can be viewed and edited through Connection 300. In addition to enabling the user to edit stored digital text, Connection 300 can be used to rotate, crop, enlarge, invert and enhance digital images.

iv. Communication with Estimating Systems

Connection 300 transmits claim data to estimating systems (e.g., Comp-Est, Shoplink, Ultramate, and Pathways) and can retrieve and add detailed estimates provided from estimating systems to claim data. From estimate data retrieved from an estimating system, Connection 300 can create an electronic quote request for specific parts and types of parts (e.g., OEM, salvage, aftermarket, or glass) and transmit that request to an appropriate vendor.

v. Claims Folder

In one embodiment, initial claim data and subsequent edits of the initial claim data added to the initial claim data are associated and stored in a fashion that all data relating to a certain assignment can be easily retrieved. The relational storage and retrieval of claim data associated with a single assignment or claim can be envisioned as the creation of a claim folder for each assignment or claim.

vi. Transmission of Claim Data in an Open Format and through Open Communication Standards.

Connection 300 stores received, added and edited data, including digital images, in an open format that is readable by various estimating systems and insurance carrier systems 65. In addition, Connection 300 transmits claim data to insurance carriers, parts and materials vendors, vehicle owners and other parties involved in the claims process through open (non-proprietary) communication standards (i.e., standard Internet protocols) that allow parties, including proprietary and legacy systems to receive the data. In one embodiment, Connection 300 communicates with other parties involved in the claims process through the communication network 25.

Connection 300 can communicate to parties indirectly, through posting data to a website or transmission of the data to the eclaim database 280 coupled with notification to the intended receiving party that the data is stored on a website or the eclaim database 280 along with sufficient reference and authorization information, if necessary, that the party is able to locate and retrieve the data. For example, a repair facility can utilize Connection 300 to periodically post repair status and expected date of completion information or other claim information (e.g., administrative information, or status/capacity to fill additional assignments) to a website or the eclaim database 280, then can notify a vehicle owner that the vehicle owner can retrieve repair status or other data relating to their vehicle from the website or the eclaim database 280. The vehicle owner will no longer need to directly contact the repair facility to determine the status of the repair.

5. Audit Sub-system a. General

The audit sub-system 240 periodically reviews stored claim data applies insurance carrier established and editable business rules to determine if any pieces of claim data do not meet the criteria set by the business rules. If any pieces of claim data do not meet insurance carrier criteria, the audit sub-system 240 can automatically direct an action set by the business rules to resolve the violation, or notify a human participant such as an insurance carrier adjuster, of the failure. The audit sub-system 240 is able to detect and direct resolution of claim processing that was incorrect, processes that need to be conducted but were not, unreasonable estimates, and potentially fraudulent transactions.

As audit sub-system 240 finds situations that match the rules established by a particular insurance carrier, it will act upon those findings accordingly. According to certain business rules, the audit sub-system 240 can remove claims from the automated process and refer them back to the insurance carrier for personal attention or could continue through the automated process with notification going back to the carrier for informative purposes. The audit process could be a matter of finding certain flags, running the information past another database and then, based on those findings, either continuing on with the process or referring it back to the insurance carrier. The audit subsystem 240 could also be set to notify a carrier whenever certain trends are detected. For example, if a certain repair facility's average cost per estimate had increased more than a certain % in a certain amount a time, a notification could be sent to the carrier for them to further investigate the causes. Again, the audit sub-system 240 looks for exceptions to the standard, accepted procedures or practices that the insurance carrier has established in the form of business rules.

b. Process

FIG. 18 is a flow diagram of an audit process. The audit sub-system 240 retrieves 1801 claim data from the eclaim database 280, the insurance carrier system 65 or vendor systems 75 at variable instances set according to business rules. For example, a business rule may be that after each submission and capture of a new claim, the claim data must be audited by the audit sub-system 240. In another example, a business rule requires the audit sub-system 240 to review and audit each estimate submitted by a vendor. In one embodiment, the audit sub-system 240 and the automated audit process can be initiated by a human participant such as a insurance carrier appraiser after a certain amount of human auditing has already taken place. In one embodiment, claim data can be sent directly to the audit sub-system 240 directly.

i. Business Rules and Statutory Regulations

The audit sub-system 240 processes 1803 retrieved or received claim related data according to business rules designated by an insurance carrier. Business rules are editable and updateable at the direction of the insurance carrier. Through application of insurance carrier business rules to the claims data, the audit sub-system 240 determines 1805 if any business rules are violated. For example, if a business rule is that only used parts should be used to the repair vehicles made in 1995 or earlier, and an estimate submitted by a repair facility references to use of new parts for repair of a 1990 vehicle, the audit sub-system 240 would automatically detect that the repair facility's estimate had violated a business rule.

In one embodiment, the audit sub-system 240 determines if statutory regulations are satisfied in the processing of the claim thus far. The audit sub-system 240 applies statutory regulations to claim data in a similar fashion to the application of insurance carrier business rules. For example, certain state regulations mandate that certain notifications need to be sent to consumers, while another imposes cycle time limitations on addressing a filed claim. The audit sub-system 240 determines if notifications have been sent and automates the process of sending the notifications if they have not been sent. Also, in the case of statutory regulated deadlines, the audit sub-system 240 generates reminders to responsible parties that a task must be completed by a mandated deadline. The audit sub-system 240 is provided a list of statutory regulations that apply to the claim process the audit sub-system 240 is auditing. Statutory regulations can be edited and updated to reflect changes in the law.

ii. Violations

If no business rule or statutory regulation has been violated, the audit process terminates 1809. If a business rule or statutory regulation violation is detected, the audit sub-system 240 applies business rules to process the violation. The audit sub-system 240 can directly notify third parties involved (e.g., vendors or policy holders) of the violation with explanation as to reason for violation and proposed courses of action. For example, if an estimate submitted by a repair facility provides insufficient or invalid information, the audit sub-system 240 would detect the violation and notify the repair facility to complete or provide additional valid information. Violations resolution is governed by business rules and can require that the audit sub-system 240 notify and transfer the audit process to a human participant such as an insurance carrier appraiser. For example, if instead of determining that an estimate submitted by a repair facility violates business rules by failing to submit sufficient or valid information, the audit sub-system 240 determines that the estimate contains sufficient and valid information, but is unreasonably high, the audit sub-system 240 would assign the audit process to an human participant such as an insurance carrier adjuster to conduct an additional audit, and if the estimate is still found unreasonable, to negotiate with the repair facility to change the estimate. In an alternate embodiment, in the previous example, the audit sub-system 240 could automatically notify the repair facility that their estimate was denied, that it was unreasonable, and with sufficient details of denial such that the repair facility can attempt to make a more reasonable estimate.

In another example, audit sub-system 240 determined potential cases of fraud, through application of business rules, would be transferred to a special investigating unit for further processing. In one embodiment, fraud detection is determined by a fraud detection system separate from the audit sub-system 240.

iii. Trending Analysis

In one embodiment, the audit sub-system 240 applies trending analysis to claim data to determine if the claim data falls outside of normal boundaries. For example, instead or in addition to applying a business rule that lists circumstances (e.g., the cost of a hood is within a certain range) in estimates that would result in the estimate being determined unreasonable, the audit sub-system 240 can apply trending analysis data that can be stored in the eclaim database 280 or generated by the reporting sub-system 270. For example, the reporting sub-system could determine how much the last 100 repair facilities charged for the repair of the left front door of a specific vehicle make, model and year. If claim data of a newly submit estimate for a comparable task is retrieved by the audit sub-system 240, the audit sub-system 240 applies the report to determine if the estimate is unreasonable for falling outside of the ranges.

iv. Notification of Audit Findings and Logging the Audit

Upon termination of the audit process, either through no violation of business rules or statutory regulations being found, or if a violation was found, the audit sub-system 240 rectifying the violation according to business rules, the audit sub-system 240 notifies the sub-system or systems that it operates directly in conjunction with (e.g., the eclaim database 280 and the insurance carrier system 65) of the result of the audit process and logs an entry of the decision and details related to the decision to those system(s). In one embodiment, the audit sub-system 240 notifies a third party (e.g., a vendor or a policy holder or consumer) that does not interact directly with the audit sub-system 240 of the audit sub-system 240s conclusion. For example, if the audit sub-system 240 audits an estimate submitted by a repair facility and determines does not approve the estimate, the audit sub-system 240 notifies the repair facility that the estimate was denied.

6. Electronic Claim File Repository (eclaim Database)

a. General

FIG. 19 is a block diagram of the systems and sub-systems that transmit, store, or retrieve claim data, from an electron claim file repository. The electronic claim file repository (eclaim database) 280 is a central relational database where claim related and transactional data is received, stored and exists to be accessed by systems and sub-systems. Claim data stored in the eclaim file is in an open data format that is readable by various sub-systems and systems. Any number of systems or sub-systems, ranging from one to all of the systems and sub-systems that interact with system 30, are able to interface with the eclaim database 280.

Claim data, including administrative information related to insurance policies, policy holders (such as name, address, policy information, and transactions), consumers, and other users (e.g., insurance carriers, and vendors), as well as assignments, estimates, digital images, supplements, status of tasks related to the claim, transaction logs and entries, parts lists, warranties, payment information, and reports is stored in the eclaim database 280. In one embodiment, instead of storing detailed vendor related administrative and other data (e.g., CSI) in the eclaim database 280, detailed vendor related claim data is stored in the directory database 290 which is linked to general vendor claim data that is stored on the eclaim database 280. Certain claim data is stored in a format that cannot be edited based on governmental regulatory requirements or due to business rules. For example, initial claim data captured by FNOL 210 or receiving and stored in the eclaim database 280 from insurance carrier systems 65 are frozen so as to prevent fraud. In another example, digital scanned images of legal documents are stored in an uneditable format. However, in one embodiment, copies of this data, which are labeled as copies and not originals, are made and can be edited or manipulated and added to the virtual claim file containing the original data.

In one embodiment, claim data is associated and stored in a fashion that all data relating to a certain claim can be easily retrieved. The relational storage and retrieval of claim data associated with a single claim can be envisioned as the creation of virtual claim folders or files for each claim. In one embodiment, a unique claim number, usually represented by an alphanumeric data field, is assigned to each claim that is stored in the eclaim database 280. All pieces of claim data related to that claim are marked with the unique claim number and can thus be associated with other claim data related to the single claim. Furthermore, the data elements that make up a claim can be grouped into claim segments within the overall claim through the assignment of an unique identifier that is attached to all claim data of the claim segment. These claim segments (suffixes) could represent a particular coverage type, claimant, vehicle or individual associated to a particular claim.

In one embodiment, the eclaim database 280 is segregated into segments designated to store claim data related to a specific insurance carrier.

Access to the eclaim database 280 is governed by the user authentication sub-system 211, with various parties having variable degrees or levels of access to claim data stored on the eclaim database 280.

The eclaim database 280 can be regularly updated through a feed of data received from the systems or sub-systems that interact with it. In one embodiment, the eclaim database 280 imports or pulls claim related data from systems or sub-systems. The eclaim database 280 receives automated data imports (e.g., status data of work related to a claim) from other systems and sub-systems.

FIG. 20 is a business object model for the eclaim database 280, which outlines the relationship between claim related data stored in the eclaim database 280. FIG. 21 is a business object model, which outlines the relationship between an insurance carrier or vendor and the data attributes and elements associated to it that are stored in the eclaim database 280. FIG. 22 is a business object model, which is linked to the business object models of FIG. 20 and FIG. 21, and outlines the user roles and relationships to data described in the business object models of FIG. 20 and FIG. 21.

7. User Interface and Claim Manager Sub-system (Deskview)

a. General

FIG. 23 is a block diagram of the systems, sub-systems and database that interface with a user interface and claim manager sub-system. The user interface and claim manager sub-system (Deskview) 200 is a user interface and claim management system, which interfaces with and can be utilized to access, view, edit, and add claim data stored in the eclaim database 280. Deskview 200 also acts as a portal point from which other sub-systems of system 30 can be accessed and utilized.

b. Features i. Retrieve, View, Edit, and Add Claim Data

FIG. 24A is a screenshot of a user interface and claim management system viewing and editing claim data feature. Deskview 200 allows a user to search for and view claim data associated with a single claim, the claim data being linked and retrievable such that the user is presented with an integrated virtual claim file of claim data associated with a claim. Claim data can be presented to a user through Deskview 200 in a general, high-level, summary format as well as various degrees of more detailed formats to allow the user to decide what degree to drill down into the details of a claim. In one embodiment, Deskview 200 also provides an interface with the directory database 290.

Claim data accessible via Deskview 200 include the severity of claims, vehicle damage, cycle time for claim processing, repair status updates, estimates, basic management reports, attached digital images, and transaction logs. Examples of filters, which can be used individually or in combination to present claim files in an organize format include region, company, claim office, date claim received/reported. Examples of search criteria, which can be used individually or in combination to retrieve specific claims, include claim number, policy number, claimant name, insured name, data of loss, and adjuster ID. In one embodiment, claim data related to a claim is automatically presented to the user upon entry to Deskview 200 according to business rules. For example, an adjuster may be automatically presented with all the claims that assigned to him for review and processing upon accessing Deskview 200.

In addition, Deskview 200 allows the user to change or edit or manipulate claim data such as administrative information and digital images to the virtual claim file. FIG. 24B is a screenshot of a user interface and claim management system viewing and editing digital images feature. Claim data such as administrative information and digital images can be appended to the virtual claim file as well. For example, a user utilizing Deskview 200 can enter notes concerning the claim or link emails and other documents to the other claim related data that compose a virtual claim file. Certain claim data is stored in a format that cannot be edited based on governmental regulatory requirements or due to business rules. For example, initial claim data captured by FNOL 210 or receiving and stored in the eclaim database 280 from insurance carrier systems 65 are frozen so as to prevent fraud. However, in one embodiment, copies of this data, which are labeled as copies and not originals, are made and can be edited or manipulated and added to the virtual claim file containing the original data.

In one embodiment, claim data stored, for example status or capacity of a given vendor to fulfill an assignment, in the directory database 290 can be accessed, edited and added to using Deskview 200. In one embodiment, claim data stored eclaim database 290 links to more detailed claim data stored in the directory database 290. For example, a vendor's general information can be stored on the eclaim database 280, while more detailed vendor administrative information stored on the directory database 290 is linked to the general data. In another embodiment, claim data stored in insurance carrier systems 65 can be accessed, edited and added to using Deskview 200.

Access and the degree to which a user can view, edit, or add to claim data stored in the eclaim file 280 is governed by the authentication sub-system 215. Deskview 200 utilizes the data relationships outlined in the business object models of FIGS. 20, 21, 22 to display, edit, or add claim data to claim data stored in the eclaim database 280 and the directory database 290.

ii. Portal, Navigation Point

FIG. 25 is a screenshot of a user interface and claim management system navigation feature. Deskview 200 is also the point at which a users log into the system 30, and can navigate to other sub-systems of the system 30 through use of links or buttons. Which sub-systems a user is able to access via Deskview 200 is governed by the authentication sub-system 215. The navigation buttons or links presented to a user through Deskview 200 are consistent with the sub-systems the user is able to access. In an example of the utilization of the navigation feature of Deskview 200, a user such as an insurance adjuster may enter the system 30 through Deskview 200, have claims assigned to automatically presented upon entering Deskview 200, view the claim in detail, then decide what function needs to be performed on the claim, e.g., triage and assignment, audit, or payment. The user could then select the function, through utilization of navigation buttons, he wishes to process the claim with and be transferred to the sub-system or system that governs the selected process. As a specific example, a user may wish to determine a repair facility's cycle time and rate at which they convert an assignment into an estimate before assigning the claim. The user can access the reports sub-system 270 through use of the navigation buttons stored on Deskview 200, then directly utilize the reports sub-system to generate the desired report or reports.

8. Automated Payment System a. General

FIG. 26 is a block diagram of the participants in an automated payment process. The circled numbers represents the order in which the process flows in the described embodiment.

The Automated Payment System 250 (APS) automates the process of fulfilling payment requests made under insurance claims. APS 250 receives invoices (payment requests) from vendors, automatically approves payments according to the insurance carrier business rules, disburses payments to vendors via a trustee bank 2603 using ACH (Automated Clearing House) methods, where possible, tracks the transaction, and provides reconciliation and accounting details to the Insurance Carrier systems. For automobile line of insurance, examples of vendors who provide invoices and receive payment are Repair Facilities, Independent Appraisers, Rental Agencies, Towing Facilities, Salvage Companies, Storage Facilities, and Parts Suppliers, Auto Glass Suppliers, and even policy holders or claimants who have incurred pre-paid costs covered under the insurance policy. For the movement of funds, the insurance carrier's bank 2601 will fund the trustee bank's 2603 escrow account; and the trustee bank 2603 will pay the payee 2605 or fund the vendor's (payee) bank.

The APS 250 receives an invoice or estimate directly from the vendor in electronic form, automatically approves payments based on the carrier's payment rules, aggregate payments for vendors, automatically disburses payments via the claims payment clearing house in the form of the trustee bank 2603, and automatically reconciles the loss and the payment to the carrier's internal systems.

The APS 250 will also support customer service for carrier and vendor queries.

b. Process

FIG. 27 is a flow diagram of a process of automating claim payments from the prospective of an automated processing system. First, the APS 250 receives 2701 an electronic payment request based on a fee estimate or an invoice for work already completed. In one embodiment, the electronic payment request contains: (1) information about the insurance claim the request is being made under, (2) the requestor's profile information (e.g., name, address, phone number, email address, payment preference (e.g., ACH, wire transfer, check), ACH data, if any.), and (3) information about the request being made including work done, or to be done, amounts requested for tasks completed or on amounts requested based on estimated cost for tasks to be completed.

In an alternate embodiment, the payment request will have sufficient reference information to allow the APS 250 to retrieve information such as details of the claim the request is being made under and the requestor's profile information from the eclaim database 280, directory database 290, or insurance claim system 65. For example, the electronic payment request might have an eclaim database 280 user identification and password, along with an identification number that represents the claim. These identification numbers that will allow the APS 250 to access the eclaim database 280 and retrieve claim data for the particular claim the request is being made under. In one embodiment, a progress payment request can be made for a partially completed task.

In one embodiment, once the payment request is received, APS notifies the eclaim database 280 and the insurance carrier system 65 of the request for payment and periodically updates the database and system with the payment status of the request.

Next, the APS 250 determines 2703 if the payment request is being made under a valid insurance policy. In one embodiment, policy information can be stored and retrieved from the eclaim database 280. In another embodiment, policy information is stored on the insurance carrier system 65.

Once the insurance policy is validated, the APS 250 validates 2705 the payee by determining if the payee 2605 profile information is stored in the directory database 290. If the payee 2605 profile information is not stored in the directory database 290, the APS 250 adds the payee 2605 profile information provided in the payment request to the directory database 290. Insufficient profile information will cause the APS 250 to notify the payee 2605 to complete the information. After a set number of notifications to the payee 2605 of insufficient profile information have not produced a complete set of profile information the APS 250 will notify the payee 2605 contact the insurance carrier after a.

i. Validating a Payment Request

Next, the APS 250 validates 2707 the payment request by applying the insurance carrier specific business rules to the payment request. For example, a business rule may be that Direct Repair Program (DRP) members are entitled to pre-approval status for claims under $500. The APS 250 would then retrieve insurance carrier vendor (payee 2605) profiles, which are setup and maintained on the directory database 290 and determine if the vendor, e.g., a repair shop, is a DRP member. If the vendor is determined to be a DRP member and the claim is under $500, the APS 250 would automatically approve the repair payment, without any intervention from a Claims Adjuster.

In the case of progress payment requests, the APS 250 can determine based on the insurance carrier's business rules if the request matches a progress milestone or fulfills some other criteria. In one embodiment, progress payments may be processed automatically without requiring the payee 2605 to make a payment request. For example, a business rule may allow APS to automatically pay a DRP member whose has a fast average cycle time of repairs a portion of repair fees proportionate to the time since the assignment was made and the current date. For example a DRP who has shown, on average, that a certain task assigned to it requires ten days for the to complete, would be paid 50% of the estimated repair fees five days after the assignment was made.

In one embodiment, if a payment request is not approved by the Insurance Carrier business rules, the APS 250 can direct the requesting party to resubmit the request or contact an insurance carrier representative. In alternate embodiment, for payment requests that are not approved by the APS 250 through application of the insurance carrier business rules, the APS 250 notifies Insurance Carrier personnel to intervene and manually approve invoices not adhering to Insurance Carrier's pre-defined business rules. In another embodiment, instead of applying the insurance carrier specific business rules to the invoice information directly, the APS 250 directs the received invoice to the audit sub-system 260, described above and in more detail below, for validation and approval.

In one embodiment, once the APS approves a payment request to pay an invoice for certain work completed (e.g., automobile repair), the APS requires confirmation of satisfaction from the policy holder or consumer who made the claim. Confirmation can be received in many forms. In one embodiment, the policy holder or consumer utilizes an I/O device 1 at the vendor site upon review of the services. For example, a policy holder could be proved with a dial-in phone number which will prompt the policy holder through a confirmation authorization process. In another example, the policy holder uses the vendor's computer 2 to log onto a website and confirm that the policy holder is satisfied.

ii. Funding Request Sent

Once the APS 250 approves a payment requests and for certain circumstances, receives 2709 confirmation of satisfaction, APS notifies the insurance carrier system 65 to authorize the insurance carrier bank 2601 to fund the trustee bank. In one embodiment APS 250 accumulates the insurance carrier's approved payments in a queue until the scheduled payment date. On or before the payment date, the APS 250 aggregates all approved payments for each payee 2605 within carrier. APS creates a aggregate or bundled funding request and transmits the funding request to the insurance carrier system 65. In another embodiment, APS transmits a funding request to the insurance carrier system 65 for each approved payment request.

Payment information, which includes the payee's profile (e.g., name, address, email address, phone number, and ACH information, if the payee 2605 is to be paid via ACH), amount of to be paid, and payment execution date are transmitted to trustee bank 2603 and the Insurance Carrier's Claims and Accounting systems within the Insurance Carrier system 65.

iii. Insurance Carrier Bank Funds Trustee Bank Escrow Account

After the insurance carrier receives the funding request, it directs its bank 2601 to transfer an amount equal to the total funding request to the trustee bank. In one embodiment, the carrier's bank transfers the necessary funds through a wire transfer or through ACH on the day the funding request is transmitted from the APS 250 to the Insurance Carrier's bank. In an alternate embodiment, funding requests can be made prior to the payment date, and funds can be transferred to the trustee bank 2603 before the payment date.

APS 250 requests policy holder or consumer to recognize the assignment has been fulfilled.

iv. Clearing House Receives Payment Execution Order From APS

APS 250, based on insurance carrier business rules, determines payment execution dates. The APS 250 directs 2713 the trustee bank 2603 to execute a single or batch of payments to fulfill a single or multiple payment requests on the payment execution date, which can be the same date APS places to order to execute or can be a date different from the date APS places to order to execute. The trustee bank 2603 executes orders that it has previously received payment information for, and for which the trustee bank 2603 has received sufficient funds to cover the disbursement from the insurance carrier bank 2601 prior to the payment execution date of the order. In another embodiment, if the trustee bank 2603 does not receive funds matching the execution amount, the trustee bank 2603 may still execute payment execution orders based on previously received funds that are sufficient to cover the disbursement or through drawing down on an insurance carrier's line of credit, which is not, nor will be overdrawn by the execution of the payment(s), with the trustee bank 2603, if an insurance carrier has such a line of credit with the trustee bank 2603.

v. Payment Execution

Next, payments, individual or aggregated, are made to each payee 2605 via ACH, wire, or check from the trustee bank 2603 on the established payment date. In an alternate embodiment, payments are made in the form of authorization information to directly debit an insurance carrier bank account for the amount owed the payee (e.g., a credit card number with which the payee can debit the amount owed). In one embodiment, the insurance carrier system 65 is enabled to view account status of the bank account open for payees to draw on and audit the debits to the account. In one embodiment, the insurance carrier views the account status over the Internet. This audit feature allows the insurance carrier to detect inaccuracies in debits, particularly debits of amounts in access of those authorized.

vi. Reporting

The trustee bank 2603 provides electronic notification to the APS 250 that payment has been made to the payees 2605. APS notifies 2715 the payee 2605 that payment has been executed. Once the payments have been made and the payees 2605 have been notified, the APS 250 updates 2715 the eclaim database 280 with the details of the payment. In another embodiment, once the payments have been made and the payee 2605s have been notified, the insurance carrier system 65 is updated with payment details to reflect the payment. In one embodiment, an entry of the payment is logged in the transaction record stored of the eclaim database 280.

vii. Account Structure of the Trustee Bank

In one embodiment, the account structure of the trustee bank 2603 will be an omnibus escrow account where each carrier's funds are tracked via sub-accounting. The trustee bank 2603 maintains custody of funds until disbursement and provides payment support services (customer service). In an alternate embodiment, each insurance carrier would open a separate escrow account within the clearinghouse.

viii. Payment Aggregation by the Clearing House

In one embodiment, an individual payment is sent to a payee 2605 for each payment request made and validated. In an alternate embodiment, payments to payees 2605s with multiple payment requests that are validated are aggregated into a single payment. In one embodiment, multiple payments from a single insurance carrier to a single payee 2605 are aggregated into a single payment. In an alternate embodiment, payments to the same payee 2605 are aggregated across all carriers participating in the clearing house. Individual payee 2605s are uniquely identified by a payee 2605 code. In yet another embodiment, the APS 250 aggregates payments at both levels: multiple payments from a single carrier to a single payee 2605, and payments from several carriers to a single payee 2605 are aggregated into one payment.

ix. Payee/Payor Inquiry to Clearing House

In one embodiment, the trustee bank will provide customer service via the telephone. Payees 2605 or payors who have questions regarding lost, destroyed checks can contact a 1 800 number for customer service. Additionally, customers who have question regarding ACH payments can contact the customer service number as well. The clearinghouse will only answer questions regarding payments it has executed based on the APS 250 instructions. Any questions regarding claims, invoice amounts, etc will be directed to the APS 250 system or the specific Insurance Carrier (Payor).

x. Reconciliation

In one embodiment, APS 250 tracks payments by insurance carrier, claim number, payee 2605 and amount. For aggregated payments, sufficient individualized information is provided the payee 2605 such that the aggregate payments can be decomposed into claim-level or job-specific detail. In another embodiment, after an aggregate payment has been made and APS 250 transmits notification of the payment to the payee 2605, APS 250 provides the payee 2605 with sufficient information to access, view and retrieve payment data stored on the eclaim database 280 to allow the payee to decompose the aggregate payment.

APS 250 provides information to the insurance carrier system 65 to allow the claim and accounting information systems of the insurance system 65 to ensure the payments balance, close the claim, and update the insurance carrier database. In an alternate embodiment, the insurance carrier system 65 is provided access to and retrieval information to retrieve payment information from the eclaim database 180.

9. The Customer Satisfaction Index Collection Sub-System (CSI Sub-system)

a. General

CSI sub-system 260 generates questionnaires to gather customer satisfaction data from customers (e.g., policy holders or consumers), gathers the customer satisfaction data, and then use the data gathered to generate a customer satisfaction index (CSI) score for each survey and an aggregate CSI score from the individual CSI scores for each commercial participant (e.g., service providers, insurance carrier staff who have handled a policy holder claim, the insurance carrier.) which can be stored and later utilized in ranking the commercial participant. In one embodiment, data of user satisfaction of processes, sub-systems and systems described above is also gathered. The survey data gathered from policy holders and consumers are stored in the eclaim database 280, while the calculated aggregate CSI is stored into the directory database 290 in association with the party whose work is being scored. In one embodiment, incentives such as discounts on repairs are provided to customers to retrieve satisfaction data from them.

b. Process i. Generation of a Customer Service Questionnaire

The CSI sub-system generates general customer service questionnaires that stored on the eclaim database 280. Questionnaires include both structured questions with predefined possible answers including multiple choice answers and unstructured questions to be answered using free text. Commercial participant can add ad-hoc questions to the standard survey questions.

ii. Gathering Customer Satisfaction Data

The CSI sub-system directs gathering of customer satisfaction data in a number of methods. First, when claim services are completed, the consumer completes the consumer satisfaction survey via a client software 205 interface or a voice based interface 207. Preferably, the consumer uses his or her I/O Device 1 to review the customer satisfaction survey questions stored in the eclaim database 280. In another embodiment, the CSI sub-system emails customers a message asking them to provide feedback. The email contains a hyperlink to a survey form located at a website. In another embodiment, the consumer completes a paper version of the survey and sends that to a data entry group that uses I/O devices 1 to forward the responses to the CSI sub-system for storage in the eclaim database 280.

In another implementation, a call center is employed to contact customers directly with survey questions, the call center staff filling out the CSI survey questions as they are answered by the customer. The CSI sub-system can create interview scripts stored on the eclaim database 280 to be used by call center staff. The CSI sub-system can also generate calling lists from customer data stored on the eclaim database 280 or retrieves call lists stored on the eclaim database. In one embodiment, the CSI sub-system removes numbers from the call list based on transaction entry that shows that a particular customer had already completed the survey. In another embodiment, the CSI sub-system de-duplicates phone numbers listed on the eclaim database to prevent the same number from being inadvertently called twice.

iii. Generating a Customer Satisfaction Customer Satisfaction Data and Report Generation:

The results of the consumer satisfaction surveys are retrieved from the eclaim database 280 compiled by the CSI sub-system. The CSI sub-system utilizes an algorithm to generate a composite index score for each survey. The CSI sub-system then updates the overall CSI index score for that service provider in an entry to industry directory database 290 incorporating the new result. The resulting overall CSI index for a given vendor can be displayed with the profile of the assignee the next time the service provider's data in industry directory database 290 is accessed from the system 30, particularly by the assignment sub-system 230.

If a designated client receives a satisfaction score below a pre-defined threshold, the CSI sub-system automatically notifies the client of the low score according to client designated notification preferences. This automatic notification allows the client to determine the reason for the low score and attempt to rectify instances of low customer satisfactions or change methods that produce low customer satisfaction.

The commercial participant can view their customer satisfaction data (e.g., stored answered surveys, individual CSI index scores generated for each survey, and aggregate CSI index score generated for the commercial participant) stored on the eclaim database 280 or the directory database 290. In one embodiment, customer satisfaction data is added to the eclaim database 280 as soon as retrieved (which can be many times in a day), thus, commercial participants can review customer satisfaction in a near real-time fashion.

In addition, customer satisfaction reports can be generated by the reports sub-system 270 for the survey data. Reports can be generated daily, weekly, monthly, quarterly, and yearly reports on customer satisfaction and include reports that aggregate industry ratings for benchmarking (comparison with the performance of other commercial participants) and graphical reports.

10. Reporting Sub-System a. General

The reporting sub-system 270 summarizes and formats data stored in the eclaim database 280 or the insurance carrier system 65, based on a number of criteria, to generate various reports. Examples of reports generated by the reporting sub-system 270 are cycle times, conversion ratios, and current assignments outstanding. In one embodiment, the reporting sub-system 270 generates reports from data stored in the directory database 290. The reporting sub-system 270 can generate upon request or pre-generate and store reports to be retrieved later. In one embodiment, once a report is generated it can be stored in the directory database 290, if specific to a vendor(s), or is stored in the eclaim database 280, if not specifically related to a vendor(s).

The reporting sub-system analyzes stored claim data elements (e.g., severity of claims, vehicle damage), estimates, detailed estimate data, transaction logs and other key performance measures to produce an aggregate view of transactions (e.g., counts, averages, users, business units, geographical designations or average cycle times).

b. Types of Reports i. Canned Reports

FIG. 28 is a screenshot of an example of canned or standard reports that a reporting sub-system can generate and a user can select. The reporting sub-system produces canned reports, reports whose criteria and data elements are pre-selected and static. A user can select from canned reports, but is unable to designate how the data of the report is presented. In one embodiment, the user can select the time frame (e.g., for the month of March, for the first quarter, for the year of 2001) of a canned report.

Examples of canned or set operational reports generated from transaction logs data include the number of assignments made by adjuster per month, and the number of claims received by FNOL 210 per month. Examples of canned reports generated from transactional claim data include cycle time (calculated from the start and completion of a process), number of estimates, damage by vehicle type, average appraisal fee, OEM part usage.

ii. Customized Reports

In another embodiment, the reporting sub-system supports the generation of customized reports that match user selected criteria to produced focused results. The reporting sub-system is able generate reports indexed by activity within a specific time range, by activity within a geographical region, and by vehicle type. FIG. 29 is a screenshot of a report generated by a reporting sub-system that is indexed by region and by state within each region. In one embodiment, the reporting sub-system 270 allows a user to drill down and view the specific details of customized reports (e.g., the number of assignments can be presented in a per day, per adjuster, per week, per month, per quarterly and per year format, or by adjuster, by service office, by region, and by insurance carrier). In one embodiment, customized reports are generated by third party systems.

Reports can be generated to analyze and compare trends in the processing of claims. For example, the average estimate for a certain type of repair over a current quarter, the month prior to the current quarter, the quarter prior to the current quarter, and the year prior to the current quarter. These trend-analyzing reports can provide an insurance carrier with data to determine if subsequent estimates for similar types of repair are reasonable or even potentially fraudulent. Reports can be generated real time at the point of request or at set times with the results being stored in the eclaim database 280, the directory database 290, or the insurance carrier system 65.

FIG. 30 is a screen shot of date elements generated by a report sub-system exported to a Microsoft Excel software program. In one embodiment, the details of each report generated can be drilled down to and the reports as well as the details of each report can be exported to other systems (e.g., via email or through posting on a webpage). In one embodiment, data elements that compose the reports can be downloaded to Microsoft Access and Excel software.

In a preferred embodiment, the data from originating database (i.e., the eclaim database 270, the directory database, or the insurance carrier system 65 database) that the reports are generated from is replicated and stored in a more efficient format for reporting analysis, and the reports are generated from that replicated mirror database so as not to burden the originating databases.

It should be noted that at least one described embodiment operates in an automated fashion with no human intervention.

Other embodiments may operate with varying degrees of human intervention for, as an example, escalation of difficult claims or human estimation input.

One example of a semi-automated process that employs sub-systems of the inventions:

After FNOL 210 captures a new claim and stores the claim data in the eclaim database 280, the claim is automatically assigned by the triage and assignment sub-systems 220/230 to an insurance carrier adjuster. Once the assignments are made, the assignment sub-system 230 sends a notification message of the assignment via email to the adjuster and logs to the eclaim database 280 that the email was sent and the assignment was made.

Next, when an insurance carrier adjuster logs on to the system 30 via Deskview 200, he is first authenticated by the user authentication system 215. Next, a message appears on Deskview 200 displaying the number of new claims the adjuster has been assigned to further assign. The adjuster then uses Deskview 200 to view a queue containing their respective assignments, by way of Deskview's 200 search engine type functionality. Assignments are sorted by date displaying the most recent assignment first.

The adjuster then selects the specific claim (or suffix) and searches the directory database 290 to find a vendor (e.g., class shop, independent appraisal and/or staff adjuster) within a certain radius or other specific search criteria. The adjuster then selects the appropriate vendor and fills out a work request form. The work request form is pre-filled with data already collected and adjuster adds additional notes or instructions using Deskview 200. The work request form is sent via email, fax or other communication methods to the vendors (assignees). The system 30 logs the transaction and updates the eClaim database 280.

The vendors (assignees) acknowledge the receipt of the fax or email assignment via a fax back or reply email. If a fax was received, the adjuster could scan the fax and attach the digital image to the virtual claim file, which exists in the eclaim database 280 for the particular claim. The system 30 can automatically log receipt of email to the eclaim 280. Internal assignees would be automatically updated once logged into the system and the claim or suffix is selected. Details of the assignment and claim data stored in the eclaim database 280 can be sent directly to the assignee. Alternatively, the assignee can retrieve claim data related to the assignment directly using Connection 300.

Changes of status of work completed on the claim can be sent directly from a vendor to the system 30 via email or through Connection 300. Updates of status of work on the claim are logged by the system 30 to the eclaim database 280.

It should also be noted that, in the described embodiment, most of the described sub-systems are located centrally and accessed via the web or other network. Alternately, one or more sub-systems could be located elsewhere, such as at a distributed site or could be accessed from a redirected web site, or an ASP web site.

We claim:

1. A computer comprising:
a processor; and
a memory, coupled to the processor and having computer program code embodied therein for enabling the processor to:
receiving data related to the insurance claim, the data comprising a plurality of data elements, a data element serving as an assignment criterion;
assign a score to first and second data elements of the plurality of data elements based on scoring rules, wherein each data element includes one or more data from the group consisting of policy information, vehicle information, number of vehicles involved, repair cost, number of parties involved, time of incident, and location of incident;
determine an overall score of the insurance claim based on the assigned scores;
determine a class of the insurance claim according to classing rules; and
determine a type of assignee to whom to assign the insurance claim according to the application of business rules to the overall score of the insurance claim and the class of the insurance claim, wherein the business rules weight the class more highly than the score.

2. A computer comprising:
a processor, and
a memory, coupled to the processor and having computer program code embodied therein for enabling the processor to:
determine, based on data elements of the insurance claim, a claim score for first and second data elements, wherein each data element includes one or more data from the group consisting of policy information, vehicle information, number of vehicle involved, repair cost, number of party involved, time of incident, and location of incident;
determine an overall score for the insurance claim using each of the claim scores;
determine, based on the insurance claim, a class of the insurance claim;
determine, based on the overall claim score and the class, the type of assignee; and
assign the insurance claim to the determined assignee.

3. The computer of claim 2, wherein an effect of the class on the type of assignee is weighted greater than an effect of the claim score on the type of assignee.

4. The computer of claim 2, wherein the claim score reflects a severity of the insurance claim.

5. The computer of claim 2, wherein the claim score is determined based on an element of a group comprising information regarding an insurance policy, information regarding a party involved in a loss, and information regarding how a loss was reported.

6. The computer of claim 2, further comprising determining, based on the claim score, a priority of the insurance claim.

7. The computer of claim 2, wherein an assignee comprises an element of a group comprising an insurance adjuster, a repair facility, an appraiser, and a rental provider.

8. The computer of claim 2, wherein an effect of the first data element on the claim score is greater than an effect of the second data element on the claim score.

9. The computer of claim 2, wherein each data element includes an element score, and wherein the claim score is based on the element scores of the data elements.

10. The computer of claim 2, further comprising:
determining a first set of profiles, wherein each profile in the first set represents a potential assignee of the determined type, and wherein each profile in the first set includes a profile score;
determining a second set of profiles, wherein the second set contains profiles in the first set that have the highest profile scores, and wherein each profile in the second set includes a measure of capacity to complete the insurance claim; and determining, from the second set of profiles, a profile with the largest measure of capacity.

11. A computer program product comprising a computer useable medium having computer program logic embodied therein for enabling a computer system to select a type of assignee from a plurality of types of assignees, said computer program logic comprising:

computer readable program code for determining, based on data elements of the insurance claim, a claim score for first and second data elements, wherein each data element includes one or more data from the group consisting of policy information, vehicle information, number of vehicles involved, repair cost, number of parties involved, time of incident, and location of incident;

a second computer readable program code for determining an overall score for the insurance claim using the claim scores;

a third computer readable program code for determining, based on the insurance claim, a class of the insurance claim; and a fourth computer readable program code for determining, based on the claim score and the class, the type of assignee.

12. The computer program product of claim 11, further comprising:

computer readable program code for determining a first set of profiles, wherein each profile in the first set represents a potential assignee of the determined type, and wherein each profile in the first set includes a profile score;

computer readable program code for determining a second set of profiles, wherein the second set contains profiles in the first set that have the highest profile scores, and wherein each profile in the second set includes a measure of capacity to complete the insurance claim; and computer readable program code for determining, from the second set of profiles, a profile with the largest measure of capacity.

13. The computer program product of claim 12, wherein the fourth computer readable program code is configured to weight an effect of the class greater than an effect of the claim score in determining the type of assignee.

14. The computer program product of claim 12, wherein the claim score reflects a severity of the insurance claim.

15. The computer program product of claim 12, wherein the first computer readable program code determines claim score based on insurance policy information, information regarding a party involved in a loss, or information regarding how a loss was reported.

16. The computer program product of claim 12, further comprising computer readable program code for determining, based on the claim score, a priority of the insurance claim.

17. The computer program product of claim 12, wherein an assignee comprises an insurance adjuster, a repair facility, an appraiser, or a rental provider.

18. The computer program product of claim 12, wherein the first computer readable program code weights an effect of the first data element on the claim score greater than an effect of the second data element on the claim score.

19. The computer program product of claim 18, wherein a data element includes an element score, and wherein the first computer readable program code determines claim score based on the element scores of the data elements.

* * * * *